US005561467A

United States Patent [19]

Takeuchi et al.

[11] Patent Number: 5,561,467

[45] Date of Patent: Oct. 1, 1996

[54] RECEIVER AND CHANNEL COMPATIBLE ENCODING/DECODING SYSTEM FOR HIGH DEFINITION VIDEO

[75] Inventors: Yoshio Takeuchi; Makoto Okui; Isao Kondo; Yasuaki Kanatsugu; Junji Kumada; Taiichiro Kurita; Kazuhiko Shibuya; Taiji Nishizawa; Yutaka Tanaka; Minoru Honda; Ryoichi Yajima; Shoichi Suzuki; Hisakazu Kato; Hiroyuki Hamazumi; Kazumasa Enami; Seiichi Gohshi; Yoshinori Izumi; Haruo Okuda; Ichiro Yuyama; Sumio Yano; Makoto Tadenuma, all of Tokyo, Japan

[73] Assignee: Nippon Hoso Kyokai, Tokyo, Japan

[21] Appl. No.: 498,778

[22] Filed: Mar. 26, 1990

[51] Int. Cl.[6] ........................................ H04N 7/00

[52] U.S. Cl. .......................... 348/427; 348/435; 348/434; 386/37; 386/123; 386/131

[58] Field of Search .................................. 358/141, 142, 358/147, 146, 11, 12, 13; 348/426, 432, 433, 434, 435, 436, 437, 427, 429, 430, 431; H04N 7/00, 11/00, 7/04, 7/06, 7/08

[56] References Cited

U.S. PATENT DOCUMENTS 4,961,112 10/1990 Sugimori et al. ...................... 358/141

FOREIGN PATENT DOCUMENTS 0357144 3/1990 European Pat. Off. ....... H04N 11/00
4102935 8/1991 Germany ........................ H04N 7/00

*Primary Examiner*—David E. Harvey
*Attorney, Agent, or Firm*—Rothwell, Figg, Ernst & Kurz

[57] ABSTRACT

High resolution vertical and horizontal components of a high definition video signal are combined with a standard broadcast system video signal, such as the NTSC system, in which high frequency horizontal resolution components are sampled and used to modulate at least a first sub-carrier signal. The first sub-carrier is frequency interleaved onto the standard broadcast signal. Vertical high resolution components are time compressed and time division multiplexed onto top and bottom portions of the standard broadcast signal. The modified broadcast signal can be decoded by a standard receiver to display a standard resolution video image, while receivers designed to decode the modified signal can time division demultiplex the vertical high resolution components and demodulate the horizontal high resolution components, combine these components with the standard components, and generate a high definition video image.

51 Claims, 46 Drawing Sheets

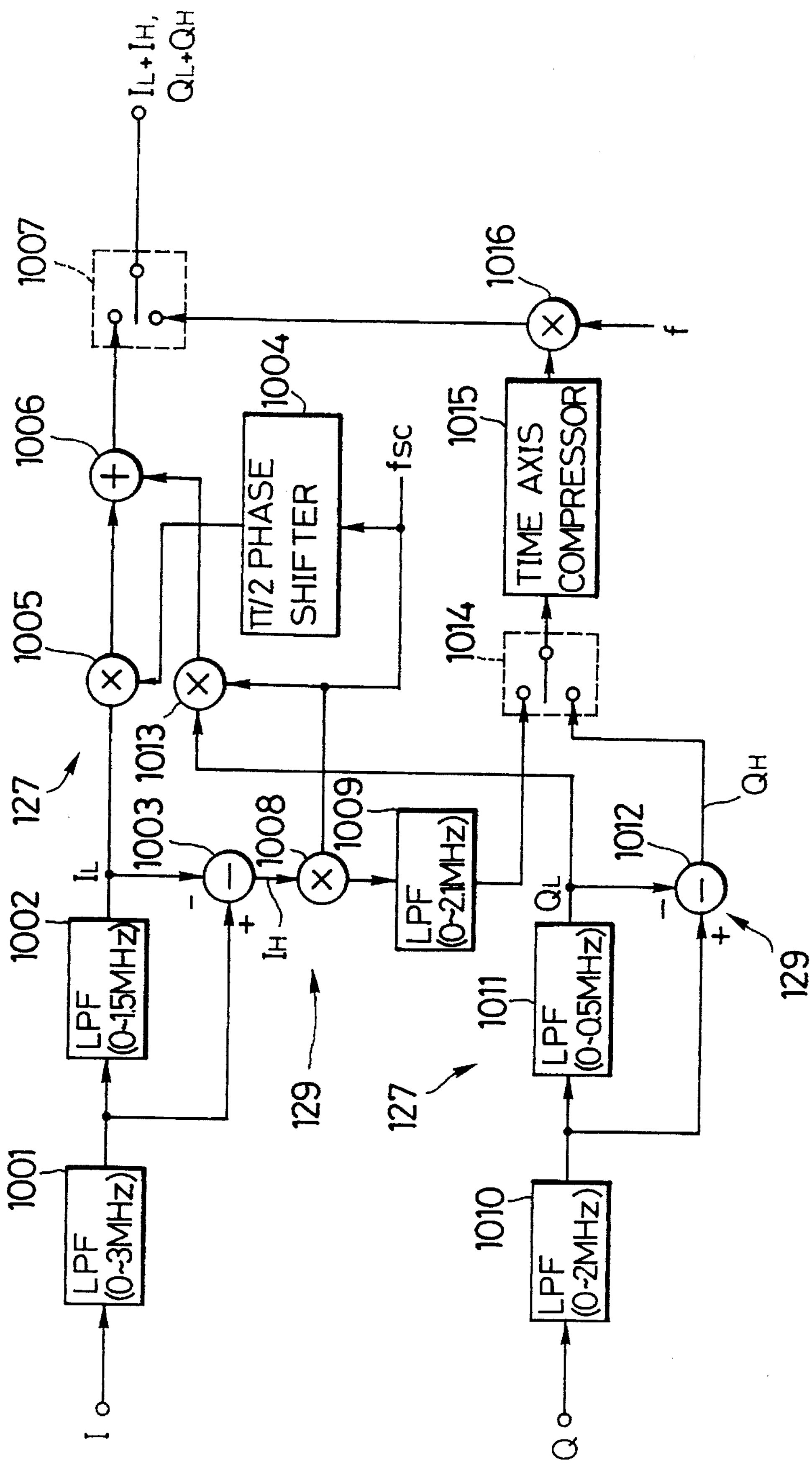
F I G .10

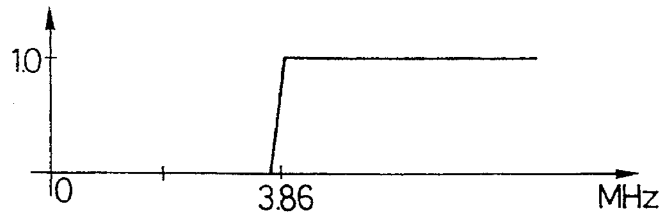
F I G .17A
F I G .17B
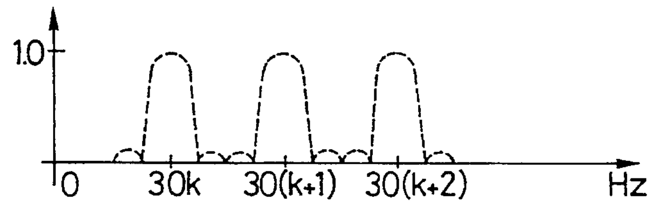
F I G .17C
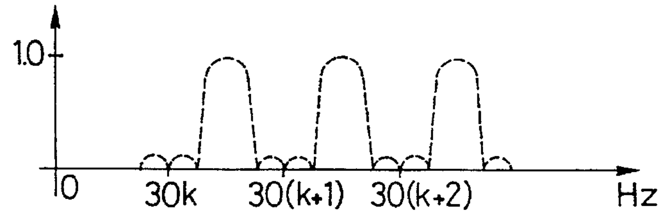
F I G .17D
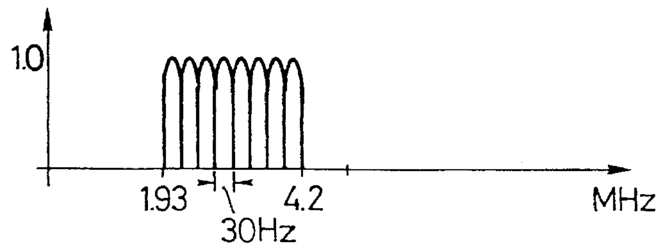
F I G .17E

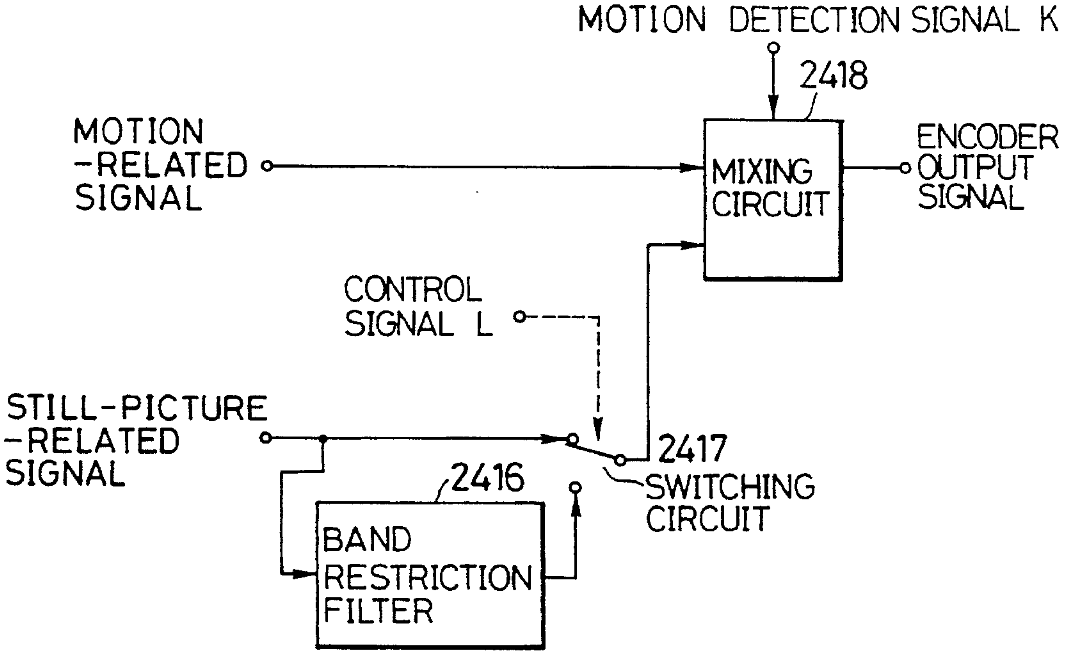
F I G. 24
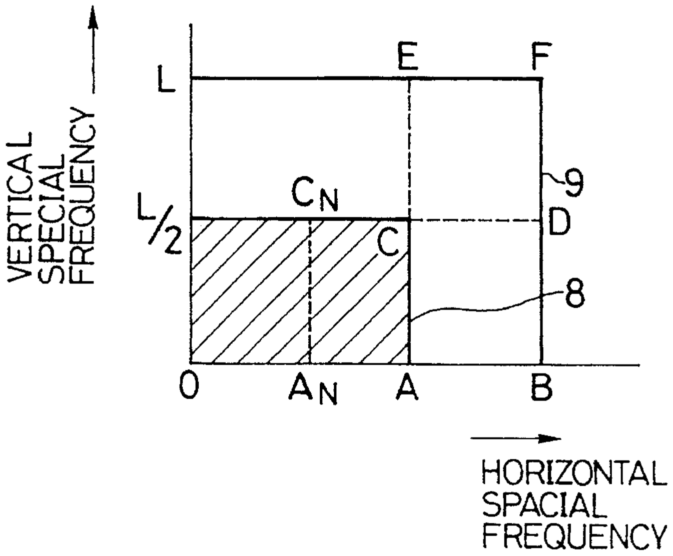
F I G. 25

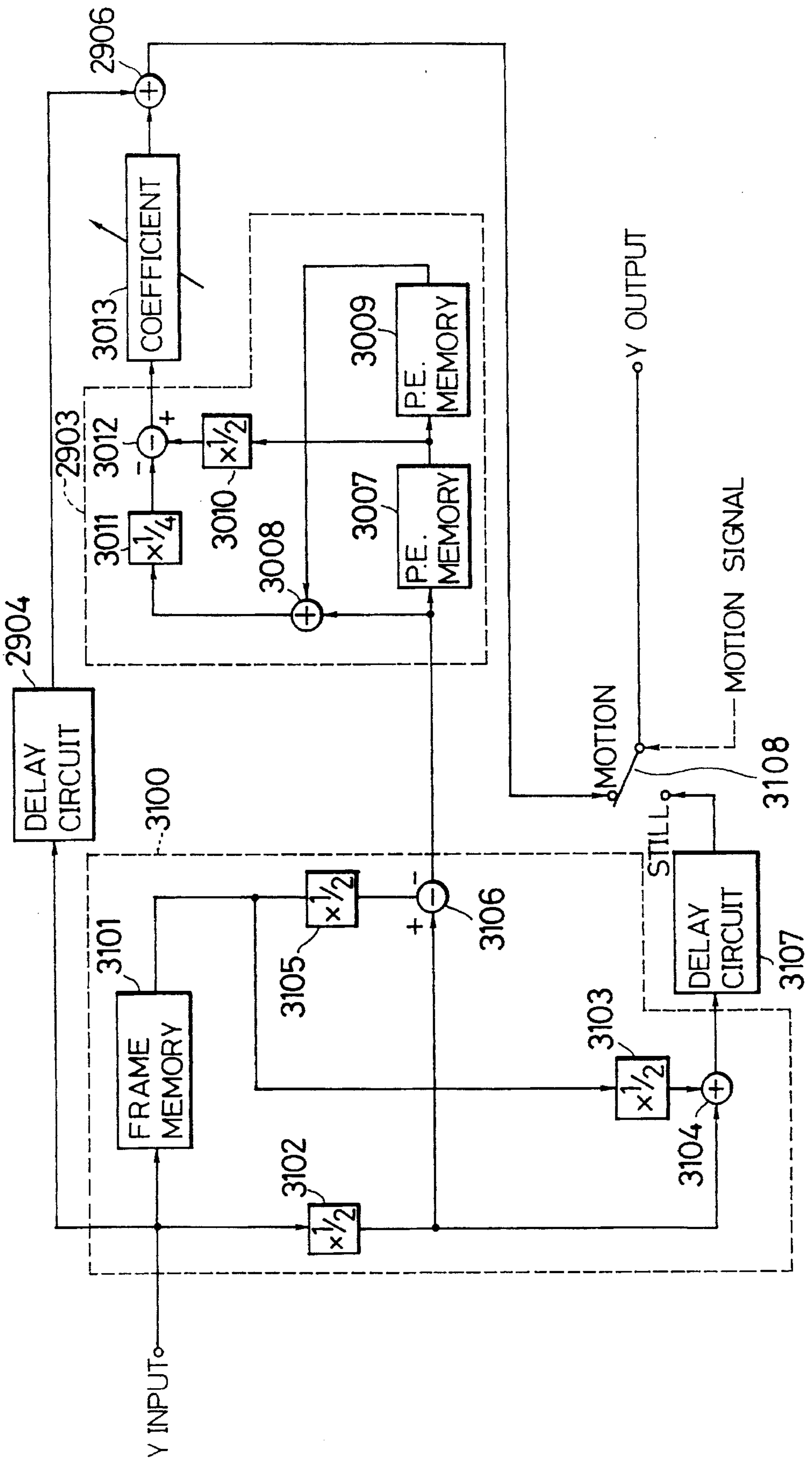
F I G. 31

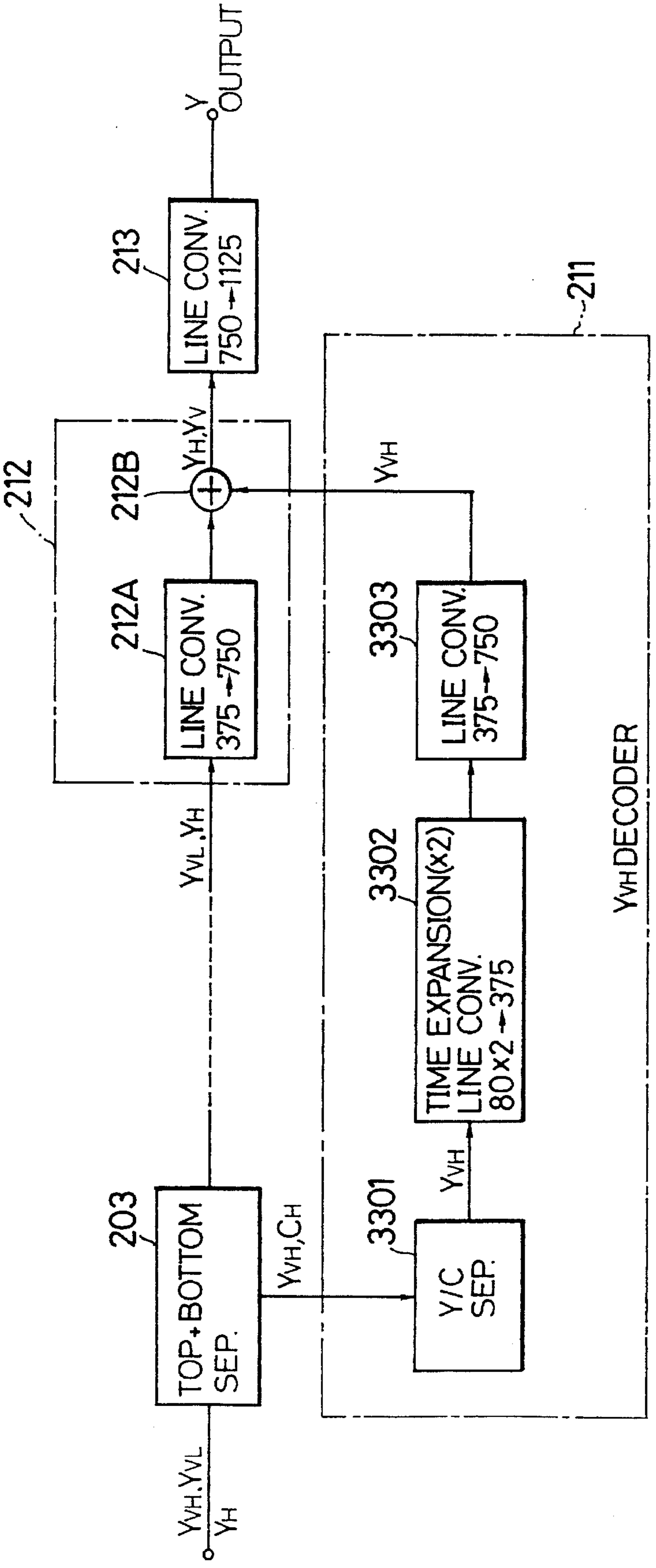
F I G. 33

RECEIVER AND CHANNEL COMPATIBLE ENCODING/DECODING SYSTEM FOR HIGH DEFINITION VIDEO

FIELD OF THE INVENTION

The present invention generally relates to video signal encoding/decoding systems and more particularly relates to an encoding/decoding system which converts a high definition video signal having high frequency components and a large number of scanning lines per frame into a video signal which can be transmitted on a narrow band channel and which can be decoded and displayed on a standard television receiver, for example, an NTSC (National Television System Committee) receiver.

BACKGROUND OF THE INVENTION

High definition color television systems are known. Such systems provide a television picture image which is much higher in vertical and horizontal resolution than presently utilized standard television broadcasting systems such as NTSC, PAL (Phase Alternation by Line) and SECAM (Sequential Couleur a Memoire).

An example is the 1125/60 high definition television system proposed by NHK (Nippon Hoso Kyokai or Japan Broadcasting Corporation). This system is featured by having 1125 scanning lines, an aspect ratio of 16:9, and 2:1 interlace scanning, with a field frequency of 60 Hz. The luminance signal bandwidth is about 20 MHz, while the chrominance signal bandwidth is approximately 7.0 MHz.

A system for the transmission of such a high definition color television signal is disclosed in U.S. Pat. No. 4,745,459 issued May 17, 1988, incorporated herein by reference. This system provides bandwidth reduction of the high definition video signal from approximately 26 MHz to 8.1 MHz. However, such a system cannot be used for terrestrial broadcast over single conventional transmission channels which are limited to 6 MHz in bandwidth. Even further, the high definition television signal of the type referred to is a time compressed and time division multiplexed signal in which luminance and chrominance signals are multiplexed in time to eliminate interference between the chrominance and luminance signals. Therefore, even if such a signal required a bandwidth less than 6 MHz, it could not be decoded and displayed on a conventional receiver such as an NTSC receiver, since the NTSC television signal is a composite signal in which a luminance signal is multiplexed with a color subcarrier which is itself modulated by a chrominance signal and the two signal formats are thus not compatible with each other.

In referring to high definition television systems proposed for use in the United States and where compatibility with the existing NTSC system is the object, it has become a practice to designate such systems as "channel compatible" and/or "receiver compatible". A channel compatible system is said to be one in which the high definition signal can be encoded and broadcast transmitted with the presently assigned 6 MHz bandwidth frequency channels of the NTSC system. A receiver compatible system is one in which the signal can be decoded by and displayed by a conventional NTSC television receiver.

SUMMARY OF THE INVENTION

The present invention provides a system for converting a wide band, high resolution video signal into a signal which can be transmitted on a narrow band transmission channel such as, for example, a 6 MHz channel, and which can also be decoded and displayed by conventional receivers such as NTSC receivers.

The present invention provides a method and apparatus for encoding high definition signals into a NTSC compatible signal by time division multiplex encoding time axis compressed high definition vertical signal components during portions of the vertical scan period of the NTSC compatible signal and for generating and modulating one or more additional subcarriers with high definition horizontal components while frequency interleaving the additional subcarrier(s) with the color chrominance subcarrier to avoid interference.

In particular, the present invention provides an encoder for encoding a high resolution, high frequency video, signal into an NTSC-compatible signal, including means for separating vertical resolution components of the high resolution signal into low and high resolution component signals, means for providing a bandwidth limited vertical high resolution signal, means for time axis compressing the bandwidth limited vertical high resolution signal, means for converting the vertical low resolution signal into an NTSC format representing a predetermined number of lines in the center region of an NTSC image frame, means for converting the time axis compressed vertical high resolution signal into an NTSC format representing a predetermined number of lines in the top and bottom regions of the NTSC image frame, means for combining the center and top and bottom regions to form an NTSC formatted signal, means for separating horizontal high frequency components from the NTSC formatted signal, means for sampling the horizontal high frequency components and modulating a subcarrier signal with the samples therefrom, means for encoding the NTSC formatted signal into an NTSC-compatible signal, and means for interleaving the modulated subcarrier signal onto the NTSC-compatible signal.

The present invention further provides a decoder for decoding a high resolution, high frequency broadcast-standard-compatible video signal, comprising means for demultiplexing time division multiplexed, time compressed vertical high resolution components from the compatible signal, means for time axis expanding the demultiplexed vertical high resolution components, means for adding the time axis expanded vertical high resolution components to standard vertical resolution components of the broadcast-standard compatible signal, means for converting the added vertical components into a predetermined number of horizontal scanning lines corresponding to the high resolution image frame, means for demodulating horizontal high resolution components, frequency interleaved into the broadcast standard compatible signal, and means for combining the demodulated horizontal high resolution components with the lower frequency horizontal resolution components of the horizontal signal to form a high resolution, high frequency video signal.

The first aspect of the present invention is as follows.

An encoder for converting a second television signal with a high resolution and having the larger number of horizontal scanning lines, a broader frequency bandwidth and a larger aspect ratio of a frame relative to a first television signal into a third television signal which is compatible with said first television signal, said encoder comprising:

means for separating a luminance vertical high band component of said second television signal which is higher than a luminance vertical low band component of said second television signal from said second television signal, said luminance vertical high band component of said second television signal corresponding to a central scanning line portion out of said central portion and upper and lower scanning line portions of said first television signal, said central scanning line portion and said upper and lower scanning line portions being divided in the ratio of an aspect ratio of said first television signal to that of said second television signal;

means for converting the number of scanning lines of said second television signal obtained by removing said luminance vertical high band component from said second television signal, into the number of scanning lines in said central portion;

means for frequency-converting a luminance horizontal high band component in the second television signal from said means for converting and having a bandwidth higher than a frequency bandwidth of said first television signal, into a separable signal which is multiplexed to a frequency region higher than the frequency region of a luminance horizontal low band component in said second television signal and is separable on a decoder side;

means for multiplexing said separable signal to a luminance horizontal low band component;

delay means for time-shifting said luminance vertical high band component of said second television signal to said upper and lower scanning line portions; and means for combining an output from said means for multiplexing with an output from said delay means to obtain said third television signal.

The second aspect of the present invention is as follows.

A decoder for decoding the second television signal from the third television signal encoded by an encoder for converting said second television signal with a high resolution and having the larger number of horizontal scanning lines, a broader frequency bandwidth and a larger aspect ratio of a frame relative to the first television signal into said third television signal which is compatible with said first television signal, said decoder comprising:

means for separating a central scanning line portion and upper and lower scanning line portions of said third television signal;

means for extracting a luminance horizontal low band component from said central scanning line portion;

means for extracting a luminance horizontal high band component signal having luminance horizontal high band components multiplexed on the side of said decoder in a frequency region higher than the frequency region of said luminance horizontal low band component, from said central scanning line portion;

means for frequency-converting said luminance horizontal high band component signal into said luminance horizontal high band components arranged in plural frequency regions high than the frequency region of said luminance horizontal low band component;

means for combining said luminance horizontal high band components with said luminance horizontal low band component to obtain a broad-band luminance horizontal signal;

a first scanning line number conversion means for converting the number of scanning lines of said broad-band luminance horizontal signal into the number of scanning lines of said second television signal;

a second scanning line number conversion means for converting the number of scanning lines of the signals in the upper and lower scanning line portions into signals having scanning lines, the number of which is equal to the number of scanning lines of said second television signal; and means for combining the outputs from said first and second scanning line number conversion means with each other.

The third aspect of the present invention is as follows.

A broad bandwidth television signal transmission system having an encoder for converting a second television signal with a high resolution and having the larger number of horizontal scanning lines, a broader frequency bandwidth and a larger aspect ratio of a frame relative to a first television signal into a third television signal which is compatible with said first television signal, and a decoder for decoding a second television signal from a third television signal encoded by an encoder for converting said second television signal with a high resolution and having the larger number of horizontal scanning lines, a broader frequency bandwidth and a larger aspect ratio of a frame relative to a first television signal into said third television signal which is compatible with said first television signal, said system comprising on the transmitter side:

means for separating a luminance vertical high band component of said second television signal which is higher than a luminance vertical low band component of said second television signal from said second television signal, said luminance vertical high band component of said second television signal corresponding to a central scanning line portion out of said central portion and upper and lower scanning line portions of said first television signal, said central scanning line portion and said upper and lower scanning line portions being divided in the ratio of an aspect ratio of said first television signal to that of said second television signal;

means for converting the number of scanning lines of said second television signal obtained by removing said luminance vertical high band component from said second television signal, into the number of scanning lines in said central portion;

means for frequency-converting a luminance horizontal high band component in the second television signal from said means for converting and having a bandwidth higher than a frequency bandwidth of said first television signal, into a separable signal which is multiplexed to a frequency region higher than the frequency region of a luminance horizontal low band component in said second television signal and is separable on a decoder side;

means for multiplexing said separable signal to a luminance horizontal low band component;

delay means for time-shifting said luminance vertical high band component of said second television signal to said upper and lower scanning line portions;

means for combining an output from said means for multiplexing with an output from said delay means to obtain said third television signal; and transmitting means for modulating a carrier signal by said third television signal from said means for combining and for transmitting the modulated carrier signal; and said system further comprising on the receiver side:

receiving means receiving the transmitted modulated carrier signal and for demodulating the third television signal therefrom;

means for separating a central scanning line portion and upper and lower scanning line portions of said third television signal;

means for extracting a luminance horizontal low band component from said central scanning line portion;

means for extracting a luminance horizontal high band component signal having luminance horizontal high band components multiplexed on the side of said decoder in a frequency region higher than the frequency region of said luminance horizontal low band component, from said central scanning line portion;

means for frequency-converting said luminance horizontal high band component signal into said luminance horizontal high band components arranged in plural frequency regions high than the frequency region of said luminance horizontal low band component;

means for combining said luminance horizontal high band components with said luminance horizontal low band component to obtain a luminance horizontal signal;

a first scanning line number conversion means for converting the number of scanning lines of said luminance horizontal signal into the number of scanning lines of said second television signal;

a second scanning line number conversion means for converting the number of scanning lines of the signals in the upper and lower scanning line portions into signals having scanning lines, the number of which is equal to the number of scanning lines of said second television signal; and means for combining the outputs from said first and second scanning line number conversion means with each other.

The fourth aspect of the present invention is as follows. A broad bandwidth television signal recording/reproducing system having an encoder for converting a second television signal with a high resolution and having the larger number of horizontal scanning lines, a broader frequency bandwidth and a larger aspect ratio of a frame relative to a first television signal into a third television signal which is compatible with said first television signal, and a decoder for decoding a second television signal from a third television signal encoded by an encoder for converting said second television signal with a high resolution and having the larger number of horizontal scanning lines, a broader frequency bandwidth and a larger aspect ratio of a frame relative to a first television signal into said third television signal which is compatible with said first television signal, said system comprising on the recording side:

means for separating a luminance vertical high band component of said second television signal which is higher than a luminance vertical low band component of said second television signal from said second television signal, said luminance vertical high band component of said second television signal corresponding to a central scanning line portion out of said central portion and upper and lower scanning line portions of said first television signal, said central scanning line portion and said upper and lower scanning line portions being divided in the ratio of an aspect ratio of said first television signal to that of said second television signal;

means for converting the number of scanning lines of said second television signal obtained by removing said luminance vertical high band component from said second television signal, into the number of scanning lines in said central portion;

means for frequency-converting a luminance horizontal high band component in the second television signal from said means for converting and having a bandwidth higher than a frequency bandwidth of said first television signal, into a separable signal which is multiplexed to a frequency region higher than the frequency region of a luminance horizontal low band component in said second television signal and is separable on a decoder side;

means for multiplexing said separable signal to a luminance horizontal low band component;

delay means for time-shifting said luminance vertical high band component of said second television signal to said upper and lower scanning line portions;

means for combining an output from said means for multiplexing with an output from said delay means to obtain said third television signal; and recording means for recording said third television signal from said means for combining on a recording medium; and said system further comprising on the reproducing side:

reproducing means for reproducing the third television signal from said recording medium;

means for separating a central scanning line portion and upper and lower scanning line portions of said third television signal;

means for extracting a luminance horizontal low band component from said central scanning line portion;

means for extracting a luminance horizontal high band component signal having luminance horizontal high band components multiplexed on the side of said decoder in a frequency region higher than the frequency region of said luminance horizontal low band component, from said central scanning line portion;

means for frequency-converting said luminance horizontal high band component signal into said luminance horizontal high band components arranged in plural frequency regions high than the frequency region of said luminance horizontal low band component;

means for combining said luminance horizontal high band components with said luminance horizontal low band component to obtain a luminance horizontal signal;

a first scanning line number conversion means for converting the number of scanning lines of said luminance horizontal signal into the number of scanning lines of said second television signal;

a second scanning line number conversion means for converting the number of scanning lines of the signals in the upper and lower scanning line portions into signals having scanning lines, the number of which is equal to the number of scanning lines of said second television signal; and means for combining the outputs from said first and second scanning line number conversion means with each other.

The above and other objects, effects, features and advantages of the present invention will become more apparent from the following description of embodiments thereof taken in conjunction with the accompanying drawings.

BRIEF DESCRIPTION OF THE DRAWINGS

FIGS. 9 and 10 are block diagrams showing two embodiments of the encoders 127 and 129 shown in FIG. 1;

FIGS. 17A–17E are frequency spectrums illustrating the frequency characteristics of signals at various points in the circuit shown in FIG. 11 and 37;

FIG. 24 is a block diagram showing an embodiment of the control of the encoder by the motion detection signal;

FIG. 25 is an explanatory diagram illustrating the relationship between the vertical and horizontal special frequencies, showing the frequency region used by the motion detection circuit to detect the existence of motion picture portions in the video signal;

FIGS. 30 and 31 are block diagrams showing an embodiment of the arrangement shown in FIG. 29;

FIG. 33 is a block diagram showing one embodiment of the $Y_{VH}$ decoder 211 shown in FIG. 2;

DETAILED DESCRIPTION OF PREFERRED EMBODIMENTS

(1) GENERAL ARRANGEMENT OF AN ENCODER

Figure 1:
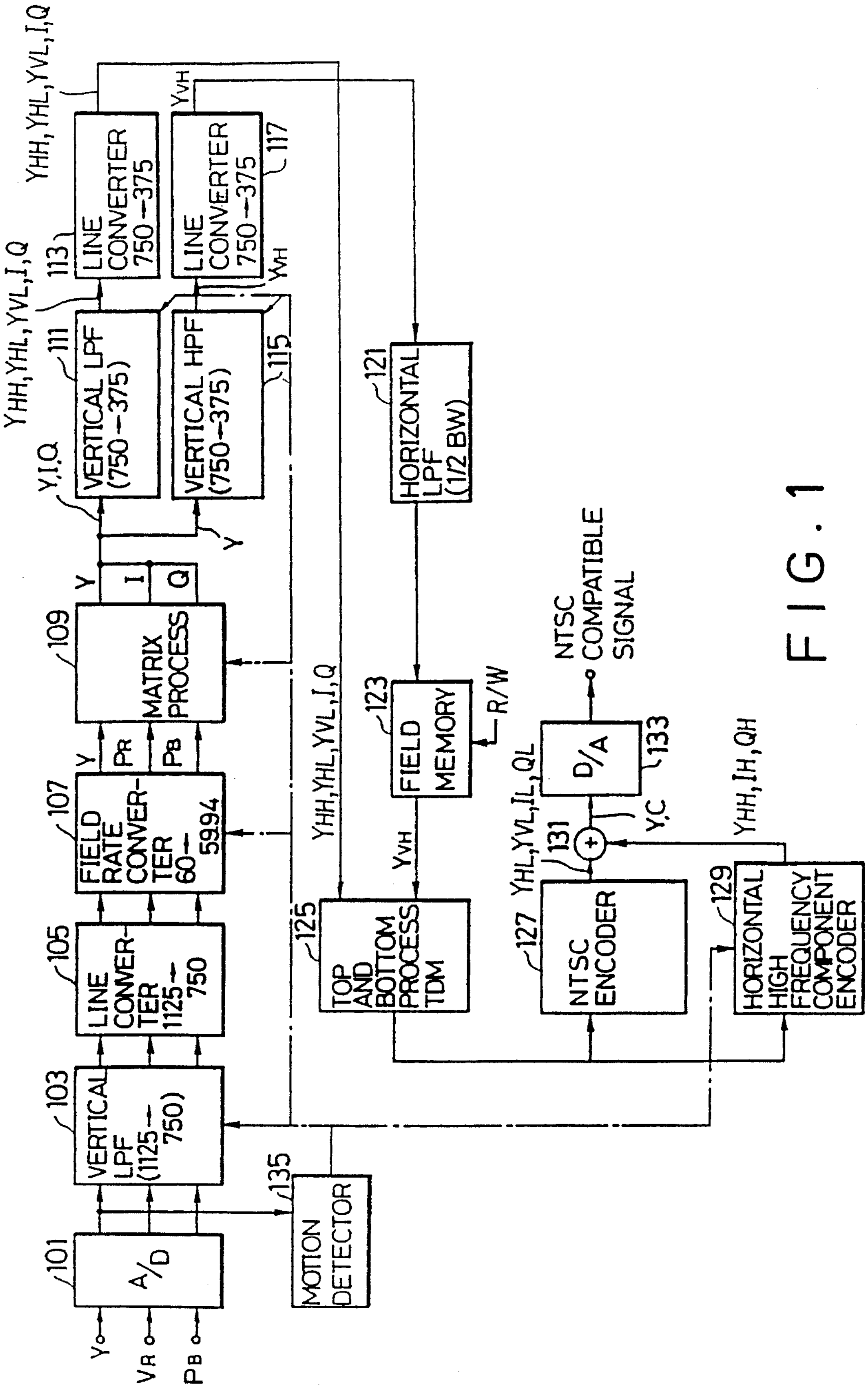
FIG. 1 is a block diagram showing one embodiment of an encoder according to the present invention.

FIG. 1 is a block diagram showing one embodiment of an encoder according to the present invention. A base band high resolution, high frequency content video signal, such as an 1125/60 color video signal (fourth television signal in claim 1), is applied to an analog to digital converter 101. The resulting digital signal includes a luminance component Y, and chrominance components $P_R$ and $P_B$. This signal is then applied to a vertical low pass filter 103 which reduces the vertical resolution information in a picture frame from 1125 lines to 750 lines. The signal from the filter 103 is then inputted to a line converter 105 which converts the frame from an 1125 line signal to a 750 line signal. The signal from the line converter 105 is then transmitted to a field rate converter 107 which converts the scanning rate from 60 fields per second to 59.94 fields per second to conform to NTSC specifications. However, the field rate converter 107 may be used to change the field scanning rate to any rate that may be used with a particular standard television broadcast system, such as 50 fields per second. The field converted Y, $P_R$ and $P_B$ Signals are then inputted to a matrix circuit 109 to obtain a second television signal having luminance Y and chrominance signals I and Q.

The 750/59.94 signals Y, I and Q are then inputted to a vertical low pass filter 111 which reduces vertical resolution information from 750 lines to 375 lines to obtain horizontal high and low frequency luminance components $Y_{HH}$ and $Y_{HL}$, a vertical low frequency luminance components $Y_{VL}$ and chrominance signals I and Q. The output signals from the vertical low pass filter 111 are converted from the 750 line signal into a 375 line signal by a line converter 113 to obtain the signals $Y_{HH}$, $Y_{HL}$, $Y_{VL}$, I and Q. The field converted luminance signal Y is also applied to a vertical high pass filter 115 to obtain a vertical high frequency luminance component $Y_{VH}$. The signal $Y_{VH}$ having 375 vertical lines of resolution information is inputted to a line converter 117 which converts this $Y_{VH}$ signal to a 375 line $Y_{VH}$ signal. It is to be noted that the processes for the low and high vertical resolution component signals are conducted for the luminance signal Y.

The high vertical resolution signal $Y_{VH}$ is inputted to a horizontal low pass filter 121 which serves to reduce the bandwidth of the signal to one half (½). The output signal from the filter 121 is then inputted to a line converter/time compression circuit 123 which converts the output signal into a 160 line signal and also the 160 line signal is time compressed by a factor of 2. It is to be noted that the effect of time compression by a factor of 2 is to decrease the number of lines and restore the bandwidth that is restricted by the horizontal low pass filter 121. The circuit 123 can be formed by a field memory.

The horizontal components $Y_{HH}$ and $Y_{HL}$, the low vertical resolution component $Y_{VL}$ and the chrominance signals I and Q from the line converter 113 and the high vertical resolution component $Y_{VH}$ from the line converter 117 are inputted to a top and bottom time division multiplexer 125. The signal from the top and bottom time division multiplexer 125 is inputted to an NTSC encoder 127 and a horizontal high frequency component encoder 129. The outputs $Y_{HL}$, $Y_{VL}$, $I_L$ and $Q_L$ from the encoder 127 and the outputs $Y_{HH}$, $I_H$ and $Q_H$ from the encoder 129 are added in an adder 131. The added output signal is then converted into analog form in a D/A converter 133 to be outputted as an NTSC compatible signal (third television signal), which can be used to modulate a video carrier signal for terrestrial transmission. Here, the suffix "L" and "H" in the I and Q signals mean low and high frequency components, respectively. Further, in the specification and the claims, a conventional NTSC signal is referred to as the first television signal.

A motion detector 135 receives the luminance signal Y from the A/D converter 101 to detect a motion in an image to control the operation of the circuits 103, 107, 109, 111, 115 and 129 in accordance with the detected motion signal. Since the eye cannot resolve moving portions of an image as high a degree as still portions, such elimination of high frequency motion components has no significant effect on the perceived resolution of the image.

(2) GENERAL ARRANGEMENT OF A DECODER

Figure 2:
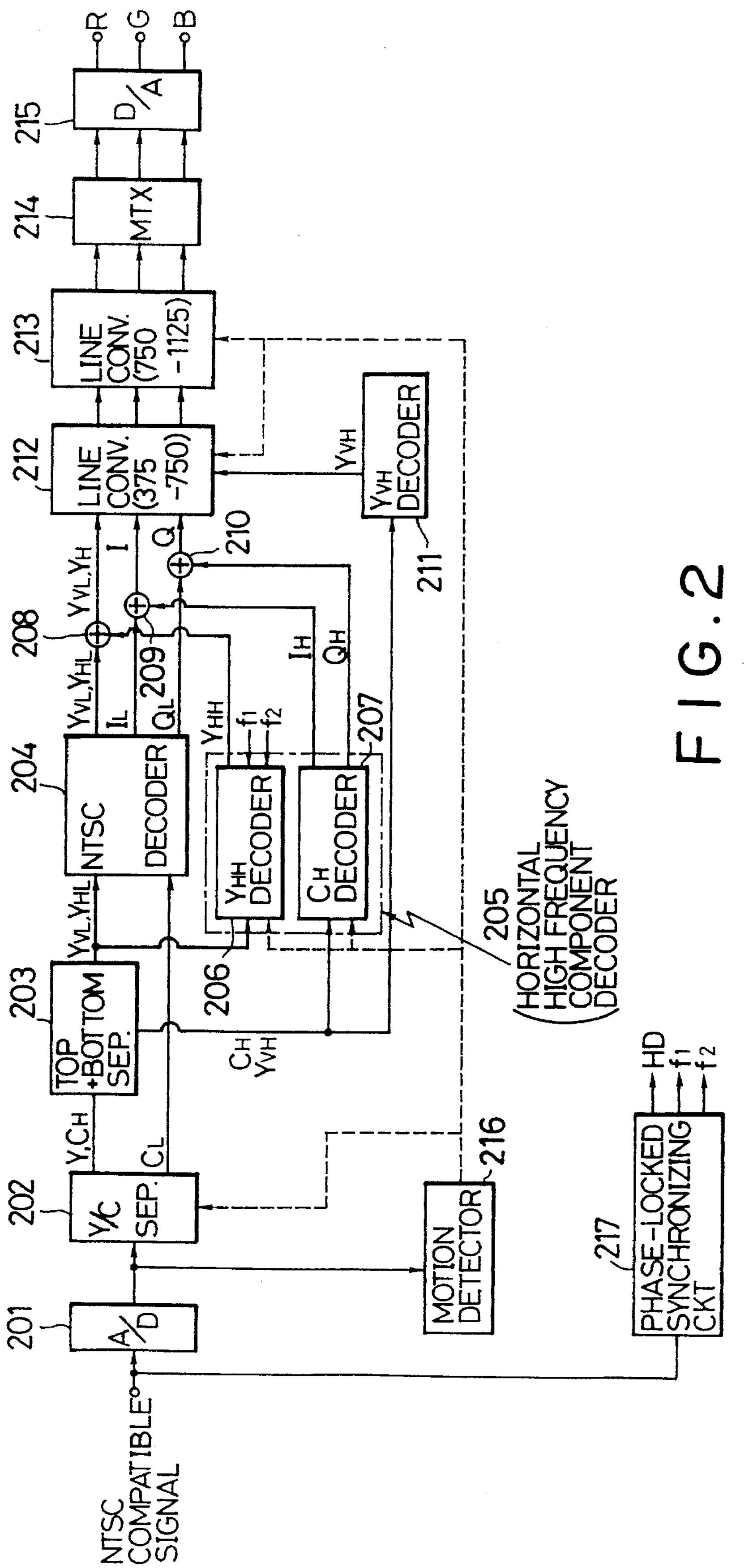
FIG. 2 is a block diagram showing one embodiment of a decoder according to the present invention.

FIG. 2 is a block diagram showing an embodiment of a decoder according to the present invention. In FIG. 2, an input NTSC compatible signal (third television signal) is converted into a digital signal in an analog to digital converter 201. The digital signal converted is inputted to a motion detector 216 and a luminance/chrominance separator 202. The motion detector 216 is used to detect motion portions of the input picture signal and provides an output signal which controls operation of the circuits 202, 205, 212 and 213.

The Y/C separator 202 outputs separated luminance and high band chrominance signals Y and $C_H$, and a separated low band chrominance signal $C_L$. The signals Y and $C_H$ are supplied to a top and bottom separator 203, in which the top and bottom portions in one frame, i.e., the high band chrominance signal $C_H$ and the vertical high band luminance signal $Y_{VH}$ are separated from the center portion, i.e., the low band vertical luminance signal $Y_{VL}$ and a horizontal luminance signal $Y_H$ ($=Y_{HH}+Y_{HL}$).

The $C_L$ signal from the separator 202 and the $Y_{VL}$ and $Y_{HL}$ signals from the separator 203 are supplied to an NTSC decoder 204 from which the $Y_{VL}$ and $Y_{HL}$ Signals and the decoded low band chrominance signals $I_L$ and $Q_L$ are derived. The $Y_{VL}$ and $Y_{HL}$ signals and the $Y_{VH}$ and $C_H$ signals from the separator 203 are supplied to a horizontal high frequency component decoder 205 having a $Y_{HH}$ decoder 206 and a $C_H$ decoder 207, both of which are controlled by the motion detection signal. The $Y_{HH}$ decoder 206 receives the $Y_{VL}$ and $Y_H$ signals to decode the high band horizontal luminance signal $Y_{HH}$. The $C_H$ decoder 207 receives the $C_H$ and $Y_{VH}$ signals to decode the high band chrominance signals $I_H$ and $Q_H$.

The $Y_{VL}$ and $Y_{HL}$ signals from the NTSC decoder 204 is added to the $Y_{HH}$ signal from the $Y_{HH}$ decoder 206 in an adder 208 to output the combined $Y_{VL}$ and $Y_H$ signals. The $I_L$ signal from the NTSC decoder 204 is added to the $I_H$ signal from the $C_H$ decoder 207 in an adder 209 to output the combined I signal. The $Q_L$ signal from the NTSC decoder 204 is added to the $Q_H$ signal from the $C_H$ decoder 207 in an adder 210 to output the combined Q signal. The $C_H$ and $Y_{VH}$ signals from the top and bottom separator 203 are applied to a $Y_{VH}$ decoder 211 to decode the vertical high band luminance signal $Y_{VH}$.

The output signals $Y_{VL}+Y_{VH}$, I and Q from the respective adders 208, 209 and 210 and the $Y_{VH}$ signal from the $Y_{VH}$ decoder 211 are applied to a line converter 212 in which a 375 line NTSC signal is converted into a 750 line signal as the decoded second television signal. The 750 line signal is further converted into an 1125 line signal by a second line converter 213. Further, the 750 line signal can be converted into a signal having any desired number of lines in one frame. In this embodiment, as a result that the 375 line NTSC signal is processed by the line converters 212 and 213, the aspect ratio is also converted from 4:3 to 16:9.

The Y, I and Q signals from the line converter 213 are inputted to a matrix circuit 214 to obtain the R, G and B signals which are further converted into analog signals in a digital to analog converter 215, and are outputted as the decoded fourth television signal to a display monitor such as a CRT. It is to be noted that the conventional NTSC signal is referred to as the first television signal.

Reference numeral 217 denotes a phase-locked synchronizing circuit for generating the HD signal and the carrier signals $f_1$ and $f_2$ to be used in the decoder 206. The HD signal is used as a timing reference in various blocks in FIG. 2 in a conventional manner. The actual connection for supplying the HD signal is omitted in FIG. 2 to simplify the arrangement.

(3) DETAILS OF THE ENCODER

Embodiments of various portions of the encoder shown in FIG. 1 will now be described in detail with reference to FIGS. 3A, 3B through 32.

(3.1) SIGNAL ASSIGNMENT TO THE TOP AND BOTTOM REGIONS OF AN NTSC IMAGE FRAME (3.1.1) $V_H$ PROCESSING

Figure 3A:
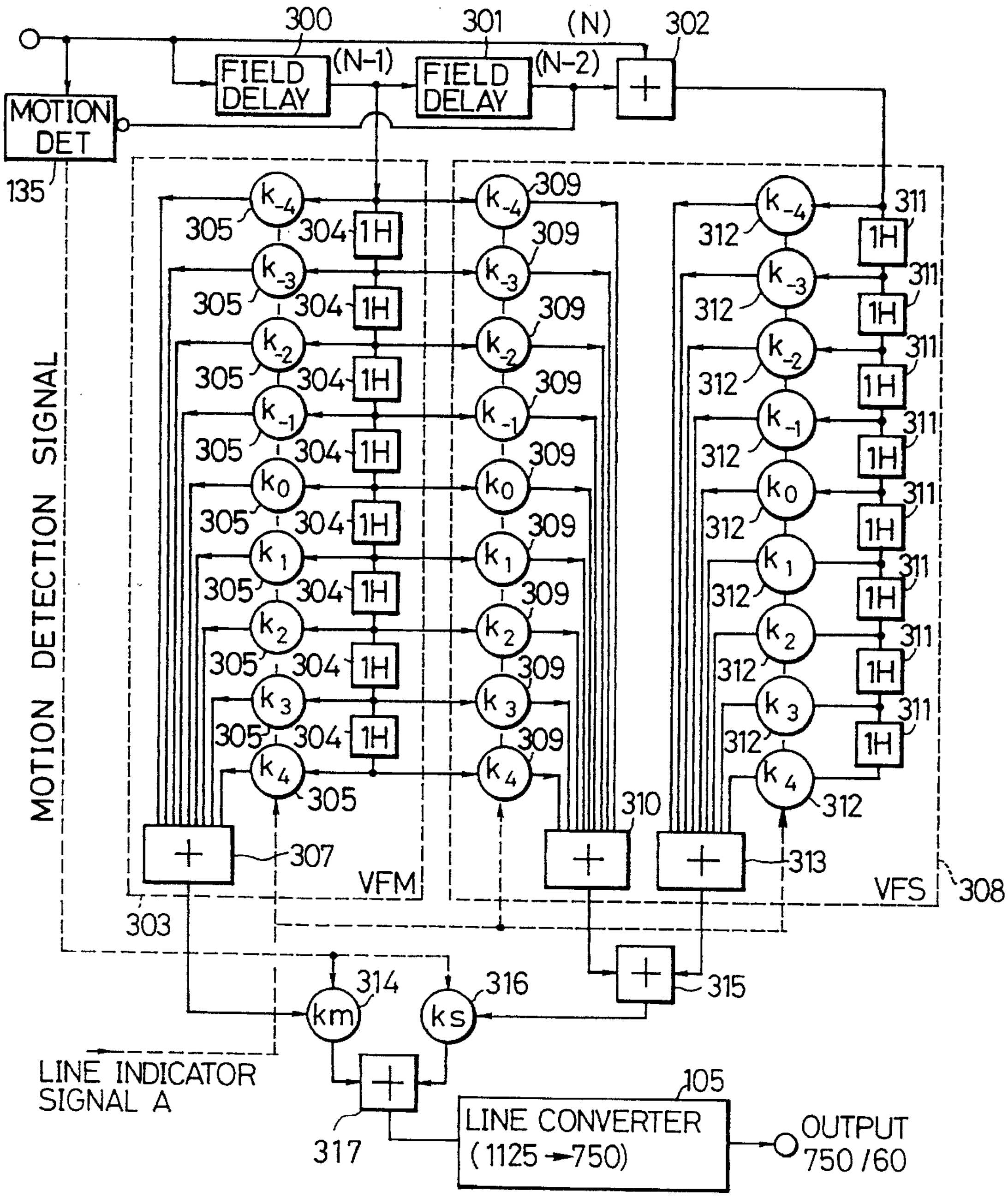
FIG. 3A is a block diagram showing one embodiment of the line converter circuit in the encoder shown in FIG. 1.

FIG. 3A illustrates an embodiment of the vertical low pass filter 103 shown in FIG. 1 which is used to change the vertical resolution of an input 1125/60 signal into an output 750/60 signal. The 1125/60 input signal is inputted to a field delay memory 300, an output from which is applied to a second field delay memory 301. The input 1125/60 signal and the output from the field delay circuit 301 are supplied to an adder 302. The output from the field delay memory 300 is inputted to a vertical filter for moving portions (VFM) 303 having a plurality of line delay circuits (1H) 304 each having a weighting circuit 305 of a tap coefficient $k_n$ (n=−4, . . . +4) which is used to weight the output from each delay circuit 304. The outputs of the line delay circuits are inputted to an adder 307. Reference numeral 308 denotes a vertical filter for stationary portions (VFS) having weighting circuits 309 each having a tap coefficient $k_n$ (n=−4, . . . , +4). The outputs of the weighting circuits 309 are inputted to an adder 310. The VFS 308 also has a plurality of line delay circuits (1H) 311 each having a weighting circuit 312 of a tap coefficient $k_n$ (n=−4, . . . , +4). The outputs of the weighting circuits 312 is inputted to an adder 313. Whether or not the weighting is performed by the weighting circuits 305, 309 and 312 is controlled by the line indicator signals A from the timing generator 150 in accordance with a predetermined line conversion relationship (for example, 1125 to 750) so that the tap coefficients $k_n$ are either 1 or 0 based upon the vertical scanning position of the present field.

The output from the adder 303 is applied to a weighting circuit 314 having a tap coefficient $k_m$. The outputs from the adders 310 and 313 are inputted to an adder 315, the output of which is supplied to a weighting circuit 316 having a tap coefficient $k_s$. The weighting circuits 314 and 316 are controlled by the motion detector 135 which detects motion between frames to output a motion detection signal in response to moving portions thereof. The motion detection signal controls the outputs of tap coefficients km and $k_s$ such that $k_s$=1 and $k_m$=0 for stationary portions of the signal, while $k_s$=0 and $k_m$=1 for moving portions. For stationary portions of the signal, interfield processing is performed such that information from the present field N is used with information from the two previous adjacent fields N-1 and N-2 to produce 750 lines of information. The present field N is combined with the field information of the second next adjacent field N-2 in the adder 302 and supplied to the line delay circuits 311 of the filter 308. These lines are weighted by the coefficients kn in the weighting circuit 312 and are added in the adder 313. Meanwhile, information from field N-1 is inputted to the line delay circuits 304 of the filter 303, weighted by coefficient $k_n$ in the weighting circuit 309, and are added in the adder 310. The signals from the adders 310 and 313 are combined in the adder 315.

The vertical scanning pattern is divided over 4 successive fields. For moving portions of the signal, interfield processing cannot be utilized because of multi-line artifacts. Therefore, the 750 line signal is produced using information from the middle field N-1 only as intrafield processing. These lines are selectively combined in the adder 307. The motion detector 135 controls the weighting circuits 314 and 316 to allow the signals from the adder 315 or the adder 307 to be inputted to an input circuit or adder 317, the signals from which are horizontally time base corrected by the line converter 105 to output a 750/60 signal. The line converter can be arranged by a frame buffer memory for storing data on 1125 horizontal lines. The line conversion is performed by extracting 750 lines out of 1125 lines according to a predetermined interval at a reduced reading speed of read clocks by 750/1125. This arrangement is similar to an arrangement shown in FIG. 3A.

Figure 3B:
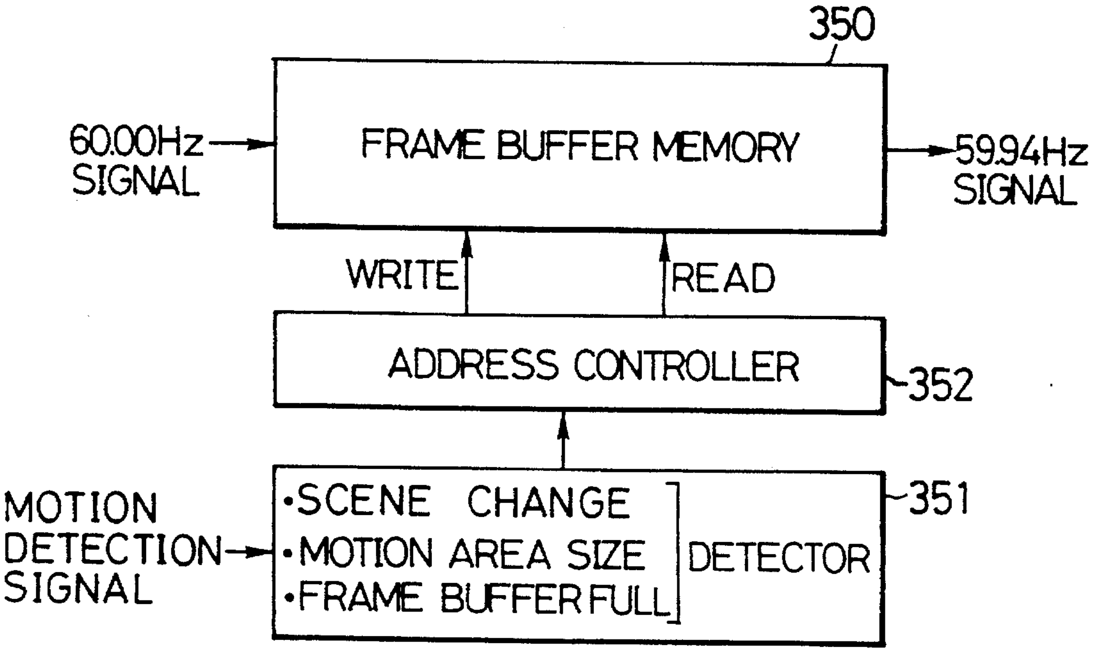
FIG. 3B shows a block diagram of one embodiment of the field rate converter circuit in the encoder shown in FIG. 1.

The field rate conversion circuit 107 shown in FIG. 1 is illustrated in FIG. 3B. The 750/60 signal from the line converter 105 is read into a frame buffer 350 which is capable of simultaneous read and write operations. The picture information is written into the frame buffer memory 350 at the timing of a 60 Hz synchronizing signal, and is read out at the timing of a 59.94 Hz synchronizing signal. By utilizing the signal from the motion detection circuit 135, the total moving area is measured to determine whether the field consists of motion information or not. Since the signal of 60 fields per second varies from the signal of 59.94 fields per second by the ratio of 1 field every 1000 fields, a picture frame must be skipped after a certain period of time according to the following conditions being met by a detector 351: whenever there is no motion in the picture, when there is a scene change in the flow of pictures, when the area of motion is relatively small, or when the remaining capacity of the frame buffer memory 350 is insufficient. The detector 351 refreshes and updates the address signal produced by an address controller 352 to suitably skip a picture frame within the predetermined interval.

Referring again to FIG. 1, the field converted luminance signal Y and the field converted color signals $P_R$ and $P_B$ are inputted to the matrix 109 to obtain Y, I and Q signals (second television signal, collectively) which are inputted to the vertical low pass filter 111 to produce a 750 line signal having 375 lines of vertical resolution information. The vertical low pass filter 111 is similar in construction to the filter shown in FIG. 3A. Similarly, the line converters 113 and 117 operate similar to the line conversion portion of the circuit shown in FIG. 3A.

Figure 4:
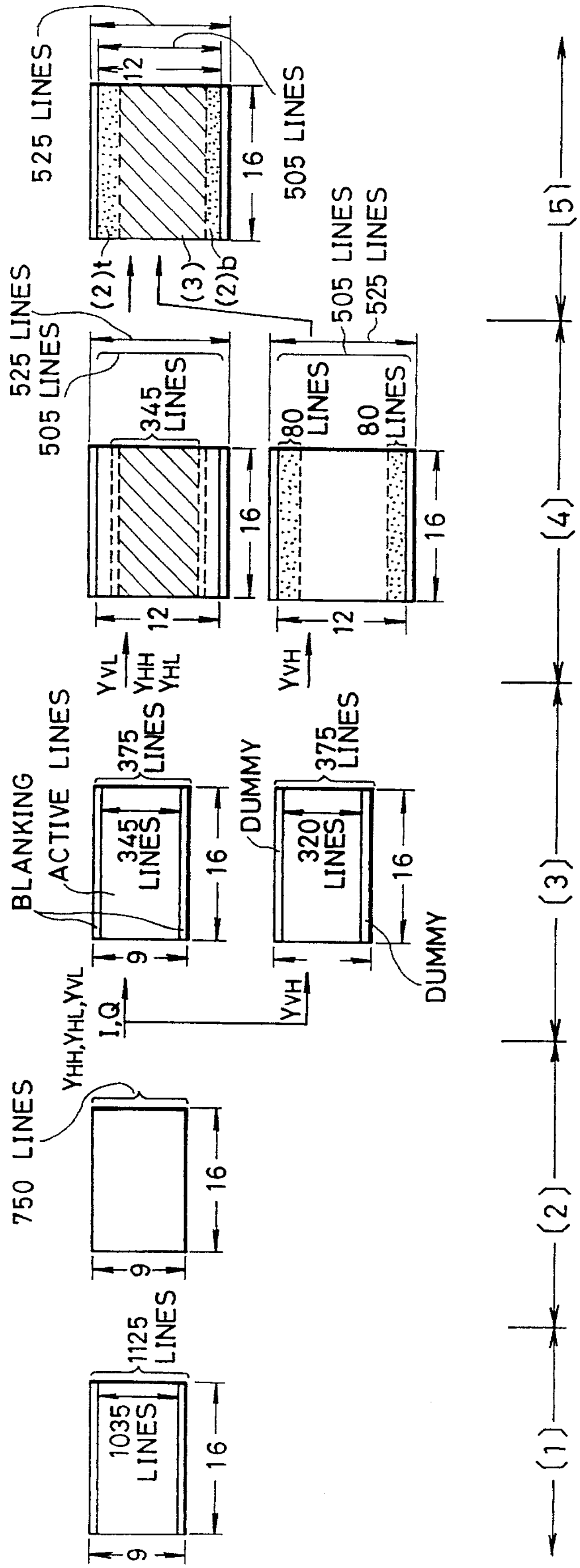
FIGS. 4 and 4A are graphical illustrations showing the concept of line compression and time division multiplexing which is carried out by the encoder shown in FIG. 1.

FIG. 4 is a graphic illustration of the separation of the input broad bandwidth television signal, i.e., the 1125/60 signal into vertical low and high resolution luminance components $Y_{VL}$ and $Y_{VH}$ and the corresponding time compression and time division multiplexing of the vertical high resolution luminance component $Y_{VH}$ onto the top and bottom portions of an NTSC frame. Here, the explanation of the I and Q signals are omitted for the sake of simplicity. The separation of the high and low bandwidths of the I and Q signals are processed in the NTSC encoder 127 and the horizontal high frequency component encoder 129.

In FIG. 4, portion (1) shows the input 1125/60 signal having 1035 active lines, which is first converted into a 750/60 signal by the line converter 105 as shown in portion (2). The 750 signal is separated by the filters 111 and 115 into a vertical high resolution luminance component signal $Y_{VH}$ and the remaining components, i.e., horizontal low and high frequency luminance components $Y_{HL}$ and $Y_{HH}$ (and the I and Q signal components as well) as shown in portion (3). In portion (3), the number of lines in the signal $Y_{VL}$ and the signals $Y_{HL}$ and $Y_{HH}$ are converted to 375 lines from 750 lines by the line converter 113. The number of lines in the signal $Y_{VH}$ is also converted to 375 lines from 750 lines by the line converter 117. The signal $Y_{VH}$ has 375 lines in total, of which the information on the 55 lines in the top and bottom area of one frame is deleted. The signals $Y_{HH}$ and $Y_{HL}$ have 345 active lines and the 30 blanking lines.

Figure 4A:
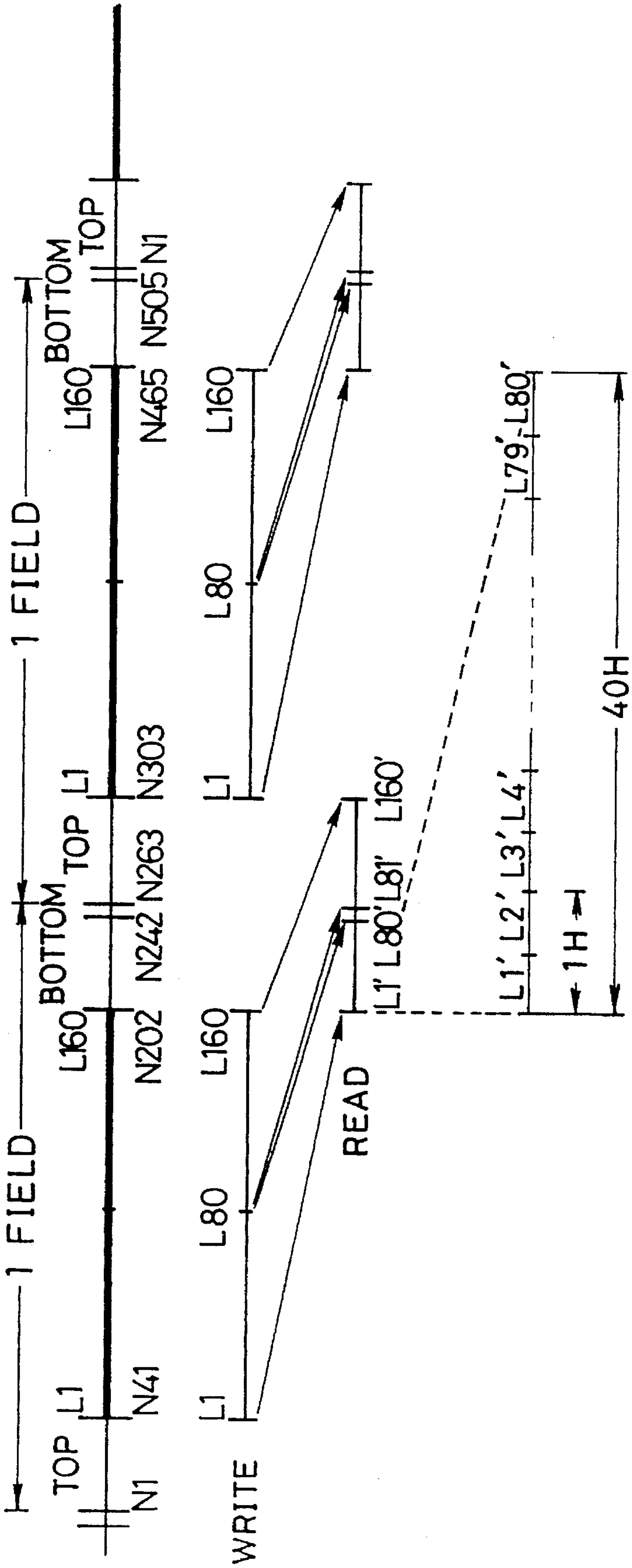

The signal $Y_{VH}$ is applied to the low pass filter 121 to reduce the pass bandwidth to one half. The output from the filter 121 is applied to the field memory 123 where the time axis of the signal is compressed by the factor of 2 and the number of lines of the signal $Y_{VH}$ is reduced to one half by controlling the reading speed of the memory 123. In FIG. 4A, the $Y_{VH}$ signal on the 160 lines L1–L160 ($N_{41}$–$N_{202}$ in terms of one NTSC field) is time axis compressed to form the 160 lines L1'–L160' having a line length (H/2) equal to half of one normal NTSC line (1H). Here, the compressed lines L1'–L80' are allotted to the bottom portion of the present field and the compressed lines L81'-L160' are allotted to the upper portion of the next field, as illustrated in FIG. 4A. It is to be noted that FIG. 4A illustrates the interlace relation, so that each of the top or bottom portions in two adjacent fields includes 80 lines. As a result, the number of lines of the signal obtained from the time compression/line conversion field memory 123 is 375×½ lines. The 80×2=160 lines of the 375/2 line signal are multiplexed onto the top and bottom 80 line portions of the NTSC picture frame to make up the standard 505 active line frame (525 lines in total) as shown in portion (4) by the top and bottom TDM circuit 125. The remaining signals $Y_{HH}$, $Y_{HL}$ and $Y_{VL}$ are supplied to the top and bottom TDM circuit 125 from the line converter 113 so that these signals having 345 active lines are allotted to the central 345 line portions of an NTSC picture frame as shown in portion (4). The top and bottom TDM circuit 125 then combines the component $Y_{VH}$ with the components $Y_{HH}$, $Y_{HL}$ and $Y_{VL}$ (including the I and Q signals) to form a composite signal as shown in portion (5) of FIG. 4. The composite signal is supplied to the NTSC encoder 127 and the horizontal high frequency component encoder 129.

It should be understood that the same approach can be applied to a progressive scanning system wherein the high frequency band signal would be inserted into continuous lower and upper portions of succeeding complete frame transmissions. The term "field" as used herein is thus intended to apply as well to a complete frame as applied to such an approach. The term "frame" as used herein is also intended to apply to the physical dimensions of the displayed image. "Upper and lower portions of the frame" thus, refers also to the upper and lower portions of the television picture image as well as to the location of such signals in the time domain.

Figure 5:
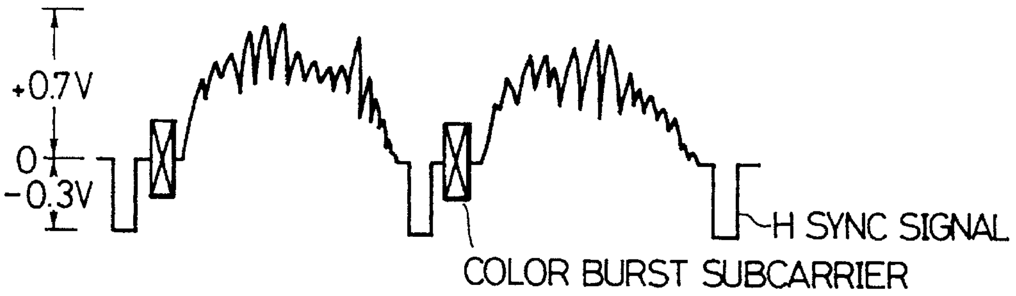
FIG. 5 illustrates a waveform of a typical NTSC video signal in the time domain.

FIG. 5 illustrates a typical NTSC signal waveform of the color burst subcarrier and luminance signal along with the horizontal synchronizing signal.

Figure 6:
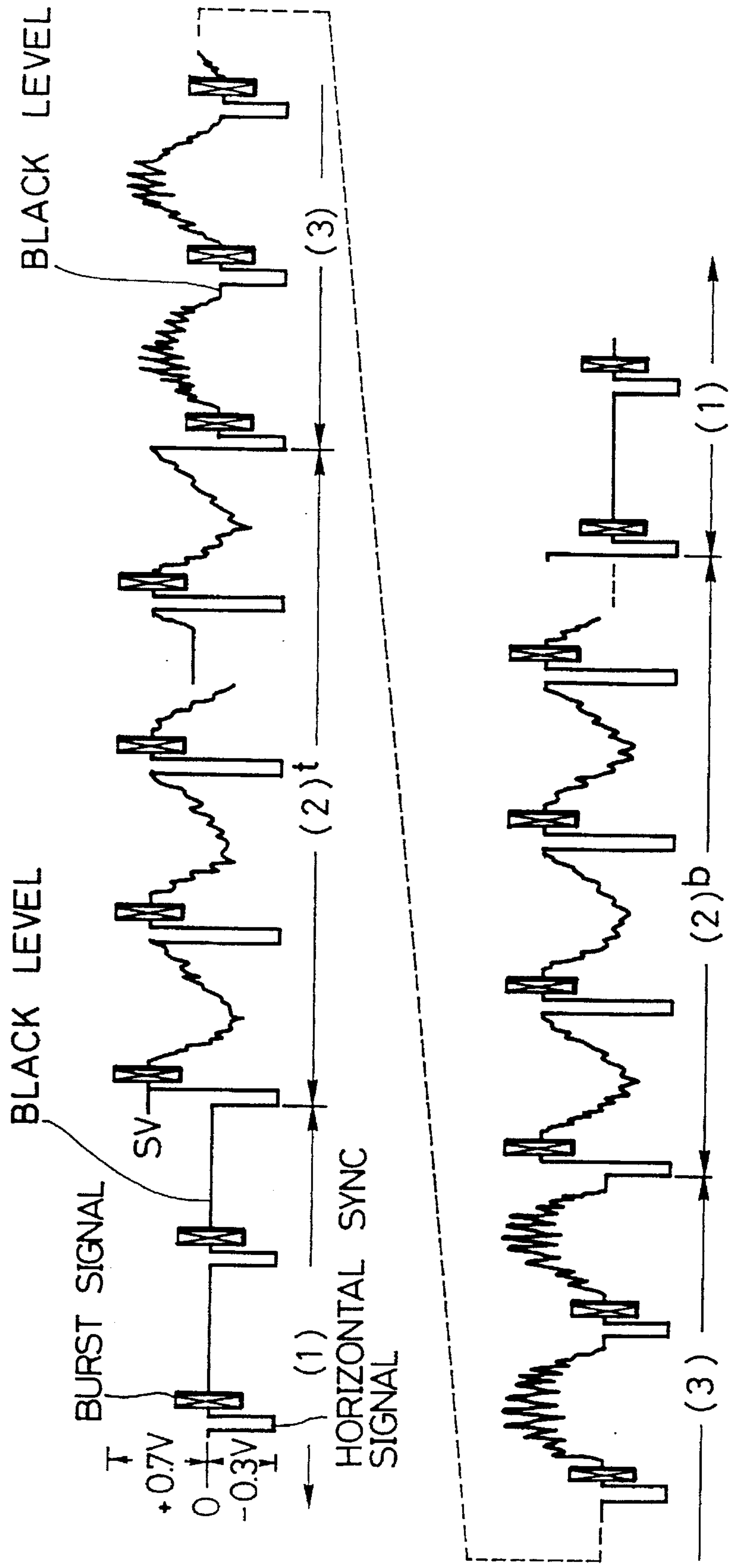
FIG. 6 illustrates a time domain waveform of a high resolution video signal that is compatible with NTSC signal reception.

FIG. 6 is an example of an NTSC compatible signal waveform generated by the NTSC encoder 127, the horizontal high frequency component encoder 129, the adder 131 and the D/A converter 133 according to the present invention. Interval (1) illustrates a vertical blanking interval waveform which is provided to allow electron beam retrace from the bottom to the top of the display screen. Interval (2) illustrates the waveform of the vertical high resolution luminance component $Y_{VH}$ graphically shown as the top and bottom 80 lines in portion (4) in FIG. 4. While the waveform of this vertical high resolution luminance component is very similar to the waveform shown in FIG. 5, the level of the waveform in interval (2)*t* (top) or (2)*b* (bottom) in FIG. 6 is designed for minimum interference with the display of an image in the top and bottom portions of an image frame (each 80 lines in portion (4) of FIG. 4) by setting the pedestal level SV at a value above the black level, for example ±0.4 V, such that the waveform of the vertical high resolution luminance component (negative polarity) is combined in a manner that the waveform is substantially lower than the pedestal level SV, which can be referred to as the black level in interval (2)*t* or (2)*b*, so that interfering dot patterns on the display screen may be avoided. Interval (3) in FIG. 6 illustrates the waveform of the luminance horizontal component $Y_H$, the luminance vertical low resolution component $Y_{VL}$, and the $I_L$ and $Q_L$ signals shown as the center 345 lines in portion (4) in FIG. 4. The waveform in interval (3) is substantially at or above the black level.

Figure 7:
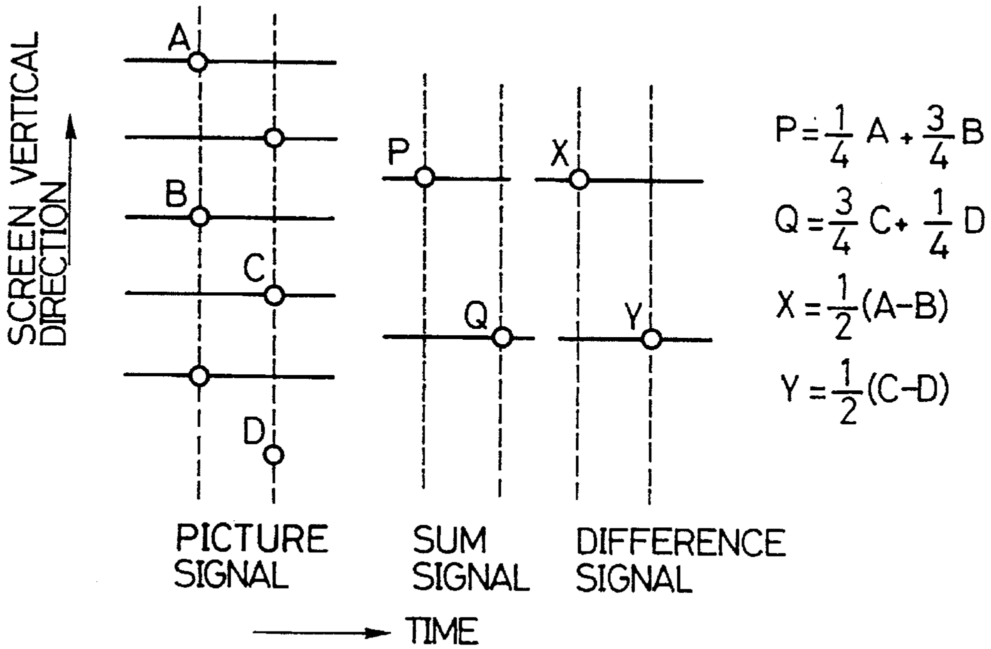
FIGS. 7 and 8 are an explanatory diagram and a block diagram explaining and showing another embodiment of a portion of the circuits shown in FIG. 1, respectively.
Figure 8:
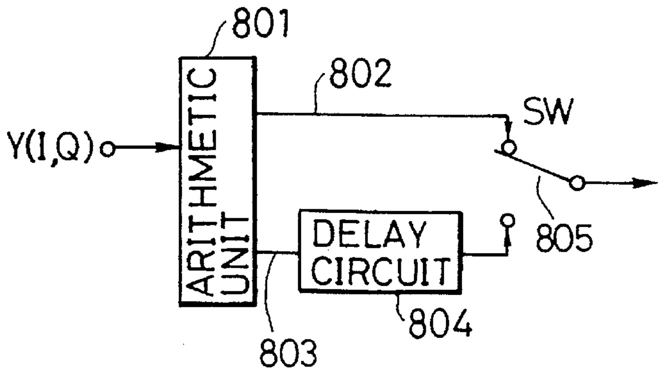

FIGS. 7 and 8 show another embodiment in which the vertical high and low resolution components are separated and the separated components are time division multiplexed. The embodiment corresponds to the circuits 111, 113, 115, 117 and 125 in FIG. 1. Here, the signals on two adjacent lines are computed to obtain an addition signal and a subtraction signal which correspond, respectively, to the vertical low and high frequency signals. Accordingly, the time division multiplexing is so performed that the addition signal is assigned to the portion having center scanning lines, and that the subtraction signal is assigned to the top and bottom line portions. The mere subtraction, however, may cause an interference.

With this in view, the computation shown in FIG. 7 is employed here. That is, it is assumed that the positions of the broad bandwidth signal from on the display screen are A, B, C, D, . . . and that the display positions of the addition signals are P, Q, . . . , the weighted arithmetic average signal can be expressed as follows:

$$P=(1/4)A+(3/4)B$$

$$Q=(3/4)C+(1/4)D.$$

These relations are completely identical with the conventional relation. However, the weighted subtraction signals are expressed as follows, if the display positions thereof are assumed to be X, Y, . . . :

$$X=(A-B)/2$$

$$Y=(C-D)/2.$$

As seen from these equations, the weighting coefficients are quite different from those in the conventional relation, so that the DC component of the picture signal can be completely removed from the subtraction signal. Accordingly, this subtraction signal becomes substantially equal to zero when there is no high frequency component in the picture signal in the vertical direction. Thus, the foregoing interference on the television receiver is approximately completely eliminated.

FIG. 8 is a schematic block diagram showing a specific construction of the transmission system of the present invention into which this operation technique is incorporated.

The input picture signal is processed in an arithmetic unit 801 according to the above-described equations to obtain an average value signal 802 and a difference signal 803. In order to assign these signals to the center line portion and the top and bottom line portions to time division multiplex the signals, the difference signal 803 is delayed by a delay circuit 804 and both the signals are switched by a switch 805 to form a multiplexed signal. The switch 805 forms a part of the top and bottom TDM circuit 125.

(3.1.2) $C_H$ PROCESSING

Figure 9:
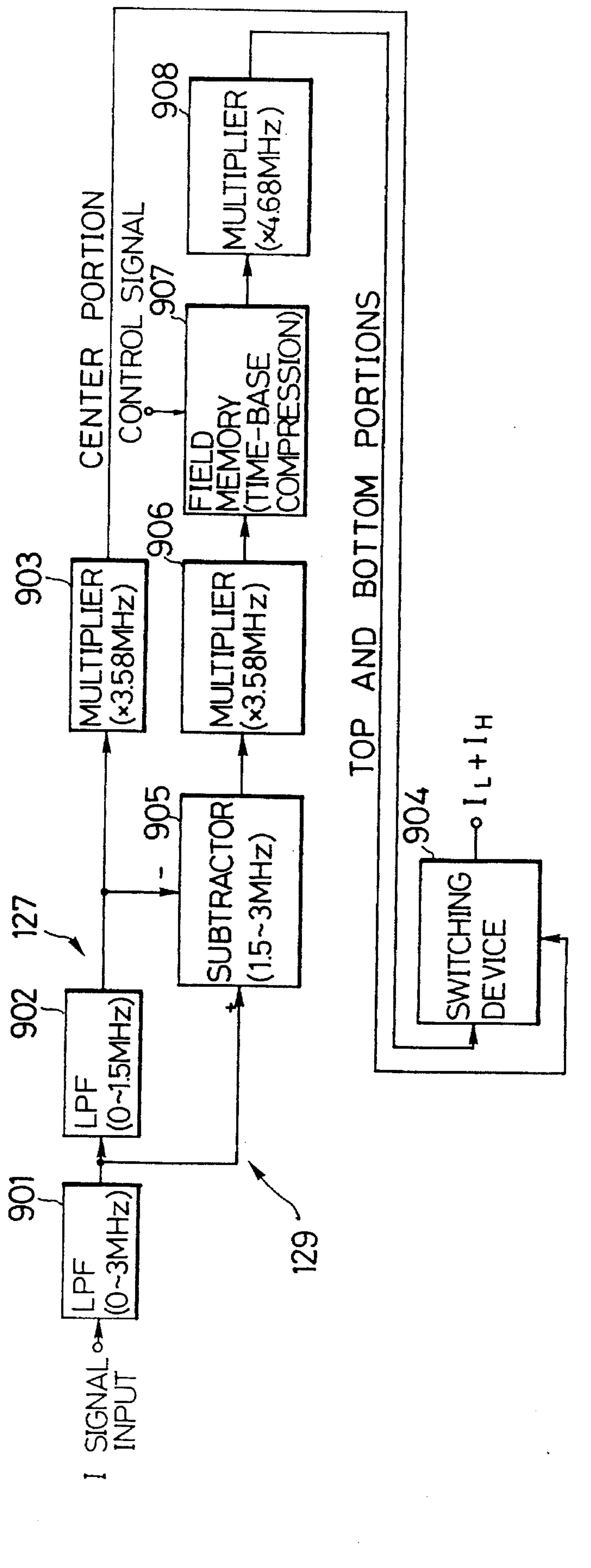
Figure 11:
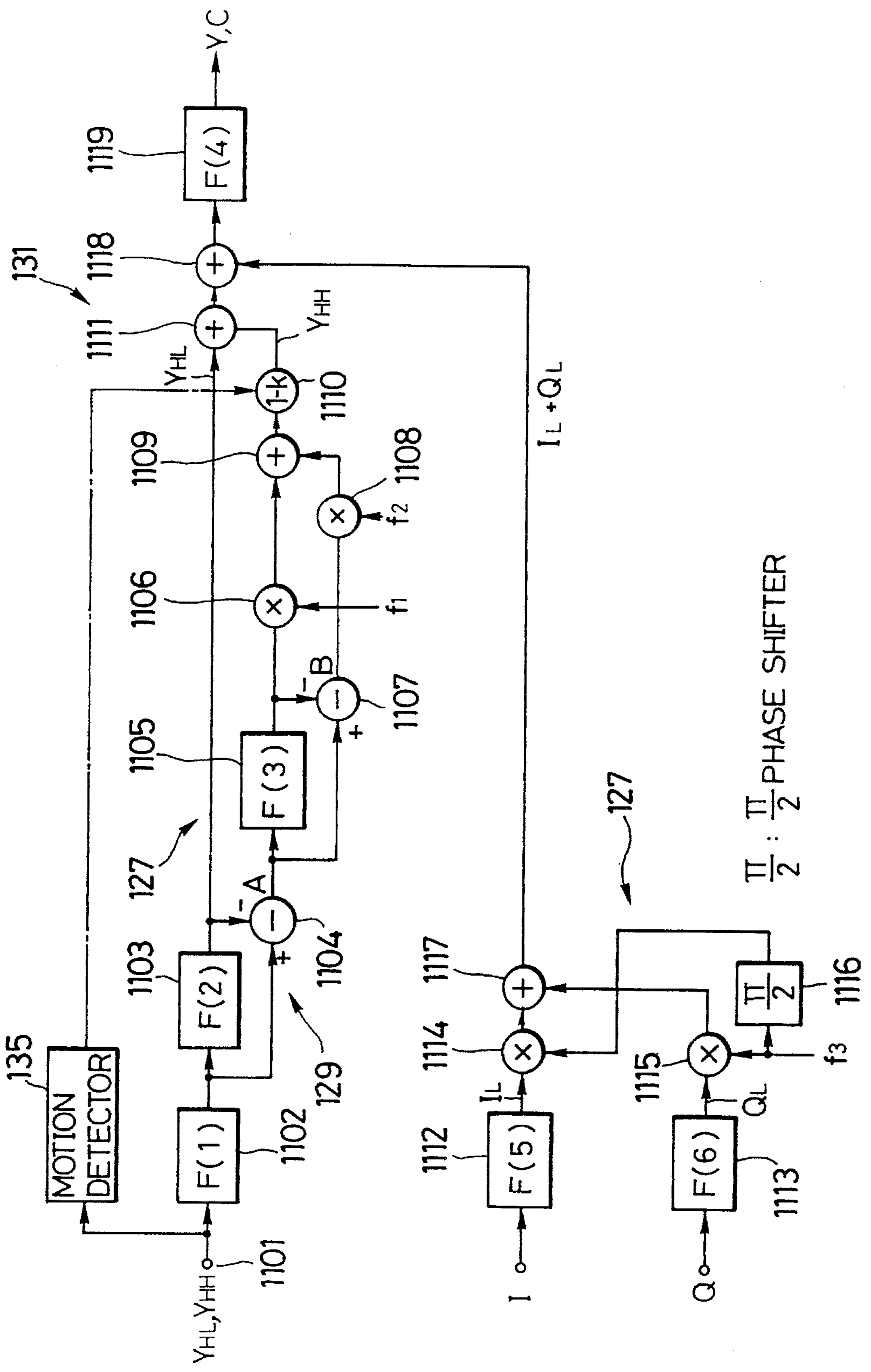
FIG. 11 is a block diagram showing the horizontal high frequency component encoder 129 shown in FIG. 1.

An embodiment of the encoders 127 and 129 is shown in FIG. 9. While FIG. 9 shows only the channel for processing the I signal input, the Q signal is also processed in substantially similar way in a different channel for the Q signal. Further, the channel for the luminance signal is shown in FIG. 11.

Figure 9A:
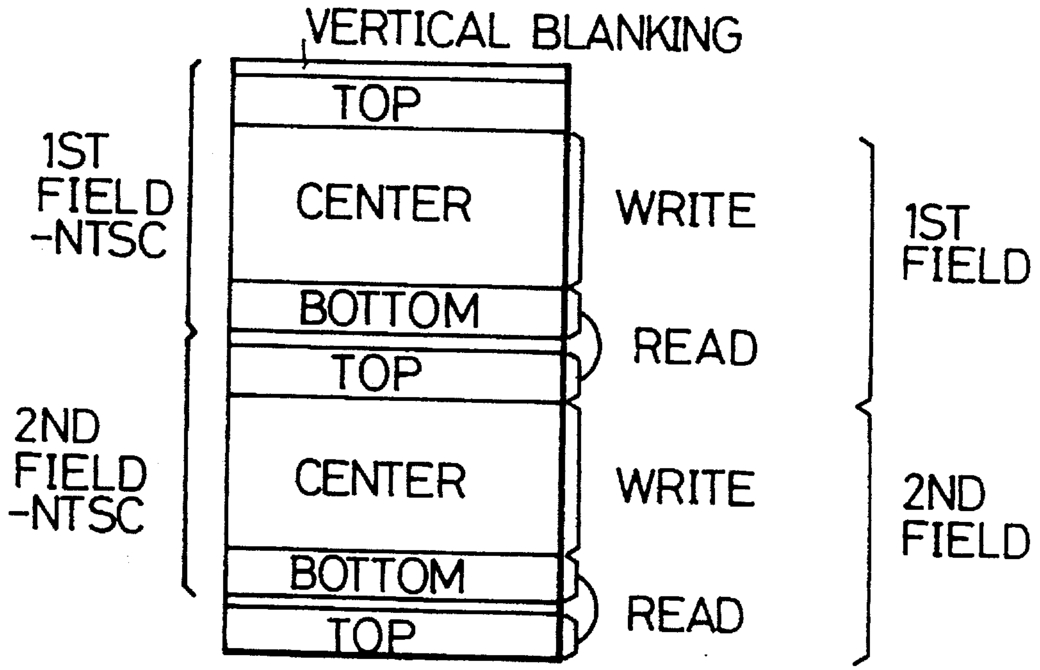
FIG. 9A illustrates the signal timings in the field memory 907 shown in FIG. 9.

The input I signal is passed through a low pass filter 901 for limiting the bandwidth of the I signal to 0–3 MHz. The output from the filter 902 is passed through a low pass filter 902 for limiting the 3 MHz bandwidth signal to 0–1.5 MHz. The output $I_L$ from the filter 902 is applied to a multiplier 903 for multiplying the signal $I_L$ by a 3.58 MHz carrier signal to obtain a modulated signal modulated by the signal $I_L$ for the purpose of interleaving between the modulated $I_L$ signal and the Y signal. The signal from the multiplier 903 is then switched through a switching device 904 to output the central portion of the NTSC picture frame as shown in FIG. 9A. The output from the filter 901 is also applied to a subtractor 905, so that the high frequency component $I_H$ of the I signal between 1.5 MHz and 3 MHz is obtained from the subtractor 905. The output from the subtractor 905 is applied to a multiplier 906 where the signal is multiplied by a 3.58 MHz carrier signal. The multiplied output from the multiplier 906 is applied to a field memory 907 in which the signal is time compressed by a factor of 2 by controlling the reading timing for the purpose of the shifting of the $I_H$ signal to the top and bottom portions of a frame.

Here, the field memory 907 has the same functions as the field memory 123 (FIG. 1), so that the field memory 907 operates in a manner similar to the operation of the field memory 123, as shown in FIG. 4A. The output from the field memory 907 is further supplied to a multiplier 908 where the signal is multiplied by a 4.68 MHz signal to shift the frequency band of the signal to a higher frequency range with an interleaving relationship between the $I_H$ and $Y_{VH}$ components to reduce the interference with the signal $Y_{VH}$. The output from the multiplier 908 forms the top and bottom line portions and is then supplied to the switching device 904 so that the signal is multiplexed onto the top and bottom portions of the NTSC picture fields as shown in FIG. 9A. The switching device 904 outputs an I signal output in which the high bandwidth signal is allotted continuously to the bottom portion of one field and the top portion of the succeeding field as illustrated in FIG. 9A.

Further, the Q signal is also processed in a manner similar to the I signal processing shown in FIG. 9, so that the time-axis compressed $I_H$ and $Q_H$ components are arranged in time division fashion on the same horizontal scanning line in the top and bottom portions.

FIG. 10 shows another embodiment of the encoders 127 and 129 shown in FIG. 1. According to the NTSC system, the I signal has a bandwidth of 1.5 MHz and the Q signal has a bandwidth of 0.5 MHz. In the present invention, the chrominance signal of the broad bandwidth color television signal also has a broad bandwidth chrominance signal, i.e., the I signal has a bandwidth of 3 MHz and the Q signal has a bandwidth of 2 MHz. In order that the chrominance signals have compatibility with the chrominance signal of the NTSC system, the bandwidth of the I signal is divided into the low frequency component (0–1.5 MHz)$I_L$ and the high frequency component (1.5–3 MHz)$I_H$, and the bandwidth of the Q signal is divided into the low frequency component (0–0.5 MHz)$Q_L$ and the high frequency component (0.5–2 MHz)$Q_H$. The low frequency components $I_L$ and $Q_L$ are supplied to the NTSC encoder 127. The high frequency components are supplied to the encoder 129, the detail of which will be explained hereinafter.

In FIG. 10, the I signal is inputted to a low pass filter 1001 for limiting the pass bandwidth to 0–3 MHz. The output of the filter 1001 is further applied to a low pass filter 1002 for limiting the pass bandwidth to 0–1.5 MHz. The outputs from the filters 1001 and 1002 are applied to a subtractor 1003, so that the I signal is divided into the signal of 0–1.5 MHz and the signal of 1.5–3 MHz. That is, the filter 1002 outputs the 0–1.5 MHz signal and the subtractor 1003 outputs the 1.5–3 MHz signal. Therefore, the characteristics of the 0–1.5 MHz signal and the 1.5–3 MHz signal around 1.5 MHz become complementary. In this respect, the 0–1.5 MHz signal of the I signal modulates a color subcarrier fsc of 3.58 MHz through a $\pi/2$ phase shifter 1004, in view of the relation with the Q signal which will be described below, like in the NTSC system, by a modulator 1005. The modulated output $I_L$ is transmitted through an adder 1006 to a switch 1007 as the adder 131 in FIG. 1. The signal $I_H$ of the 1.5–3 MHz component of the I signal from the subtractor 1003 modulates the color subcarrier fsc of 3.58 MHz in a modulator 1008 to obtain signals in a bandwidth of 0.58–2.08 MHz and a bandwidth of 5.08–6.58 MHz, of which the signal of 5.08–6.58 MHz is removed by a low pass filter 1009 having a pass bandwidth of 0–2.1 MHz and the signal of 0.58–2.08 MHz is derived from the low pass filter 1009.

On the other hand, the Q signal is inputted to a low pass filter 1010 to limit the output bandwidth to 0–2 MHz. Subsequently, like the processing of the signal I, the signal Q is divided into two signals $Q_L$ and $Q_H$, respectively, of 0–0.5 MHz and 0.5–2 MHz by a low pass filter 1011 and a subtractor 1012. The signal $Q_L$ of 0–0.5 MHz modulates, like the NTSC system, the color subcarrier fsc of 3.58 MHz in a modulator 1013. The modulated output is transmitted through the adder 1006 to the switch 1007. The signal $Q_H$ of 0.5–2 MHz is multiplexed, in field sequence, to the top and bottom portions of the NTSC signal, as will be described below.

The signal $I_H$ from the low pass filter 1009 and the signal $Q_H$ from the subtractor 1012 are switched by a switch 1014 at every field. In the case of still picture or a motion picture in the presence of slow motion, there is no problem in a reproduced signal, even if a field frequency is reduced by half due to the narrow bandwidth in the direction of movement. In the case of a motion picture in the presence of fast motion, the high frequency component of the color signals is small so that it is sufficient that the quantity of information to be transmitted is small. Therefore, it becomes possible to transmit the high frequency component of the color signal in field sequence.

The switched color signal from the switch 1014 is then supplied to a frame memory 1015 as a time-base compression circuit. The aspect ratio of the high definition television frame is 16:9, while that of the NTSC frame is 4:3, so that in a system in which the vertical direction is compressed to establish the aspect ratio of 16:9 on the screen of an NTSC television receiver, blank portions exist in the top and bottom portions of the frame. Each of the top and bottom portions has an area substantially equal to one half of the center portion. Thus, in order to allot the high frequency component of the chrominance signal to these narrow portions, the high frequency component is time compressed by the time axis compression circuit 1015 and is shifted to the top and bottom portions.

For instance, it is assumed that a compression ratio of the time axis compression is 1:2. Then, the bandwidth of the compressed signal component for the 0.58–2.08 MHz I signal from the low pass filter 1009 ranges from 1.16 MHz to 4.16 MHz and that for the 0.5–2.0 MHz Q signal from the subtractor 1012 ranges from 1.0 MHz to 4.0 MHz under the compression ratio. Accordingly, if a carrier wave f of 4.68 MHz, for instance, is modulated by a modulator or multiplier 1016, the bandwidth of the I signal becomes 0.52–3.52 MHz and 5.84–8.84 MHz, while the bandwidth of the Q signal becomes 0.68–3.68 MHz and 5.68–8.68 MHz. Among these signal components, the components having higher frequencies are removed (low pass filters for removing these components are omitted in FIG. 10) and the components having lower frequencies, i.e., the signal component of 0.52–3.52 MHz for the I signal and the signal component of 0.68–3.68 MHz for the Q signal are multiplexed to the top and bottom portions by the switch 1007. That is, the switch 1007 is shifted to the output side of the multiplier 1016 when the signal is for the top and bottom portions.

Further, when the vertical high frequency component of the luminance signal is also multiplexed to the top and bottom portions, it is sufficient that the vertical high frequency component of the luminance signal and the high frequency component of the chrominance signal are multiplexed to each other by, for example, frequency interleaving.

(3.2) MULTIPLEXING OF HORIZONTAL HIGH FREQUENCY LUMINANCE COMPONENT (3.2.1) FIRST EMBODIMENT

An embodiment of the horizontal high frequency luminance component encoder 129 shown in FIG. 1 will now be described together with a part of the NTSC encoder 127 with reference to FIG. 11.

Figure 12A:
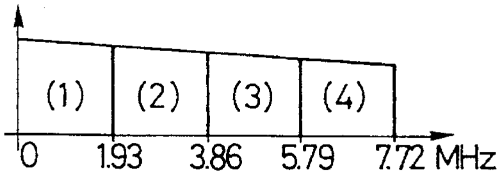
FIGS. 12A–12J are frequency spectrums illustrating the outputs of various filters in FIGS. 11, 22, 37 and 39.
Figure 12B:
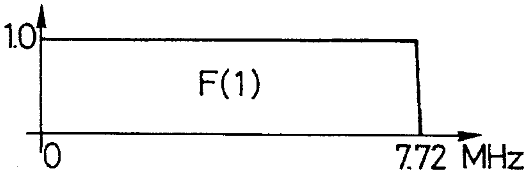
Figure 12C:
Figure 12D:
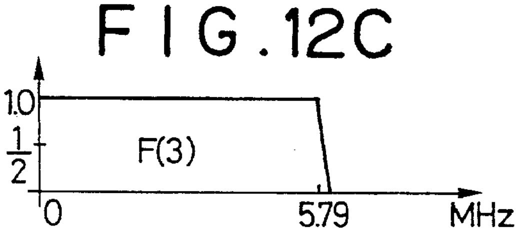
Figure 12E:
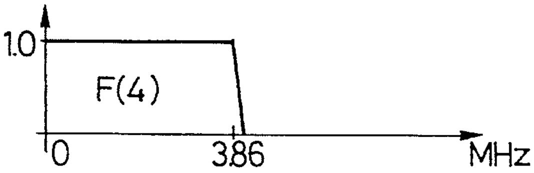

In FIG. 11, a wide band luminance signal $Y_{HL}$, $Y_{HH}$ as illustrated in FIG. 12A is applied at terminal 1101 to a first low pass filter 1102 denominated F(1) which provides a signal whose frequency band is limited to frequencies between 0 and 7.7 MHz as illustrated in FIG. 12B. This signal is then applied to a second low pass filter 1103, denominated F(2) which provides a signal whose frequency band is limited to 3.86 MHz as shown in FIG. 12C. This signal is used as a baseband signal, which is within the 4.2 MHz luminance bandwidth for NTSC video signals. The outputs from the filters 1102 and 1103 are provided to a subtractor 1104 to output a signal having a frequency bandwidth between 3.86 MHz and 7.72 MHz, as indicated by regions (3) and (4) in FIG. 12A. This signal is applied to a low pass filter 1105, designated F(3) having a pass band of 5.79 MHz as illustrated in FIG. 12D. The output of the filter 1105 corresponds to the region (3) in FIG. 12A. This signal is inputted to a mixer 1106 to modulate a first subcarrier signal $f_1$, which is described as follows:

$$f_l=(f_s/4)+7.5 \text{ Hz (phase shift)}$$

$$f_s=1960\times f_h=30.87 \text{ MHz}$$

where, $f_s$: sampling frequency, and $f_h$: horizontal scanning frequency of NTSC signal (15.75 Khz), such that $f_l$=7.72 MHz (rounded to two decimal places)

The 7.5 Hz (phase shift) factor represents a periodic phase shift of the subcarrier to avoid interference as will later be explained in detail. The outputs from the first subtractor 1104 and the filter 1105 are inputted to a second subtractor 1107 to obtain the signal corresponding to region (4) in FIG. 12A. This signal is applied to a second mixer 1108 to modulate a second subcarrier $f_2$, which is described as follows:

$$f_2=(f_s/8)+7.5 \text{ Hz (phase shift).}$$

Here, $f_2$=3.86 MHz (rounded to two decimal places).

The second subcarrier is also phase shifted by the 7.5 Hz (phase shift) factor, as noted above in connection with f1, and will be explained below in detail. The outputs from the first and second mixers 1106 and 1108 are added in a first adder 1109, the gain of which is adjusted in a weighting factor circuit 1110 whose factor is adjusted in response to a motion detection signal from the motion detector 135. The motion detector signal functions such that no signal is outputted from the circuit 1110 when motion is detected. (k=1 or 1−k=0), whereas the factor (1−k) is 1 (or k=0) in the case of a still picture.

Figure 13:
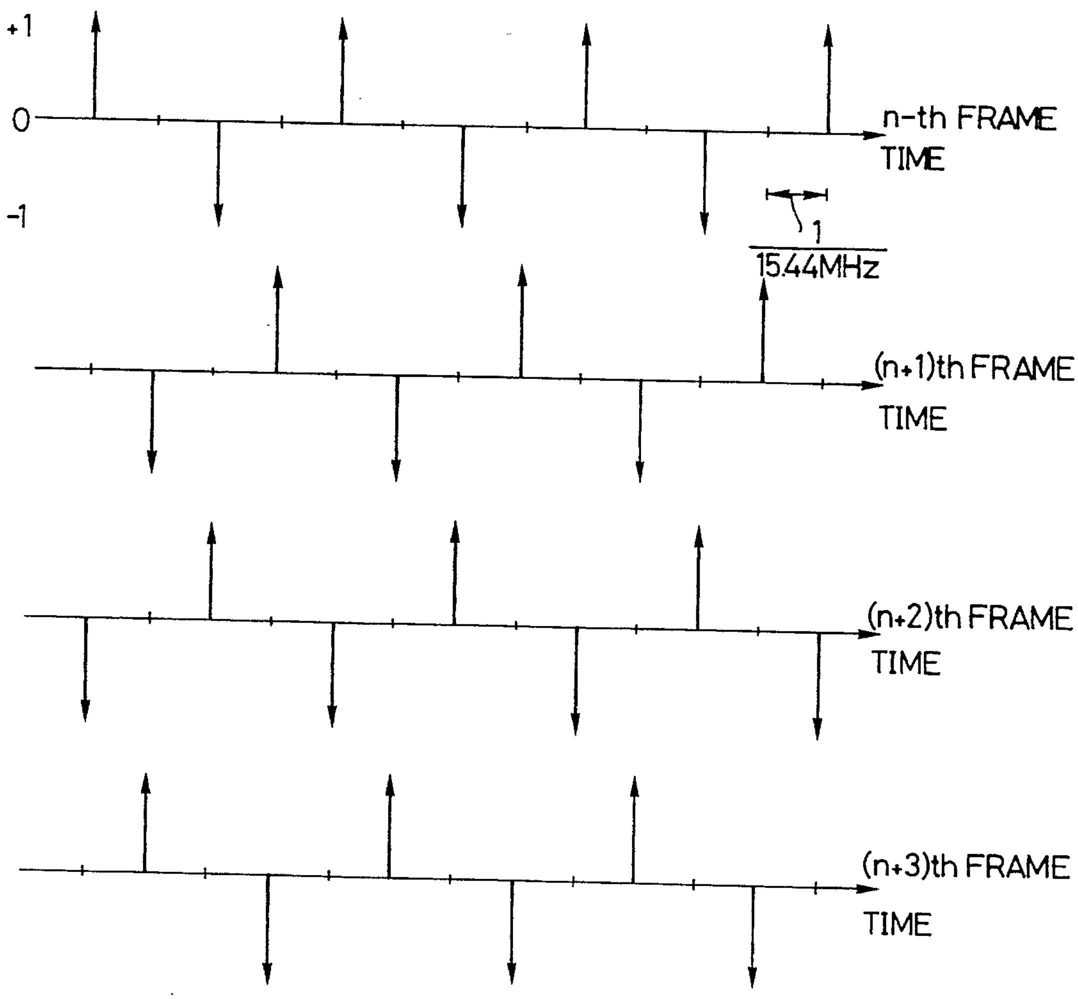
FIGS. 13 and 14 are time domain graphs illustrating the phase shifting of subcarrier signals which are modulated with the high frequency horizontal information separated from the luminance signal by the circuit shown in FIG. 11.
Figure 14:
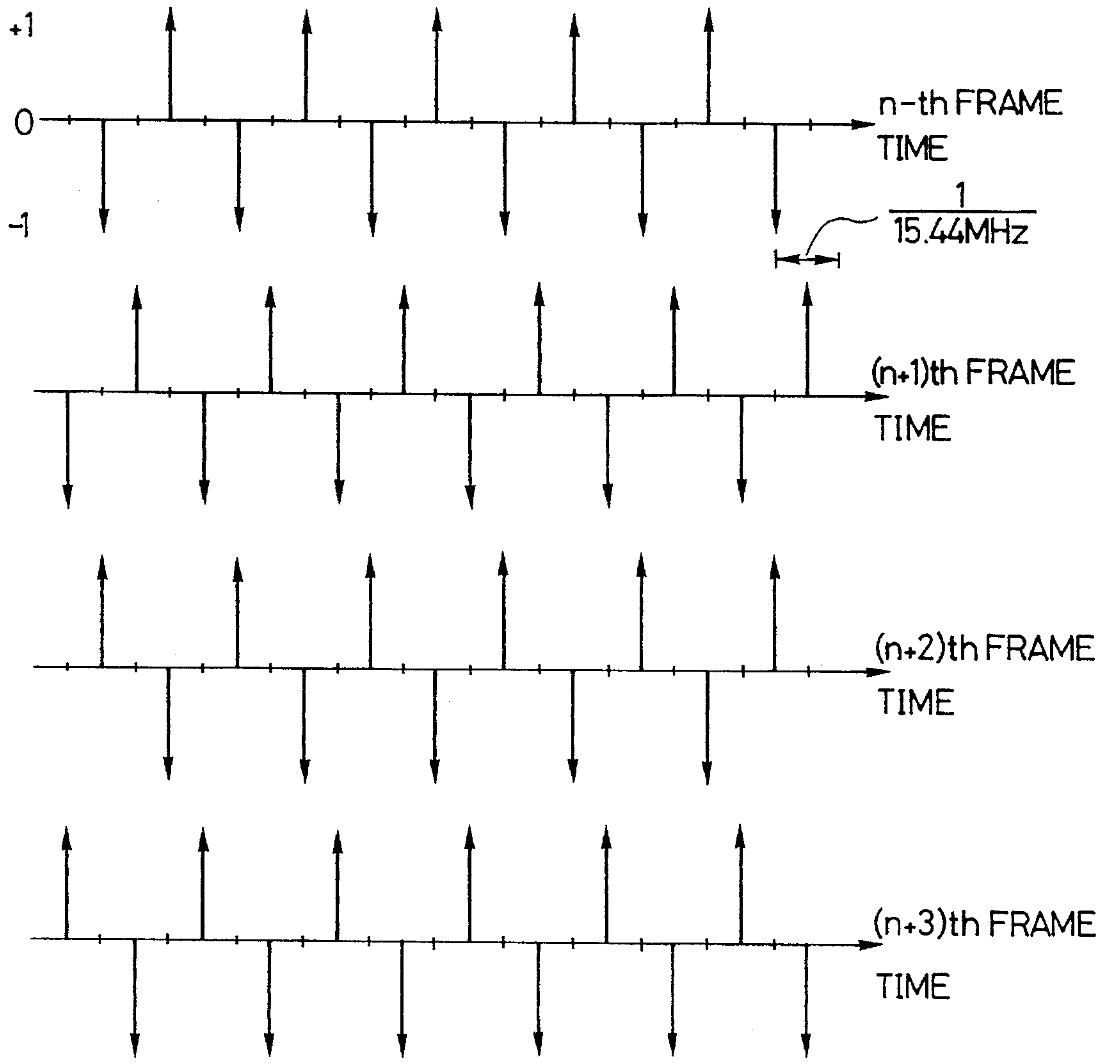

The phase shift or offset value of 7.5 Hz which is added to the subcarriers $f_l$ and $f_2$ is obtained by varying the phase of sampling points for each frame as shown in FIGS. 14 and 13, respectively. The sampling points are equal to an integral multiple of the horizontal scanning frequencies. The modulated subcarriers $f_1$ and $f_2$ ($Y_{HH}$) which correspond to the regions (3) and (4) shown in FIG. 12A, respectively, are then added to the baseband signal $Y_{HL}$ in a second adder 1111.

Figure 12F:
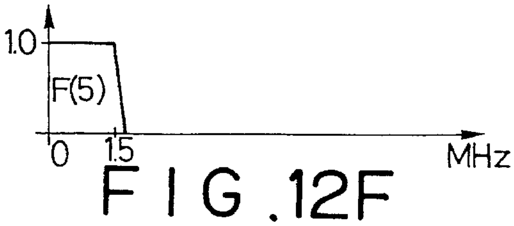
Figure 12G:
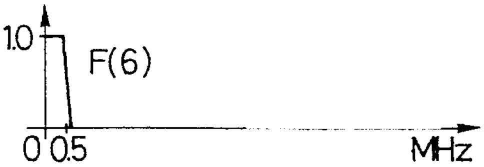
Figure 12H:
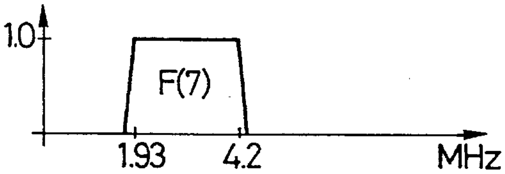

The I and Q signals are applied to low pass filters 1112 and 1113, denominated F (5) and F (6), respectively, the characteristics of which are illustrated in FIGS. 12F and 12G. As is evident, these signals represent the standard 1.5 MHz I signal and the 0.50 MHz Q signal. These chrominance component signals are supplied to modulators or multipliers 1114 and 1115 to modulate a color subcarrier $f_3$ which is quadrature modulated by the modulator 1114 through a π/2 phase shifter 1116. The outputs from the modulators 1114 and 1115 are added by an adder 1117 to produce a signal $I'_L+Q'_L$, which is further added to the luminance from the adder 1111 in an adder 1118. The composite signal from the adder 1118 is then passed through a low pass filter 1119 designated F(4) having the characteristics illustrated in FIG. 12E, which constitutes the NTSC compatible baseband signal.

Figure 15:
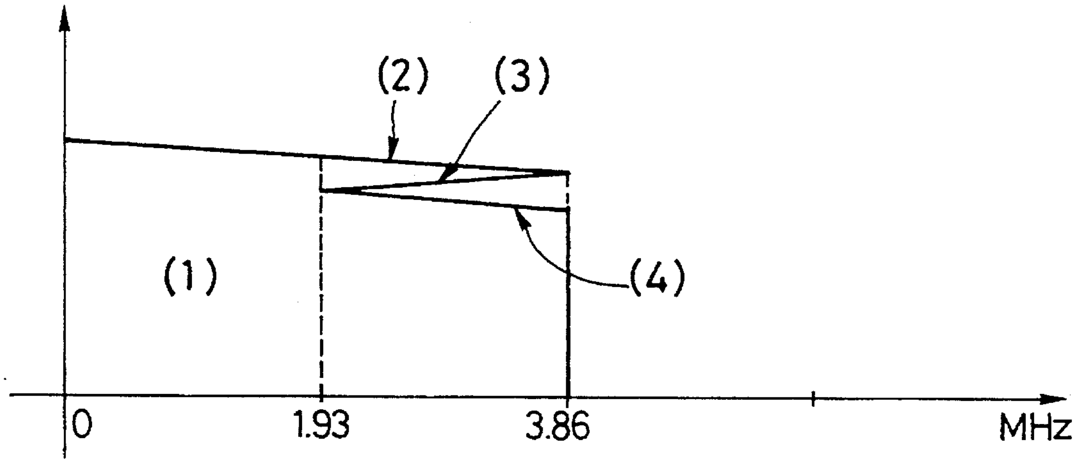
FIG. 15 is a frequency spectrum illustrating the concept of frequency shifting and folding back performed by the encoder shown in FIG. 11.

FIG. 15 illustrates the folding of the high frequency regions (3) and (4) into the region (2) illustrated in FIG. 12A.

Figure 16A:
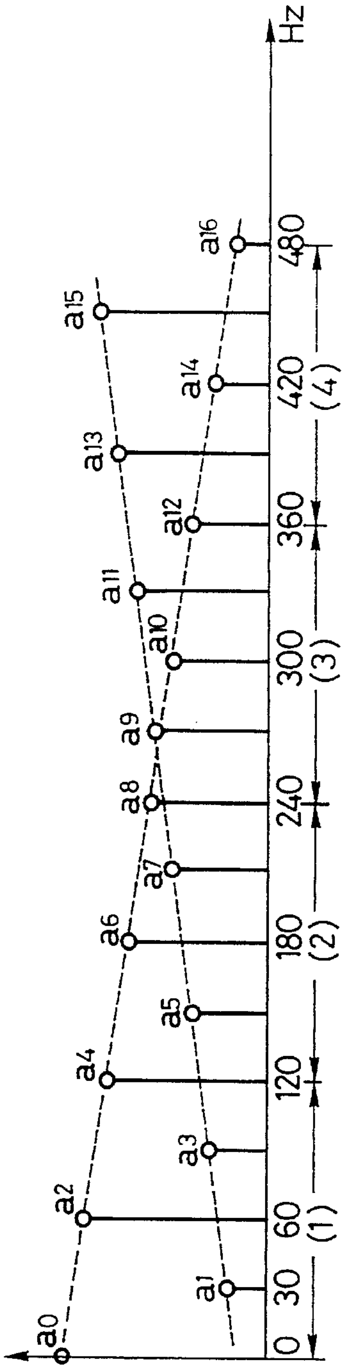
FIGS. 16A, 16B and 16C are frequency spectrums illustrating the interleaved frequency relations performed by the high frequency encoder shown in FIG. 11.
Figure 16B:
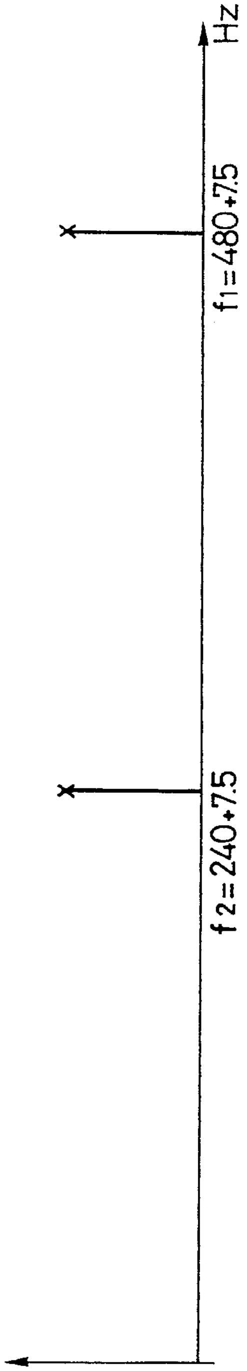
Figure 16C:
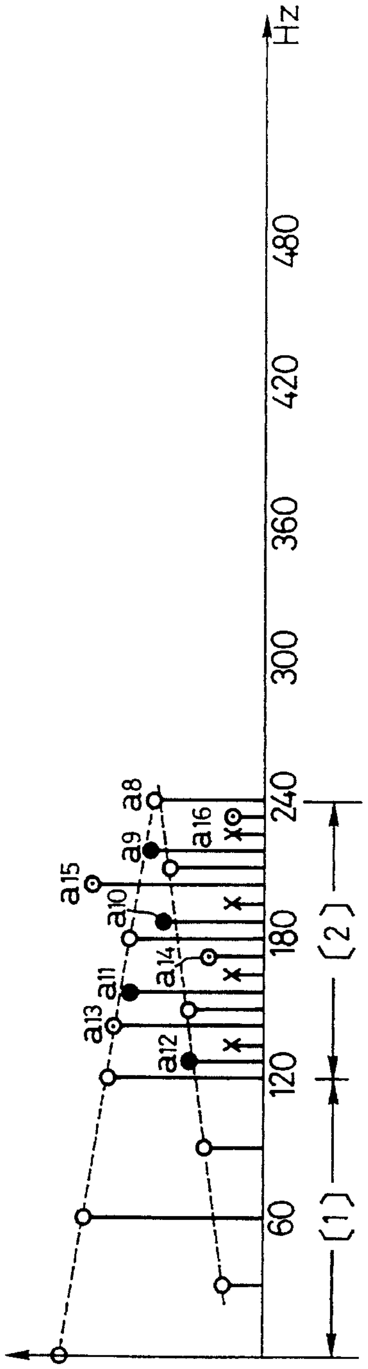

FIGS. 16A, 16B and 16C are expanded scale graphs illustrating the sampling and folding back of high frequency luminance components into the region [2]. The regions (1)–(4) in FIG. 16A correspond to the regions (1)–(4) in FIG. 12A, respectively. The regions [1] and [2] in FIG. 16C correspond to the regions of 0 MHz-about 2 MHz and about 2 MHz-4.2 MHz, respectively. Here, the sampling frequency $f_s=1960\times f_H$ is determined to be 1920 only for the sake of simplicity of explanation. Thus, as shown in FIG. 16B, $f_1$=480+7.5 [Hz] and $f_2$=240+7.5 [Hz]. The signal sampling points in the region (4) in FIG. 16A are folded into the region [2] in FIG. 16C through multiplication by subcarrier signal $f_2$ and are illustrated in FIG. 16C as dotted circles $a_{13}$, $a_{14}$, $a_{15}$ and $a_{16}$. The signals resulting from the multiplication of samples in the region (3) in FIG. 16A by subcarrier signal $f_1$ are indicated in FIG. 16C by solid circles $a_9$, $a_{10}$, $a_{11}$ and $a_{12}$. The open circle sampling signals in FIG. 16C are those which appear at the output of the low pass filter 1103 in FIG. 11. The marks X identify locations where the chrominance signal is interleaved. The frequency characteristics at points A and B in FIG. 11 are illustrated in FIGS. 17A and 17B, respectively.

It is thus seen that by varying the phase of the subcarrier signals $f_1$ and $f_2$ for each line, field and frame the high frequency luminance components in the regions (3) and (4) can be frequency interleaved with the low band luminance and chrominance components as illustrated in FIG. 16C.

Figure 18:
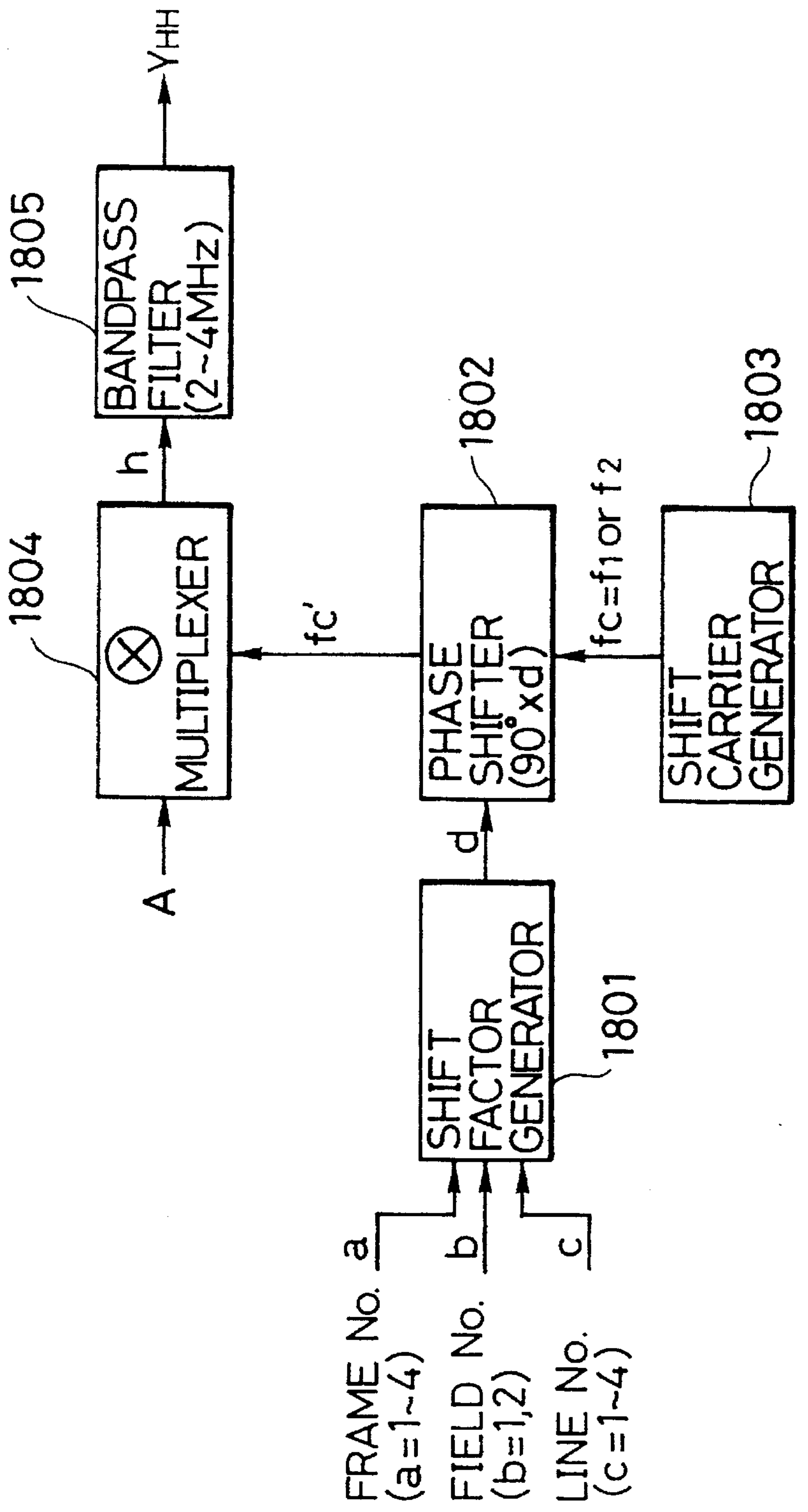
FIG. 18 is a block diagram showing another modification of the modulator portion for modulating high frequency components of a luminance signal in FIG. 11.

FIG. 18 is a block diagram showing another embodiment of the portion for shifting the phase of a subcarrier which is modulated with the high frequency luminance information, i.e., the portion including the filter 1105, the multipliers 1106 and 1108, the subtractor 1107, the adder 1109 and the circuit 1110 shown in FIG. 11.

Reference numeral 1801 designates a shift factor generator, which receives a frame number input a (a=1, 2, 3, 4), a field number input b (b=1, 2), and a line number input c (c=1, 2, 3, 4), to generate a shift factor d which is inputted to a phase shifter 1802. Reference numeral 1803 designates a shift carrier generator which generates a shift carrier $f_c$ which would correspond to one of the subcarriers $f_1$ and $f_2$. The shift carrier $f_c$ is applied to the phase shifter 1802 so that the phase of the carrier $f_c$ is shifted by the shift factor d to output the phase shifted carrier $f_c'$. The carrier $f_c'$ and the output A from the subtractor 1104 are applied to a multiplier 1804 to produce a multiplied output h. Reference numeral 1805 denotes a band pass filter whose characteristics correspond to the region (2) in FIG. 12A. The band pass filter 1805 outputs the $Y_{HH}$ signal, which is applied to the adder 1111 in FIG. 11.

Figure 19:
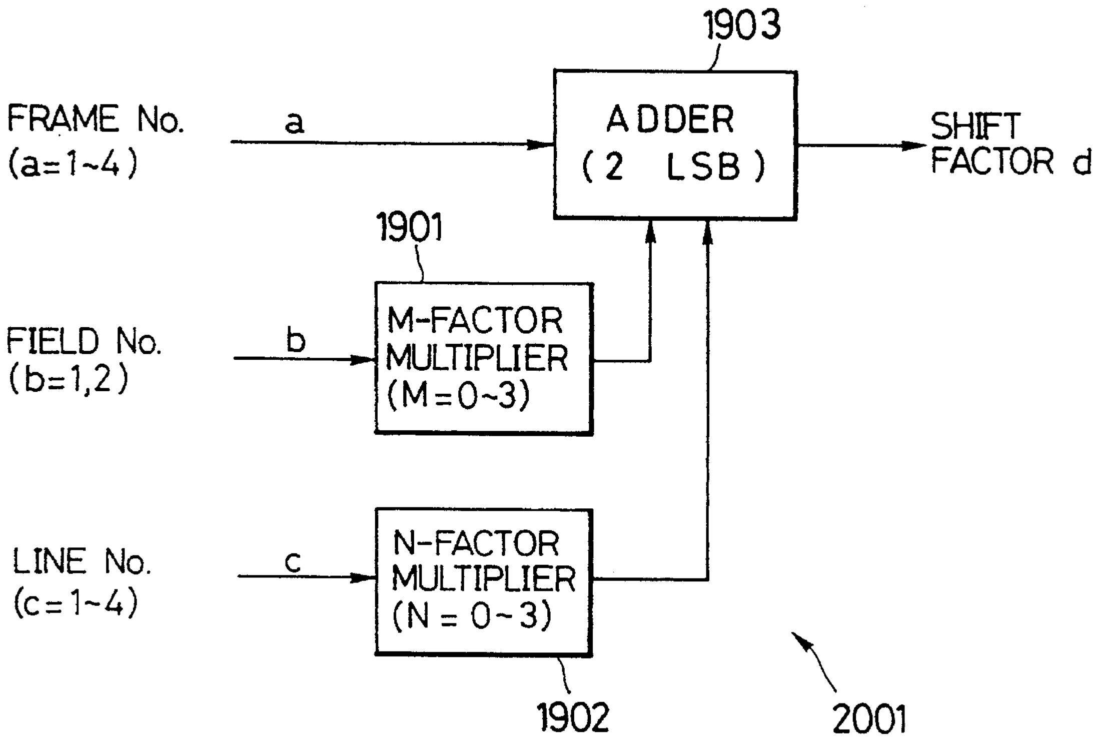
FIG. 19 is a block diagram showing an embodiment of the shift factor generator shown in FIG. 18.

FIG. 19 is a block diagram showing an embodiment of the shift factor generator 1801 shown in FIG. 18. Reference numeral 1901 designates an M-factor multiplier which multiplies a field number b (b=1, 2) by a factor of M (M=0, 1, 2, 3). Reference numeral 1902 designates an N factor multiplier which multiplies a line number c (c=1, 2, 3, 4) by a factor of N (N=0, 1, 2, 3). The outputs from the multipliers 1901 and 1902 are added to the frame number a (a=1, 2, 3, 4) in an adder 1903. The adder 1903 outputs the two least significant bits (LSB) of the summation as the shift factor d which is inputted to the phase shifter 1802 in FIG. 18.

Figure 20:
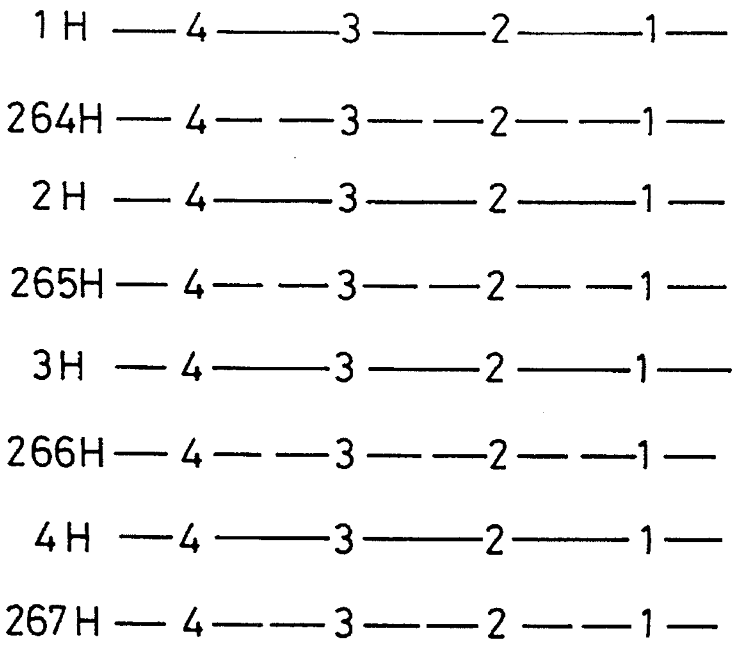
FIGS. 20 and 21 are explanatory diagrams illustrating the shift patterns of the subcarrier phase according to the present invention.
Figure 21:
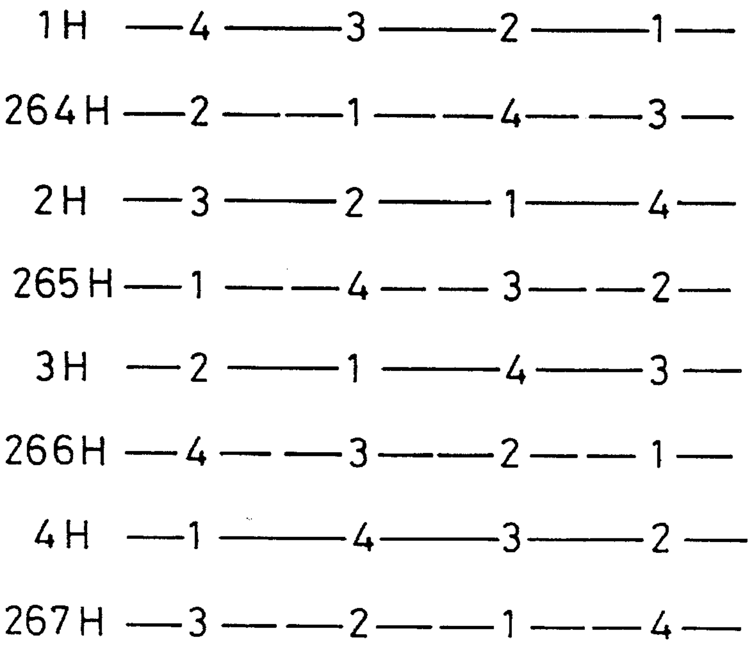

FIGS. 20 and 21 illustrate examples of shift patterns for the subcarrier phase. The numbers 1 to 4 represent respective zero crossing points from negative to positive for the carrier sine wave in each frame 1 to 4. The numbers 1H to 267H represent horizontal scanning lines within each frame.

FIG. 20 illustrates a resultant shift pattern when only frame offset is applied. FIG. 21 illustrates a resultant shift pattern when a line offset and field offset of 90° and 270° are utilized in addition to frame offset. It is clear that the shift pattern shown in FIG. 21 contains phase points occurring in a much more random order than the pattern shown in FIG. 20, and is thus more useful in eliminating dot interference patterns which may appear on a display screen, which would degrade the image quality.

(3.2.2) SECOND EMBODIMENT

Figure 22:
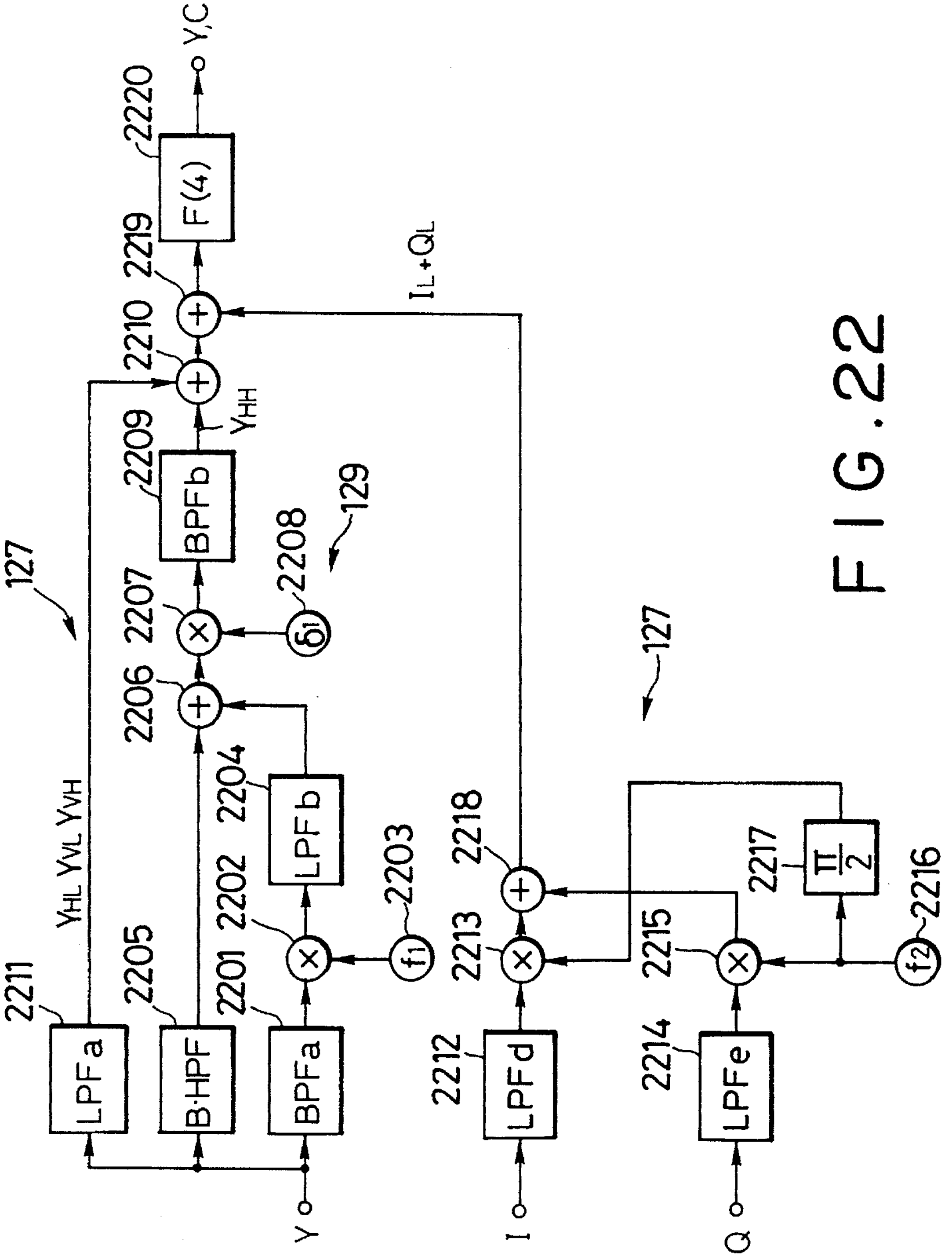
FIG. 22 is a block diagram showing further embodiment of the encoders 127 and 129 shown in FIG. 1.

FIG. 22 shows a second embodiment of the encoders 127 and 129 in which frequency interleaving is employed so that a board bandwidth luminance signal is compressed to a predetermined bandwidth.

Figure 12I:
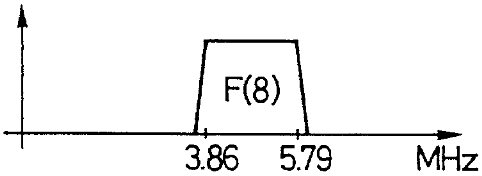
Figure 12J:
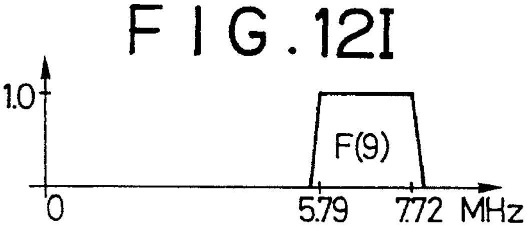

In FIG. 22, a broad bandwidth input luminance signal Y is supplied to a band pass filter (BPFa) 2201 having a filter characteristic F(8) as illustrated in FIG. 12I. The output from the band pass filter 2201 is then applied to a multiplier 2202 which converts the frequency of that output by a successive waveform having an output frequency $f_1$ from a sine wave generator 2203. The lower frequency output signal component from the multiplier 2202 is then applied to a low pass filter (LPFb) 2204 having a pass region corresponding to the portion (1) in FIG. 12A. The filter 2204 provides its output to an adder 2206. The input luminance signal Y is also applied to a filter (B.HPF) 2205 that functions both as a band pass filter having a pass region corresponding to the portion (2) in FIG. 12A and a high pass filter having a pass region corresponding to the portion (4) in FIG. 12A. This filter 2205 passes the medium bandwidth signal component in the portion (2) and a high bandwidth signal component in the portion (4), which are applied to the adder 2206 which adds the signal components to the low frequency output signal component in the portion (1) from the low pass filter (LPFb) 2204 to produce the output signal component that is the sum of those signals. This sum output signal is then fed to a multiplier 2207 which sub-samples the sum signal at the timing of sub-sampling pulses of a frequency $\delta_1$ from a pulse generator 2208. The output signal from the sub-sampling multiplier 2207 passes through a band pass filter (BPFb) 2209 which provides a medium bandwidth signal component in the portion (2) and high bandwidth signal component in the portions (3) and (4) obtained by frequency compression in which the converted low bandwidth signal component is aliased into the medium bandwidth portion (2) and this signal component is multiplexed to the medium bandwidth signal component. This aliased medium and high bandwidth output signal component is then applied to an adder 2210 which adds this signal component to the low band width signal component in the portion (1) of the input luminance signal Y passed through a low pass filter (LPFa) 2211 having the filter characteristic, which corresponds to the portion (1) in FIG. 12A, to provide a luminance signal with the narrower bandwidth in which the broad bandwidth input luminance signal Y is frequency compressed.

The I signal and Q signal components of the input chrominance signal are applied to low pass filters (LPFd) 2212 having the filter characteristic F(5) and (LPFe) 2214 having the filter characteristic F(6), respectively. The output of the filters 2212 and 2214 are fed to multipliers 2213 and 2215, respectively. A sine wave generator 2216 produces a color subcarrier with a frequency of $f_2$, usually 3.58 MHz, which is applied to the multipliers 2213 and 2215 through a $\pi/2$ phase shifter 2217 and directly, respectively, so that the color subcarriers applied to the multipliers 2213 and 2215 the phase difference of $\pi/2$. In the multipliers 2213 and 2215, the color subcarriers are amplitude-modulated by the I signal and the Q signal. The resulting color subcarriers whose phase are at quadrature angles to each other are fed to an adder 2218, where the modulated color subcarriers are combined to provide an quadrature modulated carrier chrominance signal which is applied to an adder 2219 where the chrominance signal and the narrower band luminance signal from the adder 2210 are combined, so that the chrominance signal is frequency interleaved or multiplexed in the medium band. The output from the adder 2219 is then applied to a low pass filter (LPFc) 2220 having the filter characteristic F(2) shown in FIG. 12C which delivers a narrower band color picture signal whose frequency band is limited to 3.86 MHz, for example. This narrower band color picture signal provides the improved NTSC color television signal with the luminance signals having a compressed frequency band according to the present invention.

The principle of the band compression transmission system for the broad band color picture signal according to the present invention will be explained.

The NTSC color television signal with which the broad band color picture signal should be compatible when the bandwidth of the broad band color picture signal is compressed in accordance with the present invention has the spectrum contains a luminance signal with a frequency of up to 3.86 MHz having a frequency region ranging from 1.93 MHz to 3.86 MHz in which region a carrier chrominance signal obtained by quadrature-modulating a color subcarrier signal by the I and Q signals is frequency multiplexed. The broad band luminance signal contained in the broad band color picture signal, whose band is compressed while helping the compatibility with the NTSC color television signal, must have such a high frequency component that the high frequency component is aliased and multiplexed, by means of sub-sampling, into the frequency multiplexed region of the carrier chrominance signal with a frequency range of 1.93–3.86 MHz to realize a narrow band transmission like the NTSC color television signal, so that on the receiving end, the compressed signal can be processed by an interpolation filter to reproduce the original broad band luminance signal.

Then, in order to frequency-multiplex by interleaving the carrier chrominance signal, like the NTSC color television signal, a continuous wave signal having a frequency $f_1$ which satisfies the relation as expressed below (where n is equal to a positive integer), $$2\times 30n \approx 3.86\times 10^6 \text{ Hz}$$

is used so that the high frequency components in the luminance signal is frequency converted into the base band, and then sub-sampled by a pulse train signal with a frequency equal to $\delta_1$=2×30n+7.5 Hz to form an aliased multiplexed signal component. Then, the carrier chrominance signal which has a color subcarrier of a frequency equal to $f_2$=3.58 MHz and which is quadrature-modulated by the I and Q signals is frequency-multiplexed or interleaved.

Further, the sub-sampling as described above may be an offset sampling that recycles every four frames, and the frequency $\delta_1$ of a sample pulse train may be set so that each sampling phase is shifted by $\pi/2$ for each sequential frame.

When the continuous wave signal $f_1$, the sample pulse train $\delta_1$ and the color subcarrier wave $f_2$ having the frequency relationship as described above are used so that the bandwidth of the broad band luminance signal described above by referring to FIG. 22 is made narrower, the higher frequency component of the luminance signal can be frequency multiplexed in such a way that the component is further separated on the decoder side.

(3.3) MOTION DETECTION

An example of the motion detection circuit 135 shown in FIG. 1 will now be explained with reference to FIGS. 23, 24, 25 and 26.

Figure 23:
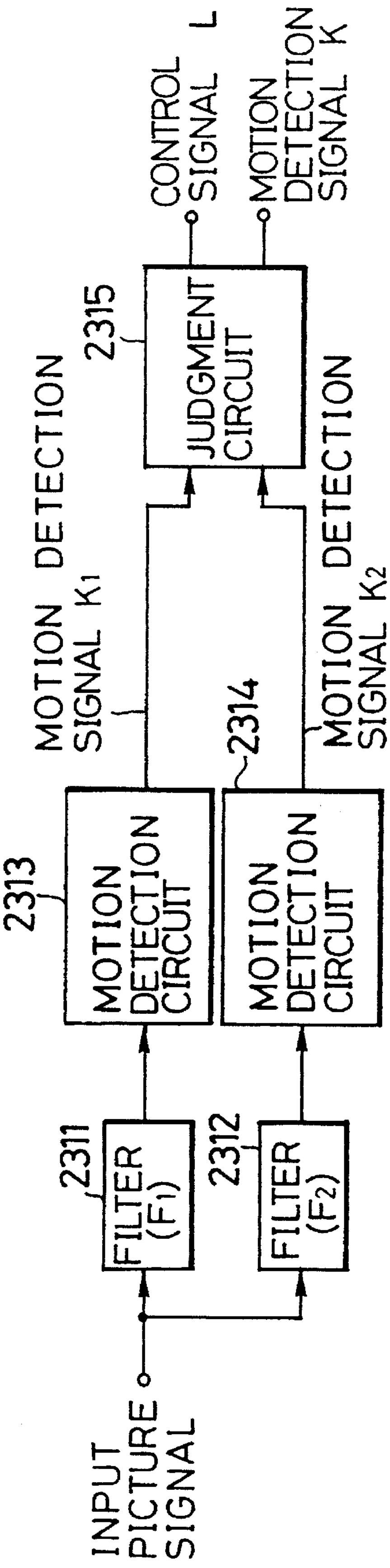
FIG. 23 is a block diagram showing one embodiment of the motion detection circuit shown in FIGS. 1 and 2.
Figure 26:
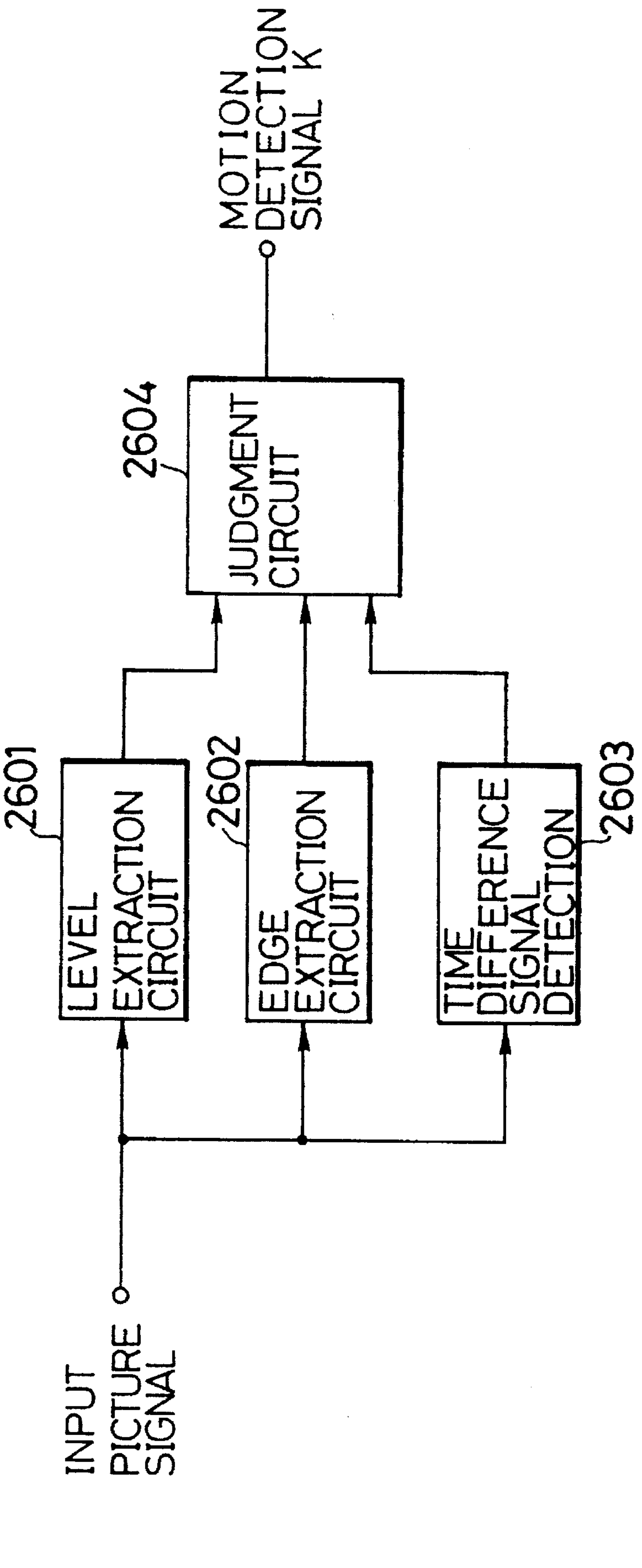
FIG. 26 is a block diagram showing the movement detecting circuit shown in FIG. 23.

FIG. 23 is a schematic block diagram showing a motion detection circuit in which a two-dimensional filter (F1)2311 is provided through which signals bounded by the points O, L/2, $C_N$ and $A_N$ can pass, while a two-dimensional filter (F2)2312 passes signals bounded by the points $A_N$, $C_N$, D and B. Those points are defined as shown in FIG. 25. The outputs from the filters 2311 and 2312 are supplied to first and second movement detecting circuits 2313 and 2314, respectively, which are constructed as shown in FIG. 26. In FIG. 26, a level extraction circuit 2601, an edge extraction circuit 2602 and a time difference signal detecting circuit 2603 generate a level signal, an edge signal, and a time difference signal, respectively, in response to an input picture signal. These signals are inputted to a judgment circuit 2604 which subtracts the edge signal from the absolute value of a time difference signal at a sensitivity proportional to the level signal to output the motion detecting signal K which indicates the presence of motion between input picture frames. In this manner, the first and second movement detecting circuits 2313 and 2314 output first and second motion detection signals K1 and K2, which are equivalent to the output signal K in FIG. 26, are inputted to a judgment circuit 2315 which outputs a control signal L and a motion detection signal K. The output K indicates a judgment of a stationary portion in the input picture signal when the movement detection signal K2 detects movement and the movement detection signal K1 does not detect movement. The control signal L is active when the movement detection signal K2 indicates movement and the movement detection signal K1 does not indicate movement.

FIG. 24 is a block diagram for explaining the control of the encoding circuit by the control signal L. A band restriction filter 2416 restricts the two-dimensional frequency band to the area bounded by the points O, L/2, $C_N$ and $A_N$ as shown in FIG. 25. The filter 2416 passes only stationary portions among the transmitted picture signals. The control signal L controls a switching circuit 2417 to select the output from the filter 2416 when the movement detection signal K2 detects movement and the movement detection signal K1 does not detect movement. The motion-related signals are provided to a mixing circuit 2418 which mixes the motion-related signal with the still-picture-related signal according to the motion detection signal K to provide an encoder output signal. As a result, there is no substantial difference in motion detection between the encoder and decoder sides, even if the motion detection bandwidth in the decoder side is limited.

(3.4) SIGNAL CORRECTION

In order to provide a television system with improved quality, various types of signal correction and signal improvement are important in addition to the broader band of a signal to be transmitted. Especially, the following three processings are useful in the present invention, i.e., (1) compensation of a deviation from constant luminance principle, (2) correction of the detail characteristics of luminance signal and (3) improvement on resolution of moving picture and S/N of a still picture. These three processings will be explained.

(3.4.1) CONSTANT LUMINANCE PRINCIPLE

Figure 27:
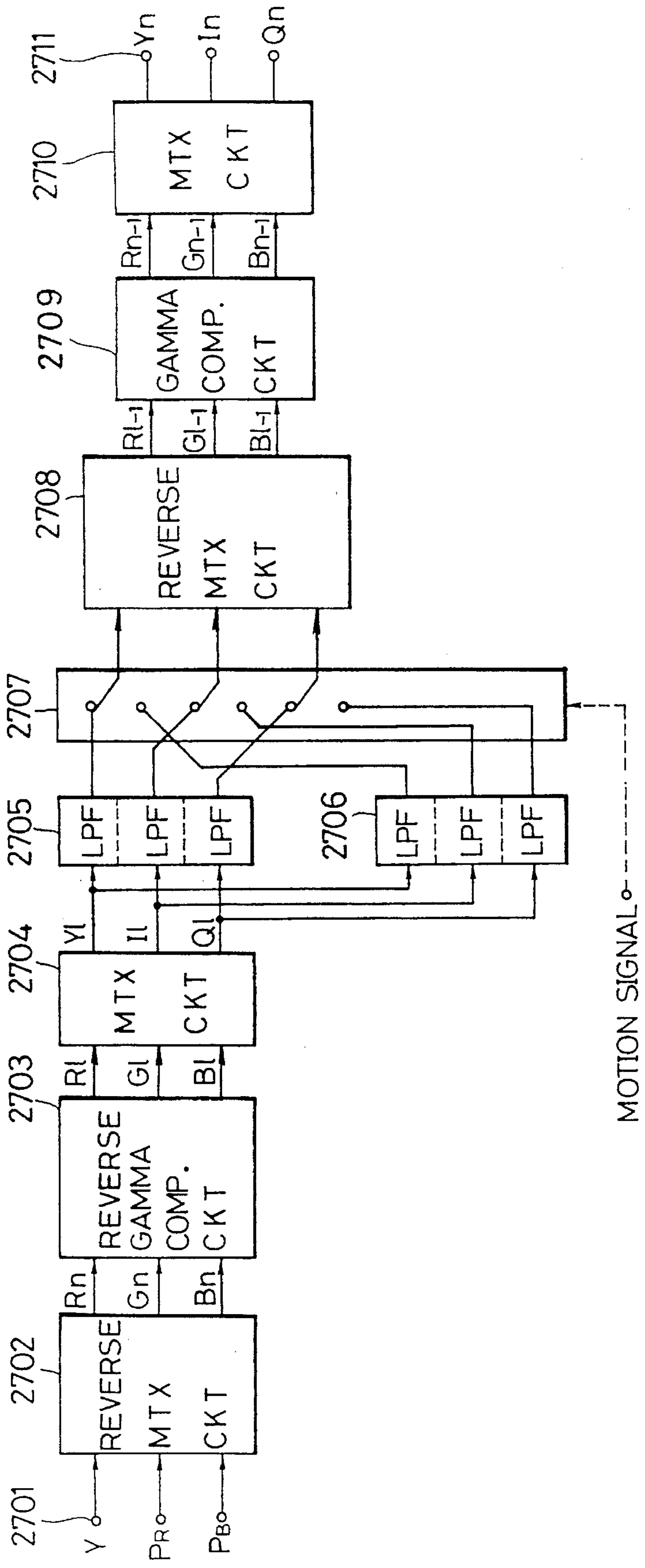
FIG. 27 is a block diagram showing an embodiment of the matrix circuit 109 shown in FIG. 1.

FIG. 27 shows an embodiment of the matrix circuit 109 shown in FIG. 1.

It is desirable to develop a television system in which non-linear signal processing is not required on a receiving side. In the present invention, it is preferred that deviations of a luminance signal and two chrominance signals from constant luminance principle due to the difference between still picture transmission bands and moving picture transmission bands of the luminance signal and the two color signals.

In the current color television transmitting and receiving system a so-called gamma correction of non-linear characteristics of a display tube on the receiving side is performed in some way. Usually this gamma correction is implemented on a transmitting side without placing a burden of the correction on a receiving side.

On the other hand, the well-known standard broadcasting system such as the NTSC system is designed to convert three-primary-color signals obtained by imaging on the transmitting side into a luminance signal and two color signals which are to be transmitted. In this system, it is desirous that the luminance and chrominance displayed on the screen of a receiver are not influenced both by the noises contained in the luminance signal and the color signals which are transmitted. That is, the luminance is influenced only by the noise in the luminance signal, whereas the chrominance is influenced only by the noise in the chrominance signal. This relation is generally established and is referred to as the constant luminance principle.

The actual signal processing is varied from the constant luminance principle due to the signal processing on the transmitting side where the luminance signal and the two color signals are obtained by the matrix conversion after the gamma correction and also due to the difference in the transmitting frequency bands of the luminance signal and the two color signals. This difference in the frequency bands is caused by using the different band restriction filters for the processings of the motion and still picture signals, including the detection of motion, in the encoders 127 and 129 as shown in FIG. 1.

In this embodiment shown in FIG. 27, the change or deviation from the constant luminance theory can be well compensated, even if the still and motion pictures are separately processed through the different frequency bands on the transmitting side. This embodiment provides a motion-adapted gamma correction without imposing a burden of the correction on the receiver side.

In FIG. 27, only blocks relating to the motion-adapted gamma correction are shown without showing other blocks in the encoder.

In FIG. 27, the signals Y, $P_R$ and $P_B$ from the field rate converter 107 are supplied to input terminals 2701 of a reverse matrix circuit 2702. Here, it is to be noted that the signals Y, $P_R$ and $P_B$ correspond to gamma-compensated output linear three primary-color signals converted from the output linear three primary-color signals obtained by the three primary-color imaging elements. The matrix circuit 109 has a reverse gamma-correction circuit 2703, a matrix circuit 2704, low pass filters 2705 for limiting a still picture band for each of the three signals, low pass filters 2706 for limiting a moving picture band for each of the three signals, a switching circuit 2707 for switching between a moving picture and a still picture according to the motion detection signal from the motion detector 135, a reverse matrix circuit 2708, a gamma correction circuit 2709, and a matrix circuit 2710, from which a luminance signal Y and two color signals I and Q which are different from those inputted at the input terminal 2701 are outputted from an output terminal 2711.

The operation of the arrangement shown in FIG. 27 will be described following the signal flow. Three signals inputted at the input terminal 2701 are non-linear signals, because they are subject to gamma correction. Here, non-linear signals are represented by adding a suffix "n" (non-linear) and linear signals are represented by adding a suffix "1" (linear).

The three input signals Y, $P_R$ and $P_B$ are temporarily converted into three primary-color signals $R_n$, $G_n$ and $B_n$ in the reverse matrix circuit 2702. Then the signals $R_n$, $G_n$ and $B_n$ are changed into linear three primary-color signals $R_1$, $G_1$ and $B_1$ in the reverse gamma-correction circuit 2703 and then converted into linear three signals $Y_1$, $I_1$ and $Q_1$ in the matrix circuit 2704. Then, these signals are subject to band-limiting process in the still picture and the moving picture band pass filters 2705 and 2706. The outputs from the low pass filters 2705 and 2706 are selectively derived from the switching circuit 2707 in accordance with the motion detection signal.

The process of the switching between the moving picture band and the still picture band does not cause a deviation from the constant luminance principle, so that the output signals from the switching circuit 2707 are converted into linear three primary-color signals $R_{1-1}$, $G_{1-2}$ and $B_{1-1}$ by the reverse matrix circuit 2708. Then, these signals are subject to gamma-correcting process in the gamma correction circuit 2709. The gamma-corrected signals $R_{n-1}$, $G_{n-1}$ and $B_{n-1}$ from the circuit 2709 are supplied to the matrix circuit 2710 to output a luminance signal Y and two color signals I and Q.

According to the arrangement shown in FIG. 27, even in the gamma-correction used in a system in which the still picture band and the moving picture band are switched a deviation from the constant luminance principle can be sufficiently compensated and there is no degradation due to the band difference between the still picture and the moving picture. In addition, there is no burden of a non-linear processing on a receiving side.

(3.4.2) CORRECTION OF TRANSMISSION CHARACTERISTICS OF LUMINANCE DETAILS

In a conventional color television transmission system, a non-linear luminance signal is obtained from a matrix circuit after gamma correction on the transmitting side. Since this non-linear luminance signal is used as a transmission luminance signal, transmission characteristics of luminance details in a high saturation picture are deteriorated. Thus, it is required to correct the transmission characteristics of luminance details so that the characteristics are made flat.

Figure 28:
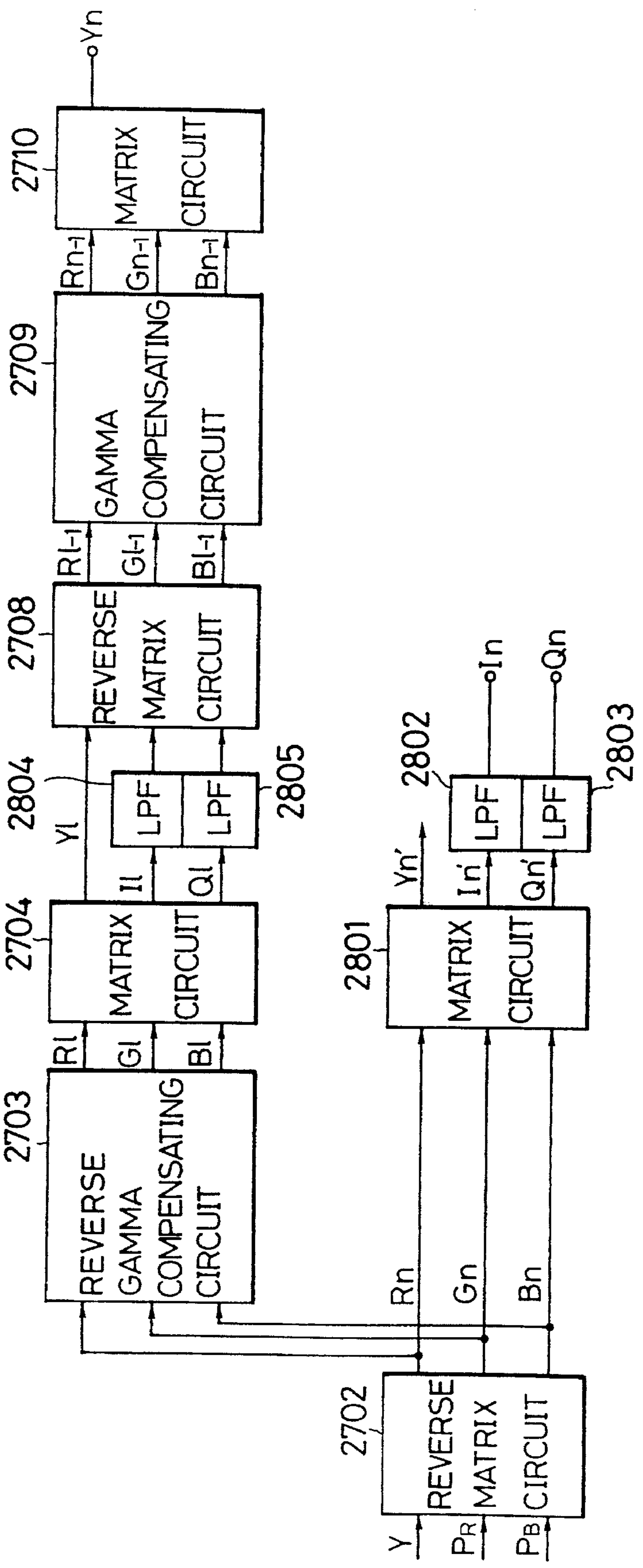
FIG. 28 is a block diagram showing an embodiment of a circuit for correcting transmission characteristics of luminance details in the matrix circuit 109 shown in FIG. 1.

One embodiment of this correction is shown in FIG. 28. In FIG. 28, portions corresponding to those in FIG. 27 are shown by using the same reference numerals.

In FIG. 28, the luminance signal Y and the chrominance signals $P_R$ and $P_B$ from the field rate converter 107 are applied to the reverse matrix circuit 2702 to produce non-linear three primary color signals $R_n$, $G_n$ and $B_n$, which are further supplied to a matrix circuit 2801 and the reverse gamma correction circuit 2703. From the matrix circuit 2801, a nonlinear luminance signal $Y_n'$ and non-linear chrominance signals $I_n'$ and $Q_n'$ are derived. The signals $I_n'$ and $Q_n'$ are applied to low pass filters 2802 and 2803, respectively, to obtain chrominance signals $I_n$ and $Q_n$ having a frequency band (I: 0–3 MHz, Q: 0–2 MHz) required for the second television signal or the improved NTSC signal.

The reverse gamma correction circuit 2703 has reverse characteristics of the gamma correction circuit 2709. The reverse characteristics serve to produce linear output signals $R_1$, $G_1$ and $B_1$, which are applied to the matrix circuit 2704 to generate a linear luminance signal $Y_1$ linearly relating to the luminance of an imaged object and two linear color signals $I_1$ and $Q_1$. These two linear color signals $I_1$ and $Q_1$ are not necessarily equal to the conventional signals I and Q. For example, they may be two color difference signals R-Y and B-Y. Next, low pass filters 2804 and 2805 serve to remove the components having the frequency band higher than the second television signal (I:>3 MHz, Q: >2 MHz) from the linear color signals. The reverse matrix circuit 2708 receives the signals $Y_1$ and the outputs from the filters 2804 and 2805 to perform reverse conversion with respect to the matrix circuit 2704. That is, it serves to reversely convert the limited band component of the linear luminance signal $Y_1$ and the two linear color signals $I_1$ and $Q_1$ into the $R_{1-1}$, $G_{1-1}$ and $B_{1-1}$ signals. The three reversely-converted signals are again converted into non-linear three-primary color signals $R_{n-1}$, $G_{n-1}$ and $B_{n-1}$ by the gamma correction circuit 2709, which are further converted into a non-linear luminance signal $Y_n$ and two non-linear color signals $I_n$ and $Q_n$ by the matrix circuit 2710. Here, only the non-linear luminance signal is outputted. Assuming that powers used for the reverse gamma correction circuit 2703 and the gamma correcting circuit 2709 are respectively denoted as a and b, it is required that the condition of b=1/a be met but not that the relation of a=γ (γ: a power of the gamma correction circuit 2702) be met.

In this arrangement, the color signals $I_n$ and $Q_n$ are obtained not from the output of the matrix circuit 2710 outputting a luminance signal $Y_n$ but from the matrix circuit 2801, resulting in reducing degradation due to noises. As will be easily understood from the block diagram shown in FIG. 28, this advantage is obvious from the number of circuits through which the color signals pass, in particular, the number of non-linear processing circuits such as the gamma correction circuit and the reverse gamma correction circuit.

Another feature of the embodiment is that it does not require the relation of a=γ. Assuming that the relation of a=γ=2.2 is given, a high band component has larger transmission characteristics in a high saturation portion. When a value of a is smaller than 2.2, the transmission characteristics in the high band component become closer to a linear characteristic. When a value of a is far smaller, it is possible to improve an error and stability of the circuits used in this arrangement.

A ratio between a high band component of the luminance on a display screen and a high band component of the actual luminance of an imaged object is calculated when the saturation of an imaged object is changed from each color of R, G and B (S=0) to white (S=1) with a value of a as a parameter. The case of a=1 corresponds to the existing NTSC system transmission characteristics. The case of a=1.2 or more indicates an advantage that the transmission characteristics are improved compared to the existing NTSC system at each saturation point and is kept at 1 in the case of white.

While the above-mentioned embodiment employs the output $Y_n$ from the matrix circuit 2710 as the low band and high band components of the luminance signal, the following arrangement can be used to produce a luminance signal in order to reduce a low band component error of the luminance signal. That is, a high band component is extracted from the luminance signal from the matrix circuit 2710. The high band component is multiplied by a. The multiplied output is added to a low band component of the luminance signal output $Y_n'$, i e the output of the existing NTSC system encoder, from the matrix circuit 2801.

The arrangement shown in FIG. 28 can compensate the luminance detail transmission characteristics, so that the luminance of an imaged object can be reproduced with a high fidelity on a receiver side. Accordingly, a high quality picture transmission is realized and the quality of the two color signals to be transmitted is also improved.

(3.4.3) IMPROVEMENT ON RESOLUTION OF MOTION PICTURE AND S/N OF STILL PICTURE

Figure 29:
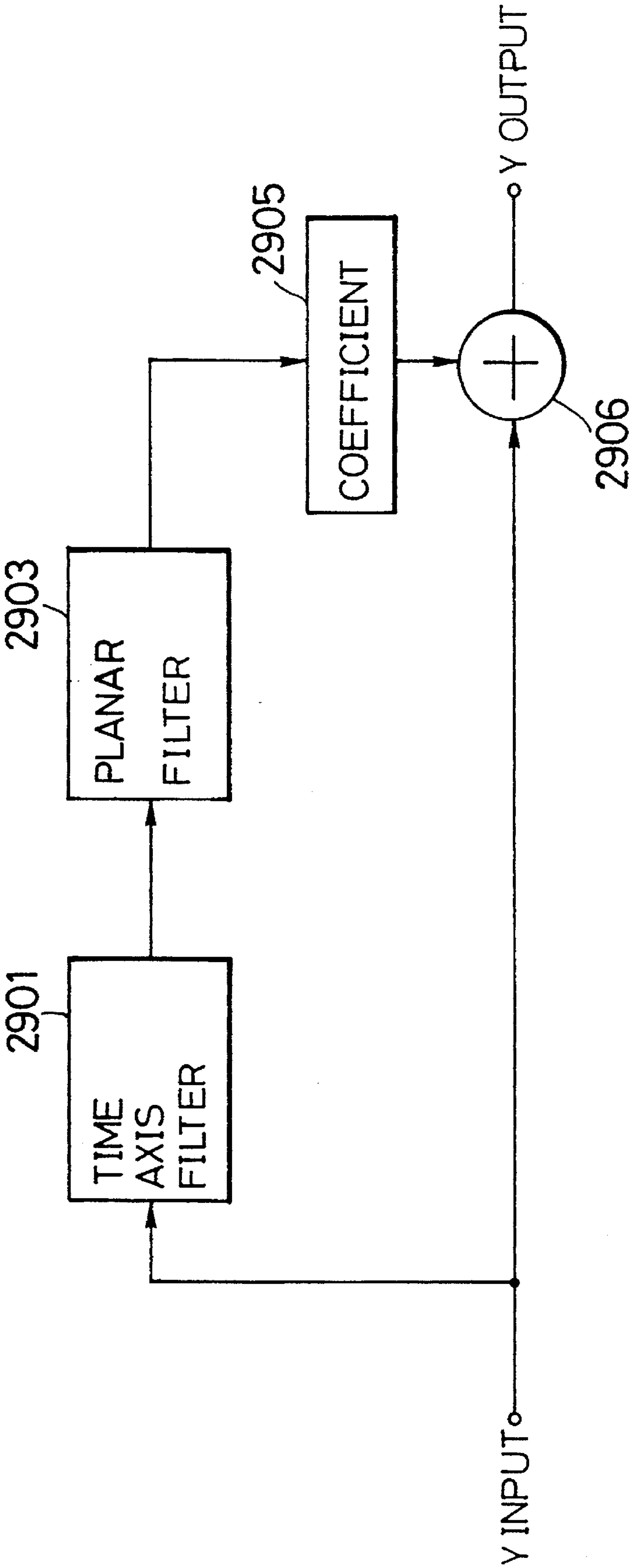
FIG. 29 is a block diagram showing an embodiment of the circuit for processing the luminance signal in the matrix circuit 109 shown in FIG. 1.

In the matrix circuit 109, the luminance signal can be processed as shown in FIG. 29 to improve the resolution of a motion picture portion and the S/N of a still picture portion.

In FIG. 29, the luminance input signal is applied to a high pass filter 2901 in the time axis direction, which can be formed by a field memory or a frame memory. The output from the filter 2901 is applied to a tow-dimensional or planar high pass filter 2903 formed by a horizontal high pass filter and/or a vertical high pass filter. The two filters 2901 and 2903 forms in combination a 2-dimensional or 3-dimensional motion edge detection filter. The motion edge signal extracted from the motion edge detection filter is supplied to an adder 2906 via a coefficient circuit 2905. In the adder 2906, the motion edge signal is added to the luminance input signal to obtain a luminance output signal.

In the time axis filter 2901, it is preferable to obtain an average of the signals in the adjacent fields or frames as the filter output to reduce noise.

Figure 30:
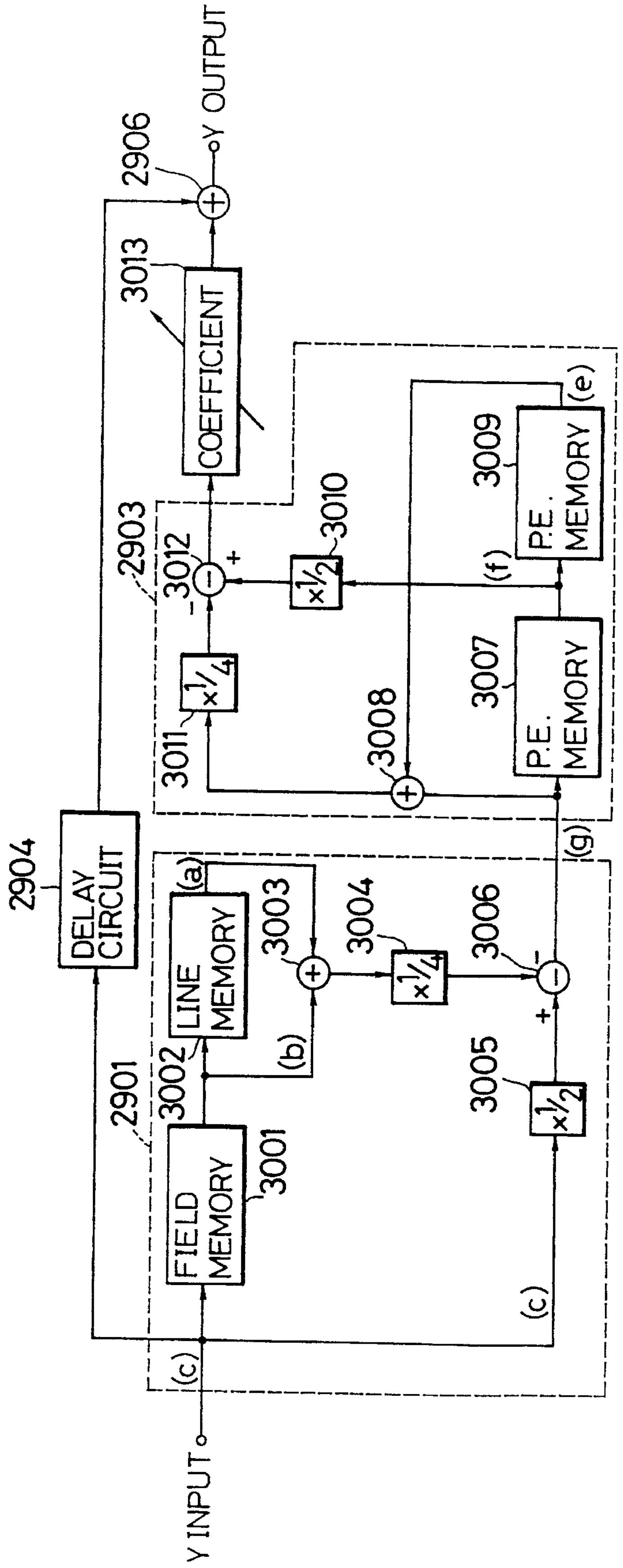

FIGS. 30 and 31 show a more detailed embodiment of the arrangement shown in FIG. 29. In FIG. 30, the time axis filter 2901 uses a field memory and the planar filter 2903 uses a horizontal filter. In FIG. 31, the time axis filter 2901 uses a frame memory and the planar filter 2903 uses a horizontal filter.

In FIG. 30, the difference between a signal of the present field and an average of signals in the two adjacent lines in the field preceding the present field is first calculated from an input image signal to detect a motion signal between the two fields. luminance input signal (c) is applied to a field memory 3001, the output (b) of which is applied to a line memory 3002 and an adder 3003. The adder 3003 receives an output (a) from the line memory 3002. The output from the adder 3003 is applied to a subtractor 3006 via a ¼ multiplier 3004. The subtractor 3006 receives the luminance input signal (c) via a ½ multiplier 3005 to output a motion signal (g) between the two adjacent fields.

This output signal is converted into an edge signal of a motion picture portion by the horizontal filter 2903 formed by the unit of picture element in the horizontal direction. The output signal (g) from the time axis filter 2901 is applied to a picture element memory 3007 and an adder 3008. The output signal (f) of the memory 3007 is applied to a second picture element memory 3009 and a ½ multiplier 3010. The output signal (e) from the memory 3009 is applied to the adder 3008, the output signal from which is supplied to a ¼ multiple 3011. The output signals from the adders 3010 and 3011 are supplied to a subtractor 3012 to output an edge signal of a motion picture.

The edge signal of the motion picture is, for instance, multiplied by a coefficient in a variable coefficient circuit 3013 which is adjusted depending on a magnitude of the motion signal. The resulting signal from the circuit 3013 is added to the luminance signal which passes through a delay circuit 2904 for adjusting the phase thereof by the adder 2906 to enhance the degree of resolution compared with the conventional system.

While in FIG. 30, the field memory 3001 is used as the time axis filter 2901, the time axis filter 2901 may also be formed by a frame memory. While in FIG. 30, the planar filter 2903 is a horizontal filter, it may also be a vertical filter or a combination of the vertical filter and the horizontal filter.

Figure 32A:
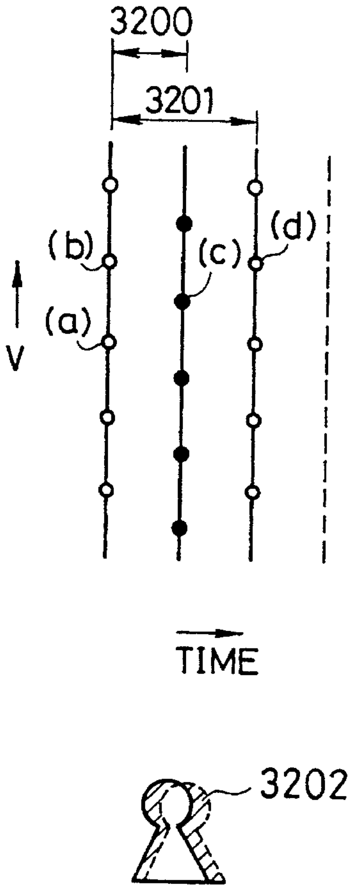
FIGS. 32A and 32B illustrate the signal processings by the time axis filter 2901 and the horizontal filter 2903, respectively.
Figure 32B:
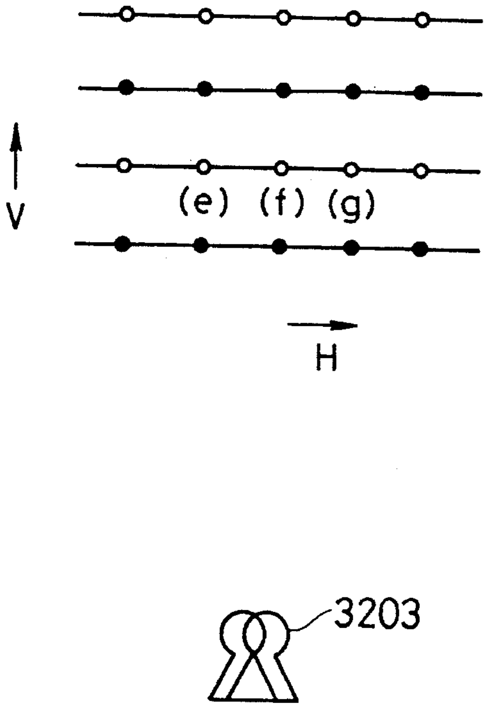

FIGS. 32A and 32B illustrate the signal processings by the time axis filter 2901 and the horizontal filter 2903, respectively. Here, distances 3200 and 3201 represent the field difference and the frame difference, respectively. The hatched portion 3202 in FIG. 32A illustrates a portion extracted by the time axis filter 2901 shown in FIG. 29. The edge portion 3203 shown in FIG. 32B illustrates a motion edge signal.

In FIG. 31, an arrangement for detecting a motion edge is combined with an arrangement of an averaging and adding circuit for reducing noises, and the signals from these two arrangements are selectively switched in accordance with the motion signal by the unit of picture element to thus obtain a luminance output signal. The function of the time axis filter is performed by the blocks from a frame memory 3101 to a subtractor 3106 and simultaneously the averaging and adding of interframe signals is performed by the blocks from the frame memory 3101 to an adder 3104. The horizontal filter 2903 has the same arrangement as that shown in FIG. 30. The horizontal filter 2903 extracts a motion edge signal of a picture and the motion edge signal is added to the luminance input signal to enhance the degree of resolution of a motion picture like in the arrangement shown in FIG. 30.

In FIG. 31, reference numeral 3100 denotes a time axis filter/averaging and adding circuit, in which is the luminance input signal is applied to a frame memory 3101 and a ½ multiple 3102. The output signal from the frame memory 3101 is applied to a ½ multipliers 3103 and 3105. The output signals from the multipliers 3103 and 3105 are applied to an adder 3104 and a subtractor 3106, respectively. The output signal from the adder 3104 is applied to the "still" position of a switch 3108 via a delay circuit 3107. The output signal from the subtractor 3106 is applied to the horizontal filter 2903. The output signal from the adder 2906 is applied to the "motion" position of the switch 3108. The switch 3108 is controlled by the motion signal.

When the degree of resolution of a motion picture is reduced relative to that of a still picture in frequency band compression techniques for picture, the arrangements shown in FIGS. 29–31 make it possible to achieve an improvement on the degree of resolution of a motion picture by merely adding simple circuits.

In addition, the combination of the time axis filter with the noise elimination circuit is more effective, since the time axis filter and the noise elimination circuit can share the same hardware.

Furthermore, the above-mentioned arrangements are used in the encoder, so that it is not necessary to transmit any special signal to the decoder from the encoder. Consequently, it is not necessary to complicate the circuits on the decoder side.

(4) DETAILS OF THE DECODER

Embodiments of various portions of the decoder shown in FIG. 2 will now be described in detail with reference to FIGS. 33–45.

(4.1) THE TOP AND BOTTOM REGIONS (4.1.1) $V_H$ PROCESSING

FIG. 33 shows one embodiment of the $Y_{VH}$ decoder 211 shown in FIG. 2. The $Y_{VH}$ decoder 211 has a Y/C separator 3301 which receives the $Y_{VH}$ and $C_H$ signals from the top and bottom separator 203 to extract the $Y_{VH}$ signal and a time base expansion and line converter 3302 receiving the $Y_{VH}$ signal from the Y/C separator 3301. The input $Y_{VH}$ signal is twice expanded in time domain so that the top 80 line signal and the bottom 80 line signal are expanded to 160 line signals, respectively. A 55 line dummy signal is combined to the both sides of the two 160 line signals to obtain the $Y_{VH}$ signal as illustrated in portion (3) in FIG. 4. In this way, the top and bottom 80 line signals (80×2 lines in total) are converted into the 375 line signal (80×2)×2+55=375). The 375 line signal is further converted into the 750 line $Y_{VH}$ signal by a line converter 3303. The 750 line $Y_{VH}$ signal is applied to an adder 212B in the line converter 212, in which the output signals $Y_{VL}$ and $Y_H$ from the top and bottom separator 203 is supplied to a line converter portion 212A for converting the 375 line signal to the 750 line signal. In the line converter 212, the 750 line $Y_{VL}$ and $Y_H$ signals are applied to the adder 212B so that the 750 line $Y_{VL}$ and $Y_H$ signals are added to the 750 line $Y_{VH}$ signal from the $Y_{VH}$ decoder 211 to output the 750 line $Y_V$ and $Y_H$ signals, which are further subject to the line conversion from 750 lines to 1125 lines in the line converter 213. The 1125 line luminance signal having the $Y_H$ and $Y_V$ components is derived from the line converter 213.

(4.1.2) $C_H$ PROCESSING

Figure 34:
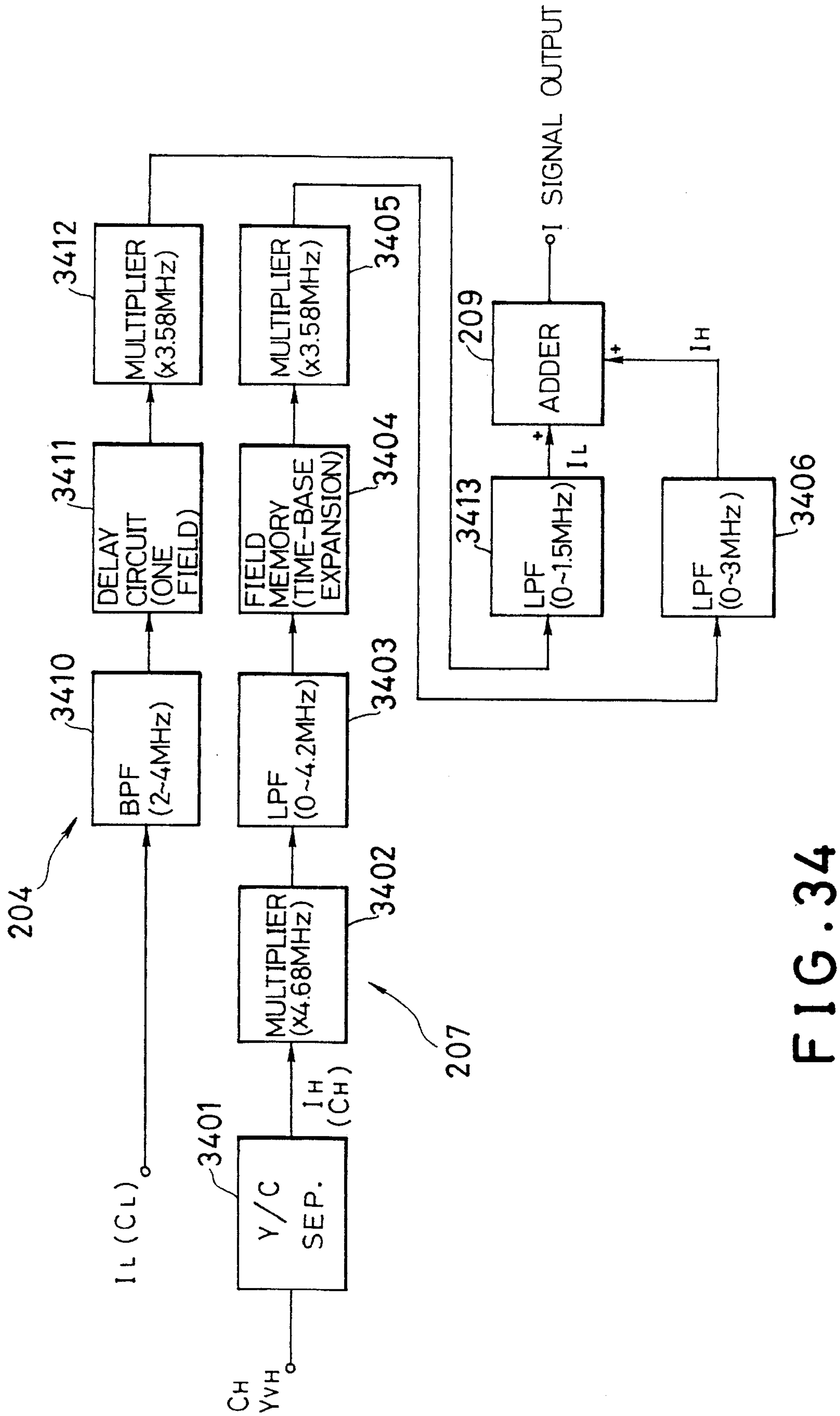
FIG. 34 is a block diagram showing one embodiment of the $C_H$ decoder 207 shown in FIG. 2.

FIG. 34 shows one embodiment of the $I_L$ decoder portion in the NTSC decoder 204 and the $C_H$ decoder 207 shown in FIG. 2. In FIG. 34, only the arrangement for processing the I signal is illustrated for the sake of simplicity of explanation, the same process is performed on the Q signal.

In FIG. 34, the upper channel corresponds to the low band I signal ($I_L$) decoder in the NTSC decoder 204 and the lower channel corresponds to the $C_H$ decoder 207.

The $C_H$ decoder 207 has a Y/C separator 3401 which receives the $Y_{VH}$ and $C_H$ signals from the top and bottom separator 203 to extract the $C_H$ signal. The $I_H$ signal component of the $C_H$ signal extracted is applied to a multiplier 3402 which multiplies the $I_H$ signal by 4.68 MHZ to recover the high band vertical $I_H$ component signal. The $I_H$ signal passes through a low pass filter 3403 having a pass bandwidth of 0–4.2 MHz. The filter output is applied to a field memory 3404 as a time base expansion circuit, since the $I_H$ signal has been time compressed on the encoder side. The time expanded signal is then applied to a multiplier 3405 to multiply the time expanded signal by 3.58 MHz to demodulate the $I_H$ signal. The demodulated $I_H$ signal is supplied to a low pass filter 3406 having a pass bandwidth of 0–3 MHz to obtain the $I_H$ signal.

Figure 35:
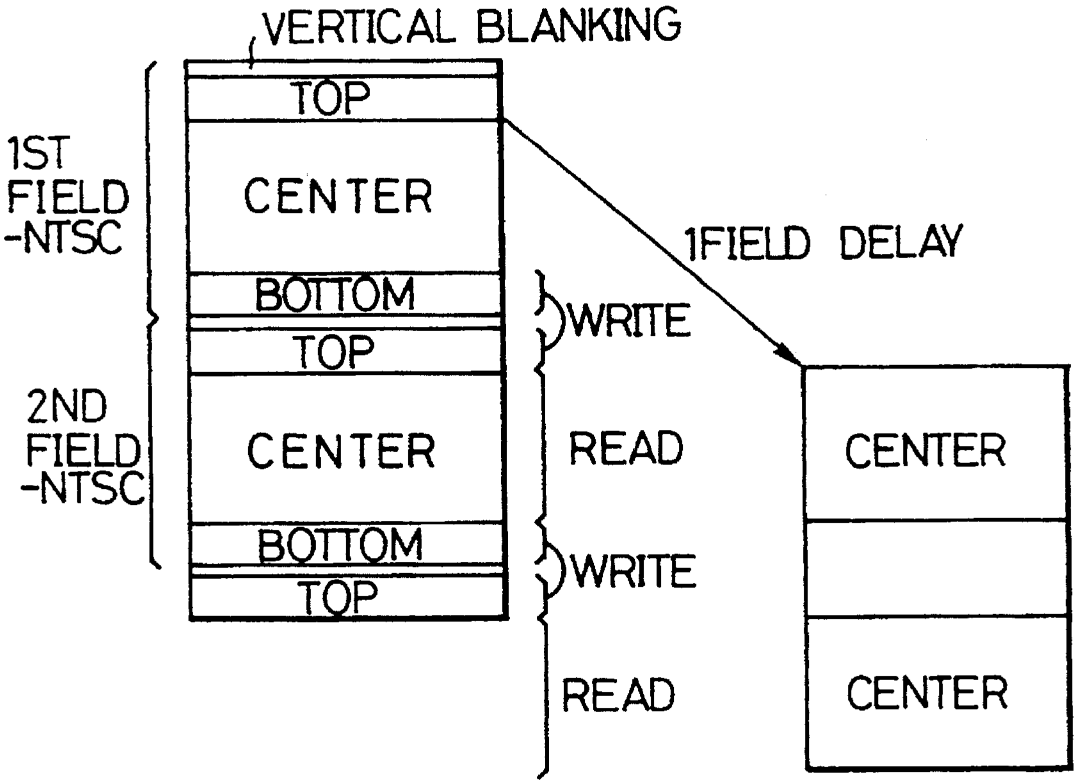
FIG. 35 illustrates the signal timings in the field memory shown in FIG. 34.

The $I_L$ decoder portion has a band pass filter 3410 having a pass bandwidth of 2–4 MHz. The $C_L$ signal (modulated $I_L$ signal) from the Y/C separator 202 is applied to the band pass filter 3410 to derive the modulated $I_L$ signal, which is then applied to a one-field delay circuit 3411. As illustrated in FIG. 35, the time compressed information in one field represents the upper and lower portions of a previous field, so that the central portion of the field must be delayed in the delay circuit 3411 to correctly match the upper and lower portions with the central portion. The one-field delayed signal is applied to a multiplier 3412 to multiply the delayed signal by 3.58 MHz to demodulate the $I_L$ signal. The demodulated $I_L$signal is supplied to a low pass filter 3413 having a pass bandwidth of 0–1.5 MHz to obtain the $I_L$ signal. The upper and lower portions (IH) are then combined with the central portion ($I_L$) in the adder 209 to provide the full I signal.

Figure 36:
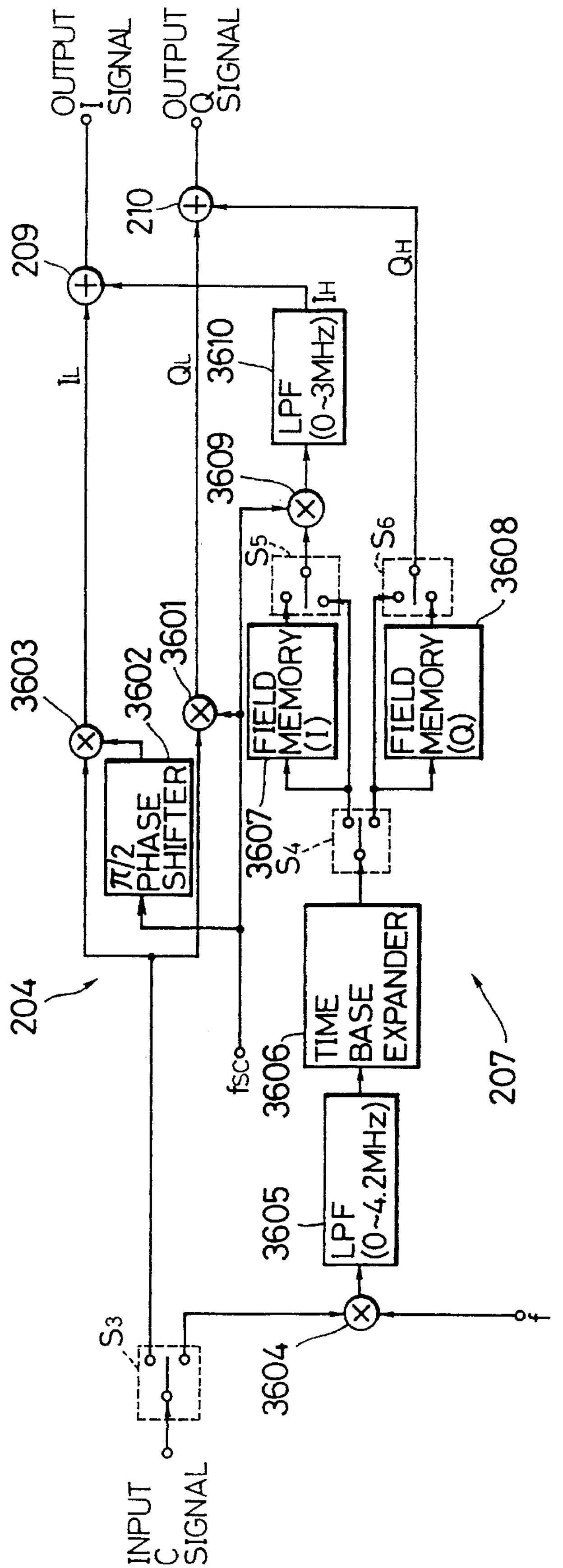
FIG. 36 is a block diagram showing another embodiment of the $C_H$ decoder 207 shown in FIG. 2.

FIG. 36 shows another embodiment of the $C_H$ decoder 207 in FIG. 2. In FIG. 36, the portion of the NTSC decoder 204 for decoding the center portion, i.e., the low band chrominance components $I_L$ and $Q_L$ is also shown.

The high band chrominance component (modulated signal) $C_H$ is first switched by a switch S3 to multipliers 3601 and 3603 when the central portion is scanned or to a multiplier 3604 when the top and bottom portions are scanned.

In the chrominance component decoding portion in the NTSC decoder 204, the input chrominance signal from the switch S3 is multiplied by a color subcarrier wave $f_{sc}$ of 3.58 MHz as in the usual NTSC system by a multiplier 3601 to obtain the low band Q component signal $Q_L$. The input chrominance signal is also multiplied by the output from a $\pi/2$ phase shifter 3602 for shifting and the phase of the color subcarrier by $\pi/2$ by a multiplier 3603 to obtain the low band I component signal $I_L$.

On the other hand, in the $C_H$ decoder 207, the input chrominance signal is multiplied by a carrier wave f having a frequency equal to the modulation frequency used for the modulation of the high band chrominance component on the encoder side by a multiplier 3604 and thus the high band component of the chrominance signal is demodulated. The frequency band of the high band I signal ranges from 0.52 MHz to 3.52 MHz, while that of the high band Q signal ranges from 0.68 MHz to 3.68 MHz. Therefore, if the frequency of the carrier wave is assumed to be 4.58 MHz ($=(17/13)\cdot f_{sc}$), the bands of the demodulated signals are 1.16–4.16 MHz and 5.84–8.84 MHz for the I signal and 1.0–4.0 MHz and 5.36–8.36 MHz for the Q signal. Among these frequency components, only the low band components pass through a low pass filter 3605 having a pass band of 0–4.2 MHz. Then, the filter output is applied to a time base expander 3606, so that the signal band width of the high band I signal ranges from 0.58 MHz to 2.08 MHz and that of the high band Q signal ranges from 0.5 MHz to 2.0 MHz in this example.

Since the high band component of the chrominance signal is transmitted in field sequence, it is necessary to perform field interpolation. In this embodiment, a so-called zero degree interpolation is performed by a switch S4 connected to the time base expander 3606, field memories 3607 and 3608 connected to the switch S4 and switches S5 and S6 connected to the switch S4 and the field memories 3607 and 3608. When the high band I signal $I_H$ is transmitted, the switch S4 is switched to the upper position, while the switch S5 is switched to the lower position and the high band I signal $I_H$ is stored in the field memory 3607. Simultaneously, the stored signal is transferred to the switch S5. On the other hand, when the high band Q signal $Q_H$ is being transmitted, the switch S4 is switched to the lower position, while the switch S5 is switched to the upper position, so that the high band I signal $I_H$ in the previous field stored in the field memory 3607 is transferred to the switch S5. The field memory 3608 also operates like the field memory 3607 and the high band Q signal $Q_H$ is also continuously transferred to the switch S6. The high band I signal $I_H$ from the switch S5 is demodulated by a color subcarrier $f_{sc}$ by the multiplier or demodulator 3609. As a result, the bands of the high band I signal $I_H$ become 1.5–3.0 MHz and 4.16–5.66 MHz, of which only the lower band signal component is passed through a low pass filter 3610. Thus, this high band I signal $I_H$ corresponds to the high band component of 1.5–3.0 MHz obtained when the I signal is separated by the encoder. The high band I signal $I_H$ is added to the low band I signal $I_L$ by the adder 209 to reproduce the I signal prior to the processing in the encoder shown in FIG. 1. The band of the high band Q signal $Q_H$ from the switch S6 becomes 0.5–2.0 MHz. Thus, this Q signal $Q_H$ corresponds to the high band Q signal obtained when the input Q signal is separated in the encoder shown in FIG. 1. The high band Q signal $Q_H$ is added to the low band Q signal $Q_L$ by the adder 210 to reproduce the Q signal prior to the encoding process.

While in this embodiment it is assumed that the frequency bands of the two chrominance signals are 3 MHz and 2 MHz, the frequency bands are not necessarily limited to these specific frequencies.

(4.2) HORIZONTAL HIGH BAND LUMINANCE COMPONENTS (4.2.1) FIRST EMBODIMENT

Figure 37:
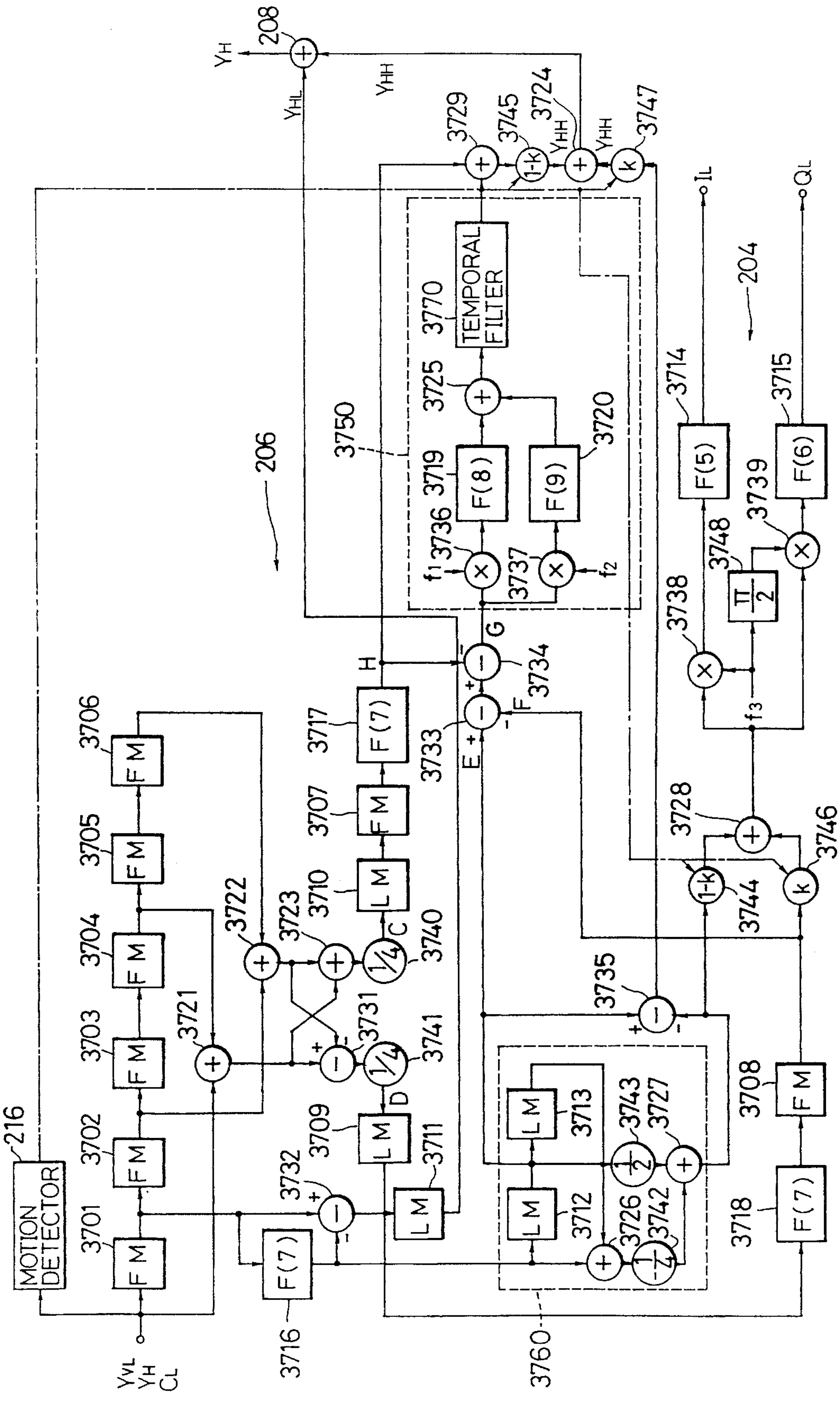
FIG. 37 is a block diagram showing one embodiment of the $Y_{HH}$ decoder 206 shown in FIG. 2.

FIG. 37 shows one embodiment of the $Y_{HH}$ decoder 206 shown in FIG. 2. This embodiment corresponds to the first embodiment of the encoders 127 and 129 shown in FIG. 11. In FIG. 37, the portion for decoding the low band chrominance signals in the NTSC decoder 204 is also shown.

In FIG. 37, reference numerals 3701–3708 denote field memories (FM). Reference numerals 3709–3713 denote line memories (LM). Reference numerals 3714–3720 denote filters having characteristics shown in FIGS. 12F–12J. That is, the filters F(5)–F(9) shown in these blocks 3714–3720 correspond to FIGS. 12F–12J, respectively. Reference numerals 3721–3729 denote adders. Reference numerals 3731–3735 denote subtractors. Reference numerals 3736–3739 denote multipliers as demodulators. Reference numerals 3740 and 3741, 3742 and 3743 denote ¼, –¼ and ½, dividers, respectively. Reference numerals 3744 and 3745, and 3746 and 3747 denote, (1-k) and k coefficient circuits, respectively. Reference numeral 3748 denotes a $\pi/2$ phase shifter. Reference numerals 3750 and 3760 denote demodulators for luminance and chrominance signals. Reference numeral 3770 denotes a temporal filter.

Since the subcarrier signals $f_1$ and $f_2$ used for the frequency interleaving (see FIG. 16) are equal to 480+7.5 Hz and 240+7.5 Hz, respectively, so that the subcarriers have a 4 field period (7.5×4=30 Hz) or are phase shifted over four fields, the input $Y_{VL}$, $Y_H$ and $C_L$ signals in four fields and required to demodulate the horizontal high band luminance component $Y_{HH}$. Thus, the input signals are applied to the six field memories 3701–3706 connected in cascade to form a transversal filter for four field signals so as to store the signals in four successive fields. The signals from the first field and the fifth field are added to each other in the adder 3721, and the signals from the third field and the seventh field are added to each other in the adder 3722. The outputs from these two adders 3721 and 3722 are added and subtracted in the adder 3723 and subtractor 3731, respectively, and are then divided by four in the divider circuits 3740 and 3741. The divider output characteristics at points C and D are illustrated in FIGS. 17C and 17D, respectively. The signals appearing at points C and D provide a baseband chrominance and luminance signal.

The demodulator circuit 3750 functions to demodulate the high frequency band components in the portions (3) and (4) of the luminance signal (see FIG. 12 or 15). The demodulator circuit 3760 for demodulating the chrominance signal in the moving picture region by using intrafield interpolation. The signal from the filter 3716 having a bandwidth between 2 and 4.2 MHz is applied to the line memory circuits 3712 and 3713, in the demodulator 3760 where successive lines are added and averaged by the adders 3726 and 3727 and the dividers 3742 and 3743. The luminance signal in the motion picture region is demodulated using the demodulated chrominance signal which passes through the subtractor 3735.

The subtractors 3733 and 3734 subtract the chrominance signal at point F and the baseband signal (portion (2)) of the luminance signal from the signal at point E to obtain at point G the signals in the portions (3) and (4) which are multiplexed in the portion (2) and frequency interleaved. The signals at point G are demodulated in the mixers 3736 and 3737 by multiplication with subcarriers $f_1$ and $f_2$ and passed through the filters 3719 and 3720 having characteristics shown in FIGS. 12I and 12J, where they are combined and inputted into a temporal filter 3770 to demodulate the signals in the portions (3) and (4).

Figure 38:
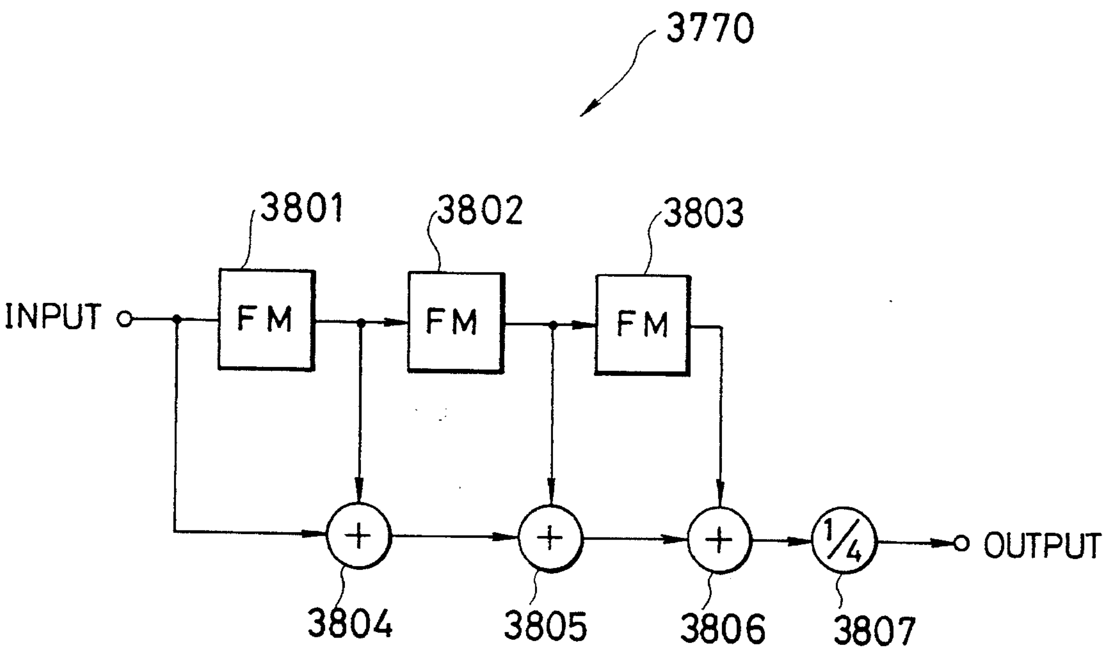
FIG. 38 is a block diagram showing one embodiment of the temporal filter 3770 shown in FIG. 37.

One embodiment of the temporal filter 3770 is shown in FIG. 38.

In FIG. 38, the temporal filter 3770 has three frame memories (FM) 3801, 3802 and 3803 connected in cascade, adders 3804, 3805 and 3806 which add the input signal and the output from the frame memory 3801, the outputs from the adder 3804 and the frame memory 3802, and the outputs from the adder 3805 and the frame memory 3803, and a ¼ divider 3807 receiving the output from the adder 3806 to output the luminance output of the temporal filter. The temporal filter 3770 has a characteristic as illustrated in FIG. 17C.

In FIG. 37, the adder 3729 adds the output from the temporal filter 3770 to the output at point H (see FIG. 17E) from the filter 3717 to obtain the $Y_{HH}$ signal having the signal components in the portions (2), (3) and (4) as illustrated in FIG. 12A. Since this signal is demodulated only in the frequency region of a still picture, the signal $Y_{HH}$ is supplied to the coefficient circuit 3745 and the luminance signal $Y_{HH}$ in the frequency region of a motion picture from the subtractor 3735 is also supplied to the coefficient circuit 3747 under the control of the motion signal from the motion detector 216, so that the outputs from the coefficient circuits 3745 and 3747 are added to each other by the adder 3724 to obtain a weighted average output of both the $Y_{HH}$ signals. This $Y_{HH}$ signal from the adder 3724 is further added to the $Y_{HL}$ signal from the line memory 3711 to obtain the decoded wide band horizontal luminance output signal $Y_H$, which is applied to the line converter 212 in FIG. 2.

In FIG. 37, the demodulated chrominance signal in the motion picture area from the demodulator 3760 is added to the output from the frame memory 3708 via the respective coefficient circuits 3744 and 3746 by the adder 3728 to obtain a weighted average output of the $C_L$ signal. This chrominance signal is multiplied by the carrier signal $f_3$ by the multiplier 3738. The carrier signal $f_3$ is phase shifted by $\pi/2$ by the $\pi/2$ phase shifter 3748. The phase shifted output is multiplied by the chrominance signal from the adder 3728 by the multiplier 3739. The outputs from the multipliers 3738 and 3739 pass through the filters 3714 and 3715, respectively, to produce the low band chrominance signals $I_L$ and $Q_L$.

(4.2.2) SECOND EMBODIMENT

Figure 39:
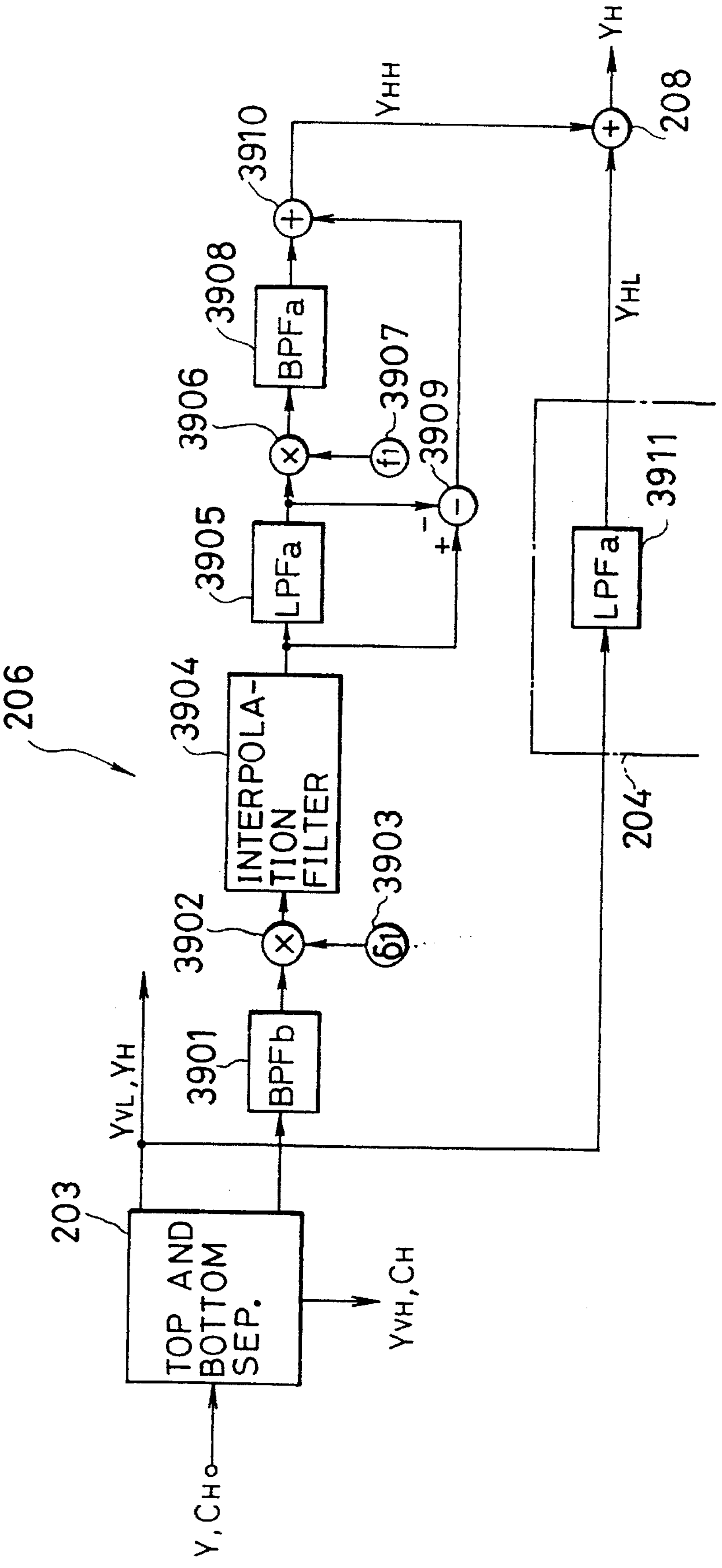
FIG. 39 is a block diagram showing another embodiment of the $Y_{HH}$ decoder 206 shown in FIG. 2.

FIG. 39 shows another embodiment of the simplified $Y_{HH}$ decoder 206 shown in FIG. 2. This embodiment corresponds to the encoder shown in FIG. 22. In FIG. 39, the $Y_H$ signal in the center portion of a frame from the top and bottom separator 203 is applied to a band pass filter (BPFa) 3901 having the characteristics corresponding to the filter 2009 shown in FIG. 22 to obtain the aliased multiplexed signal components in which the component in the portion (3) is aliased and multiplexed to the signal in the portion (2) in FIG. 12A. The output from the filter 3901 is applied to a multiplier 3902 in which the filter output is multiplied by the sub-sampling pulse having the frequency $\delta_1$ from a pulse generator 3903 to perform the sub-sampling. The sub-sampled output from the multiplier 3902 is applied to an interpolation filter 3904 to obtain the low and middle region signal components in which the component is the portion (3) aliased in the portion (2) is further developed to the portion (1) in addition to the component in the portion (3). The interpolated output is passed through a low pass filter (LPFa) 3905 having the characteristics corresponding to the filter 2211 in FIG. 22. The outputs from the filter 3905 is applied to a multiplier 3906 in which the carrier signal $f_1$ from the sine wave generator 3907 is multiplied by the filter output to output the frequency converted signal. The high band component of the frequency converted signal is applied to a band pass filter (BPFa) 3908 having the characteristics corresponding to the filter 2201 in FIG. 22 to extract the signal component in the port ion (3) . The output from the interpolation filter 3904 is also applied to a subtractor 3909 in which the output from the filter 3905 is subtracted from the output from the filter 3904. The output from the filter 3908 and the subtractor 3909 are added to each other by an adder 3910 to obtain the $Y_{HH}$ signal.

Reference numeral 3911 denotes a low pass filter (LPFa) corresponding to the filter 3905 in the NTSC decoder 204. The filter 3911 outputs the $Y_{HL}$ signal. The $Y_{HH}$ signal from the adder 3910 is added to the $Y_{HL}$ signal from the filter 3911 in the adder 208 to output the decoded $Y_H$ signal.

(4.2.3) PHASE-LOCKED SYNCHRONIZING CIRCUIT

In a convention digital receiver for receiving a television signal having compatibility with the NTSC system, it is usual that a clock having the frequency of 4 fsc (wherein fsc means the frequency of a color subcarrier) is regenerated from the color burst. However, in the system in which a high band horizontal component having a frequency of 4.2 MHz or more is aliased to a frequency band within 4.2 MHz by means of another subcarrier, it is necessary to regenerate this second subcarrier or the clock having a frequency other than 4 fsc on the receiver side. Since the carrier or the clock is not generally an integral multiple of fsc, it is necessary to obtain phase-locked synchronization information from signals other than the color burst signal.

Since, however, the HD signal in the improved NTSC composite signal is a binary signal, both the phase accuracy and stability of the HD signal are likely to be influenced by transmission lines and receiving circuits and thus its quality often becomes insufficient.

Figure 40:
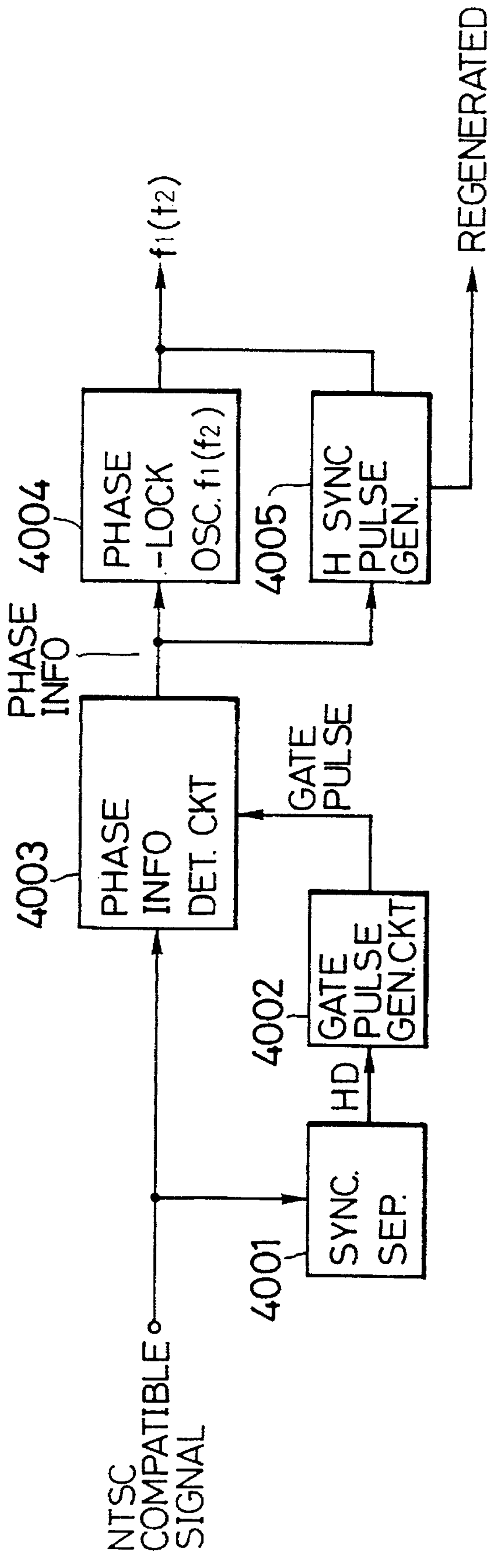
FIG. 40 is a block diagram showing one embodiment of the phase-locked synchronizing circuit 217 shown in FIG. 2.

One embodiment of a phase-locked synchronizing circuit 217 is shown in FIG. 40. In FIG. 40, the circuit comprises a synchronizing signal separation circuit 4001 from which a horizontal synchronizing signal HD is separated, a gate pulse generator 4002 for generating a gate pulse in accordance with the HD signal, a phase information detecting circuit 4003 for detecting phase information with respect to a predetermined zero crossing point in the color burst of a television signal, and a signal generator 4004 and an HD regeneration circuit 4005 for regenerating the horizontal synchronizing pulse (HD) and at least one of the clock and carrier in accordance with the phase information outputted from the phase information detecting circuit 4003.

In FIG. 40, it is assumed that the input signal is an improved NTSC signal having a compatibility with an NTSC signal. In particular, its synchronizing waveform portions are completely identical with those in the NTSC signal.

Figure 41A:
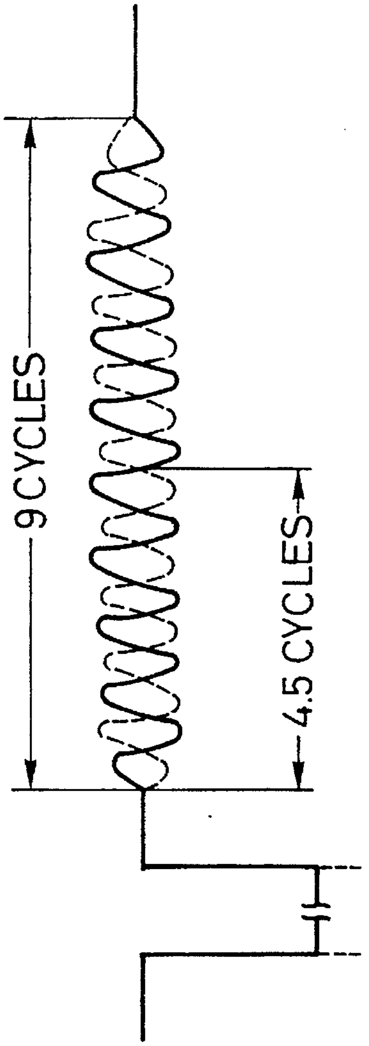
FIGS. 41A, 41B and 41C illustrate signal waveforms in various portions in FIG. 40.
Figure 41B:
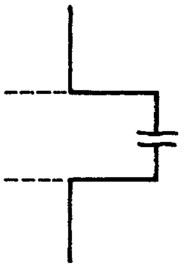
Figure 41C:
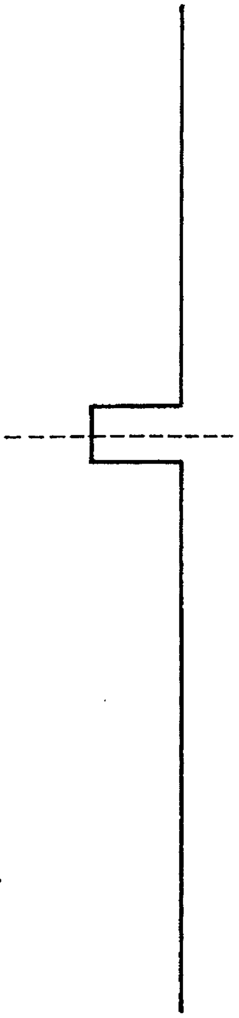

An NTSC compatible signal is inputted to a synchronizing signal separation circuit 4001 in which a horizontal synchronizing signal (HD pulse) is separated from the inputted signal by means of amplitude separation. The relation between the input signal and the amplitude-separated HD is illustrated in FIGS. 41A and 41B. This amplitude-separated HD pulse is inputted to a gate pulse generating circuit 4002 in which the phase thereof is delayed and the waveform is shaped to form a gate pulse as illustrated in FIG. 41C. In this example, the gate pulse is a pulse which covers the vicinity of a zero crossing point (a point at which fsc and a pedestal level intersect) at 4.5th cycle of fsc (color subcarrier) having 9 cycles in terms of its phase. The fsc has 9 cycles per 1H period (one scanning period). However, if the gate pulse is thus restricted to, for instance, the zero crossing point at the 4.5th cycle, only one point is obtained per 1H. If the phase information is detected at this point, the horizontal synchronizing pulse can be regenerated and the clock or carrier having a frequency equal to an integral multiple of any fh (fh means a horizontal synchronizing frequency) can be synchronously regenerated. In addition, since the fsc signal is symmetrical between the upper and lower halves with respect to the pedestal level, unlike the conventional binary synchronizing signal used in the synchronizing separation circuit, the phase information can be detected in more correct and stable manner as compared with the conventional one.

Figure 44:
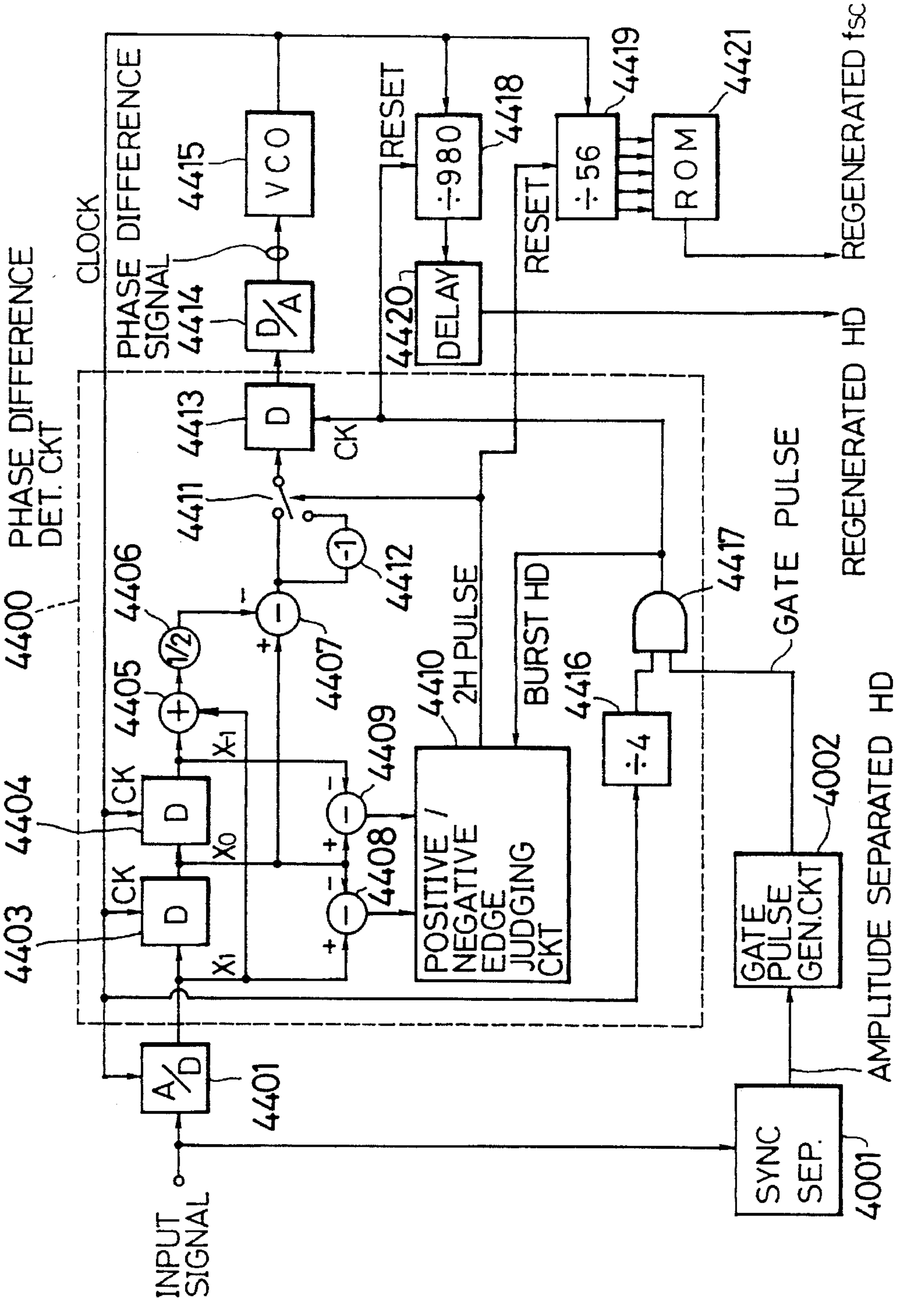
FIG. 44 is a block diagram showing a further embodiment of the phase-locked synchronizing circuit 217 shown in FIG. 2.

The phase information detecting circuit 4003 shown in FIG. 40 detects phase information from the color burst portion of the input NTSC compatible signal once a 1H period at the timing of the gate pulse from the gate pulse generating circuit 4002. In the phase-locked oscillator 4004, a clock having a frequency of Nfh is synchronously regenerated in accordance with the phase information from the phase information detecting circuit 4003. An HD pulse whose phase is accurate and stable is regenerated in the horizontal synchronizing pulse regenerating circuit 4005 in accordance with the clock from phase-locked oscillator 4004 and the phase information from the phase information detecting circuit 4003. Specific circuit arrangements of the circuits 4003, 4004 and 4005 can be realized by, for instance, circuits as shown in FIGS. 42 and 44 as will be explained later.

Figure 42:
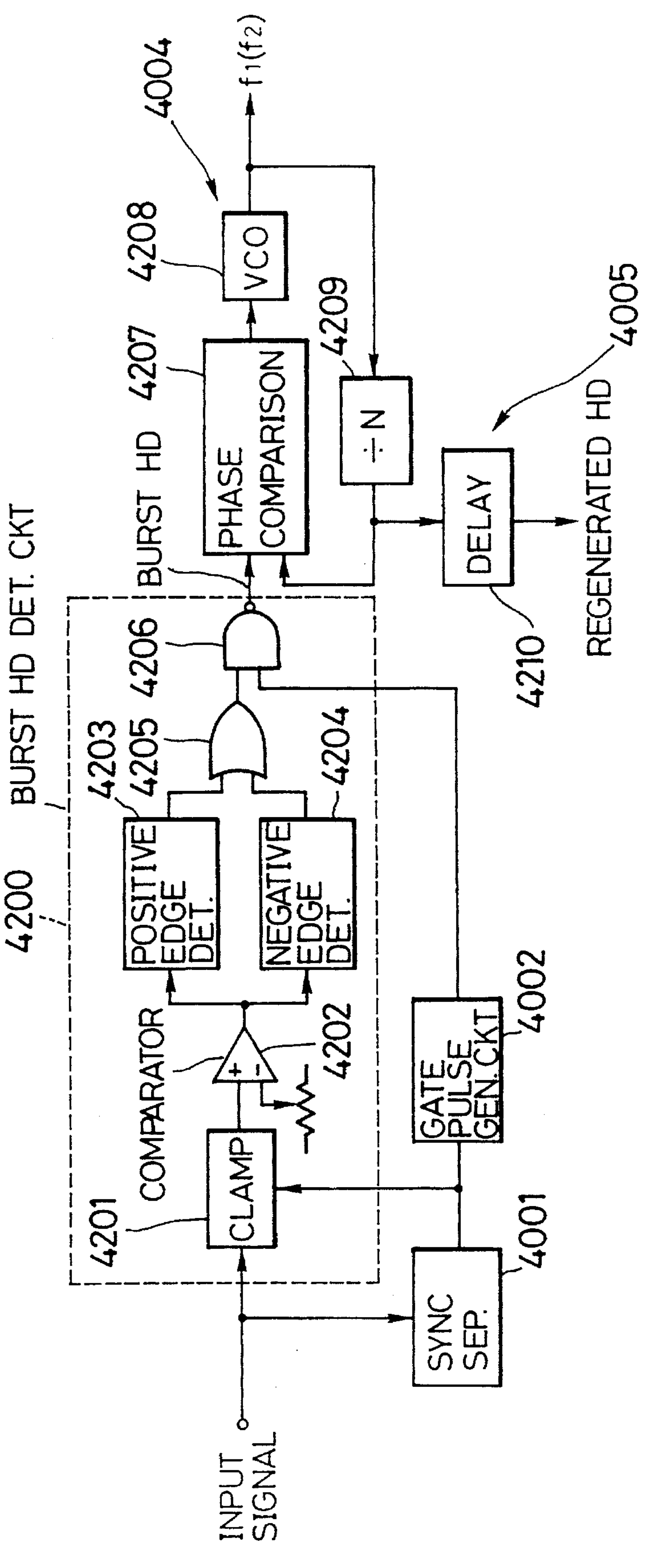
FIG. 42 is a block diagram showing another embodiment of the phase-locked synchronizing circuit 217 shown in FIG. 2.

FIG. 42 shows another embodiment of the phase-locked synchronizing circuit. In FIG. 42, portions corresponding to those in FIG. 40 are shown by using the same reference numerals. Reference numeral 4200 denotes a burst HD detecting circuit which corresponds to the phase information detecting circuit 4003 shown in FIG. 40.

The input NTSC compatible signal is subjected to pedestal clamping in a clamping circuit 4201 and is then sliced by the pedestal level in a comparator 4202. The output from the comparator 4202 is a binary signal which indicates the comparison result, i.e., whether the input signal is higher or lower than the pedestal level.

Figures 43A, 43B, 43C, 43D, 43E:
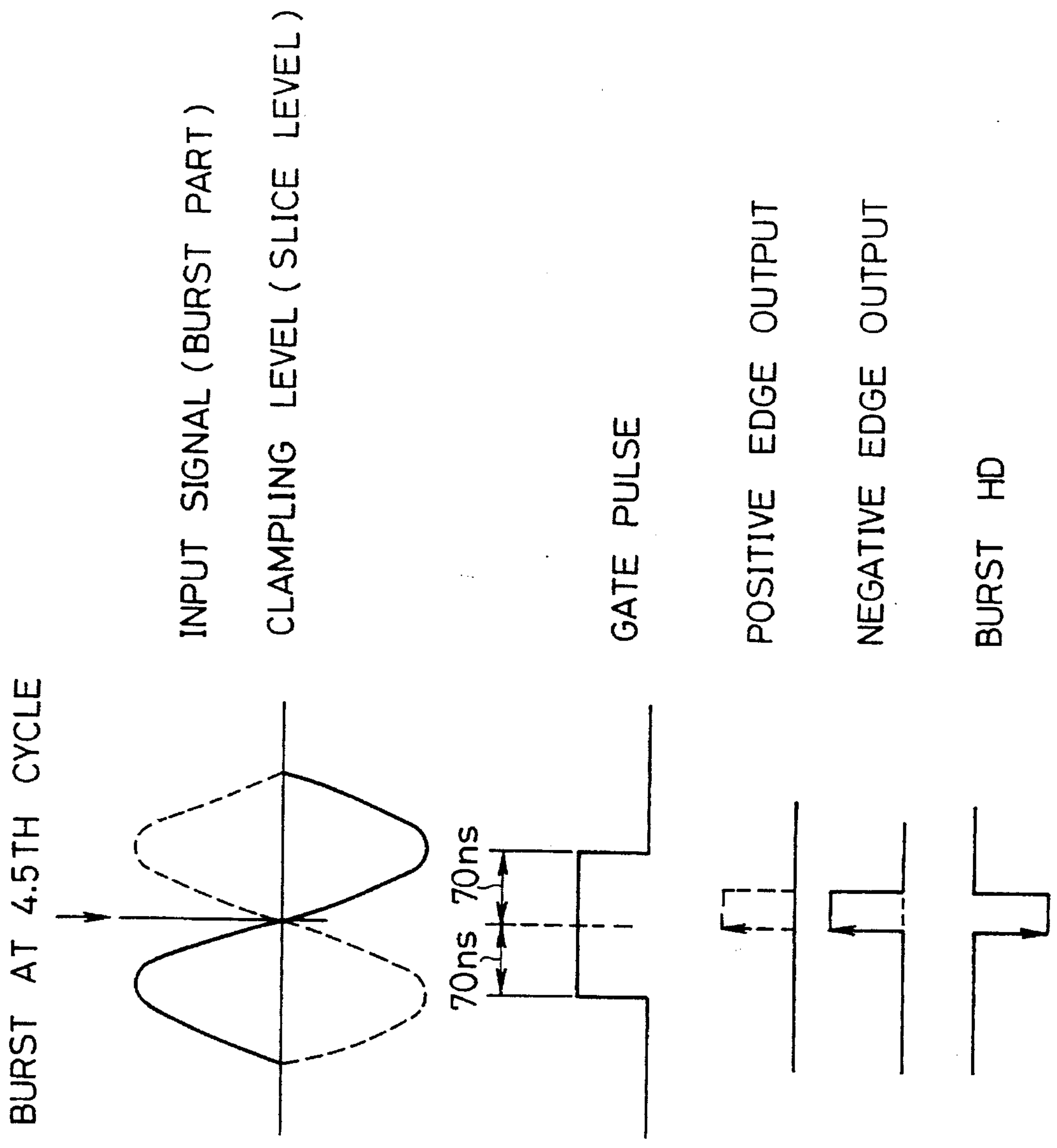
FIGS. 43A–43E illustrate signal waveforms in various portions in FIG. 42.

The output from the comparator 4202 is inputted to both a positive edge detecting circuit 4203 and a negative edge detecting circuit 4204. These circuits 4203 and 4204 generate a pulse having a fixed width when the binary signal is changed from "0" to "1" or from "1" to "0". These circuit 4203 and 4204 may be realized by a monostable multivibrator. Pulses generated by these circuits 4203 and 4204 are illustrated in FIGS. 43A–43E. FIG. 43A illustrates a part of the color burst between the 4th and 5th cycles. As is well known, the phase of fsc is reversed every 1H, but its phase at the zero crossing point remains unchanged. Therefore, as illustrated in FIGS. 43C and 43D, a pulse is always generated in either of the positive and negative edge outputs. Since this pulse is generated at other positions of the burst or in a waveform portion other than the burst, it is possible to generate the pulse only at the zero crossing point of the burst at, for instance, 4.5th cycle by means of the gate pulse as illustrated in FIG. 43B.

In the circuit shown in FIG. 42, this pulse is referred to as a burst HD. The outputs from the positive edge detecting circuit 4203 and the negative edge detecting circuit 4204 are gated out through an OR gate 4205. The OR output is gated by the gate pulse from the gate pulse generating circuit 4002 through an AND gate 4206 to generate the burst HD. The gate pulse is related to the HD pulse separated by the synchronizing signal separation circuit 4001, so that the phase relation between the gate pulse and the input signal is as illustrated in FIGS. 43A and 43B. Therefore, the phase of the gate pulse has a margin of the order of ±70 nsec and thus the circuit shown in FIG. 42 operates correctly and stably until the change in the phase of the gate pulse exceeds ±70 nsec.

The burst HD pulse from the AND gate 4206 is applied to a phase comparator 4207. The clock synchronized with the burst HD is regenerated by a usual phase locked loop (PLL) which has the phase comparator 4207, a voltage-controlled oscillator (VCO) 4208 and a 1/N frequency divider 4209. The output from the 1/N frequency divider 4209 has a frequency of fh, but has a phase different from that of the original HD, since the phase of the burst HD differs from that of the original HD. Thus, a regenerated HD pulse is obtained by properly delaying the output from the 1/N frequency divider 4209 by a delay circuit 4210.

A further embodiment of the phase-locked synchronizing circuit is shown in FIG. 44. In FIG. 44, the frequency fck of the regenerated clock is assumed to be 980 fh (about 15 MHz). The input signal is first converted into a digital signal by an A/D converter 4401 and the digital signal is inputted to a phase difference detecting circuit 4400 which corresponds to the phase information detecting circuit 4003 shown in FIG. 40.

In the phase difference detecting circuit 4400, the input digital signal is shifted each by one clock by latches 4403 and 4404. The shifted signals are denoted by, in order $x_1$, $x_0$ and $x_{-1}$ from the input of the latch 4403. The value of $x_1+x_{-1}$ is obtained by an adder 4405 and the value is multiplied by ½ by a ½ coefficient circuit 4406. The outputs from the latch 4403 and the coefficient circuit 4406 are applied to a subtractor 4407 to obtain a subtraction output expressed by the following equation:

$$x_0(x_1+x_{-1})/2.$$

On the other hand, the signals $x_1$ and $x_0$ and the signals $x_0$ and $x_{-1}$ are applied to subtractors 4408 and 4409 to obtain subtraction outputs represented by the following relations, respectively:

Output from the subtractor 4408=$x_1-x_0$

Output from the subtractor 4409=$x_0-x_1$. These outputs are inputted to a positive/negative edge judging circuit 4410 for judging whether the edge of the inputted signal is a positive or negative edge according to, for instance, a logic as will be described below. The result of the judgement is outputted as a binary value "0" or "1". This judgement is performed once a 1H period when the burst HD is inputted to the judging circuit 4410. The condition in the previous line is simply reversed, if the judgement of the edge in the present line is judged to be disabled in accordance with the outputs from the subtractor 4408 and 4409. As a result, the output from the judging circuit 4410 is a 2H pulse having a period of 2H in which "0" and "1" are reversed every 1H period.

The output from the subtractor 4407 is supplied to the inputs of a switch 4411 directly and via a(−1) coefficient circuit 4412, respectively. The switch 4411 is controlled by the 2H pulse outputted from the judging circuit 4410. For instance, the output from the subtractor 4407 is inputted to a latch 4413 for lines in which the 2H pulse is "0", while the output from the (−1) coefficient circuit 4412 in which the polarity of the output from the subtractor 4407 is reversed is inputted to the latch 4413 for lines in which the 2H pulse is "1". The latch 4413 latches the input data when the burst HD as the clock input CK is inputted to hold the latched data for a period of 1H.

The output from the phase difference detecting circuit 4400 which is the output from the latch 413 is applied to a D/A converter 4414 to output an analog phase difference signal. AVCO 4415 is controlled by the analog phase difference signal to generate the clock. The generated clock controls the sample phase by the feedback thereof to the A/D converter 4401 and the latches 4403 and 4404. The clock is also inputted to a ¼ frequency divider 4416. The output frequency of the ¼ frequency divider 4416 is determined by the following relation;

$$(1/4)\times 980fh=490fh/2\simeq 1/(260nsec)$$

The value is close to fsc and slightly higher than fsc. This output from the ¼ frequency divider 4416 is gated by the gate pulse from the gate pulse generating circuit 4002 in an AND gate 4417 to generate the burst HD.

On the other hand, the clock or the output from the VCO 4415 is also inputted to a 1/980 frequency divider 4418 and a 1/56 frequency divider 4419. In the 1/980 frequency divider 4418, the clock is frequency-divided by 980 and reset by the burst HD from the AND gate 4417 to form a pulse synchronized with the burst HD, which is properly delayed through a delay circuit 4420 to form the regenerated HD.

The 1/56 frequency divider 4419 and a ROM 4421 in combination regenerate fsc by making use of the fact that the ratio of fck to fsc is represented as follows;

$$fck:fsc=980:455/2=56:13$$

First, the 1/56 frequency divider 4419 is reset by the 2H pulse from the judging circuit 4410 to obtain an address signal which has a frequency of 980fh/56=(35/2)fh and is synchronized with the subcarrier in the input signal. This address signal is inputted to an address input of the ROM 4421. The subcarrier fsc synchronized with the burst signal in the input signal is regenerated by storing sine waves each having a waveform of 13 cycles in the ROM 4421 over 56 addresses. According to this method, it is in general possible to synchronously regenerate carriers having a frequency of (M/2) fh (M is an integer), like the above-mentioned regeneration of the subcarrier fsc.

Figures 45A, 45B, 45C:
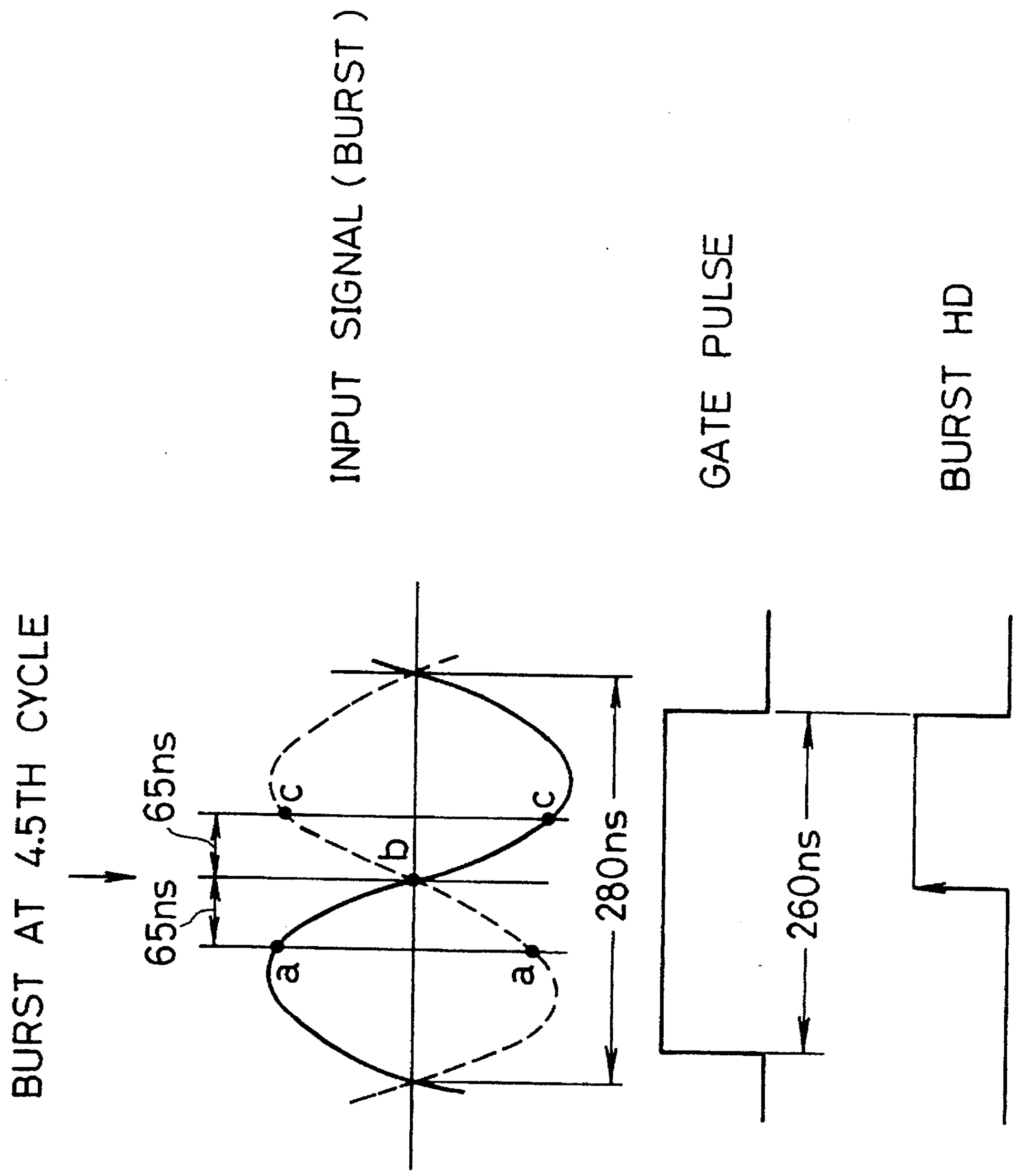
FIGS. 45A, 45B and 45C illustrate signal waveforms in various portions in FIG. 44.

A method for calculating a phase difference signal in FIG. 44 will be explained in more detail with reference to FIGS. 45A–45C. FIG. 45A illustrates the color burst in the vicinity of the zero crossing point at the 4.5th cycle of the color burst in the input signal. It is assumed that the gate pulse illustrated in FIG. 45B is shaped as a pulse having a width of 260 nsec in which the zero crossing point is positioned at the center thereof.

Since the frequency of the output signal from the ¼ frequency divider 4416 shown in FIG. 44 is about 260 nsec as explained in the above formula, the output signal thus has only one leading edge (positive edge) during the period that the gate pulse is "1". Therefore, the burst HD illustrated in FIG. 45C or the output from the AND gate 4417 correspondingly has only one positive edge during 1H period. The latch 4413 samples the output from the switch 4411 at this phase. FIGS. 45A and 45C show that the timing of this sampling coincides with the zero crossing point at the 4.5th cycle of the burst. In this case, the burst in one line has a negative edge which changes from the positive region to the negative region as shown by a solid line in FIG. 45A and, in the next line, the burst has a positive edge which changes from the negative region to the positive region as indicated by a dotted line in FIG. 45A. However, in either case, the sampling timings of the signals $x_1$, $x_0$ and $x_{-1}$ shown in FIG. 44 correspond to those at points a, b and c in FIG. 45A. If the sampling timing coincides with the zero crossing point as shown in FIGS. 45A and 45C, the following relation is obtained;

$$Vb=(Va+Vc)/2,$$

wherein the respective voltages at points a, b and c are Va, Vb and Vc, respectively. However, this relation is not true, if there is a phase difference. Thus, the phase difference signal $e_o$ can be defined as follows;

$$e_o=Vb-(Va+Vc)/2 \text{ (in the case of positive edge)}$$

$$e_o=(Va+Vc)/2-Vb \text{ (in the case of negative edge)}$$

This signal $e_o$ corresponds to the phase difference signal per se from the D/A converter 4414 shown in FIG. 44. If a sample phase is controlled by the signal $e_o$, the circuit arrangement shown in FIG. 44 can regenerate a clock and an HD which are synchronized with the zero crossing point at the 4.5th cycle of the burst. In this case, the judgment on whether an edge is positive or negative can be performed, for example, as follows;

If $Vc-Vb>0$ and $Vb-Va>0$, positive edge

If $Vc-Vb<0$ and $Vb-Va<0$, negative edge.

Thus, the judgment can be realized by incorporating this logic into the circuit 4410.

The margin in the phase of the gate pulse illustrated in FIG. 45B is equal to ±130 nsec which is about 2 times longer than that of the circuit arrangement shown in FIG. 42, so that this wider margin provides more preferable results.

In this way, various synchronizing signals such as a horizontal synchronizing pulse, clocks and a variety of subcarriers can be synchronously regenerated on the receiver side without modifying the synchronizing waveforms in the NTSC signal or without superimposing a special signal for synchronous regeneration.

(5) ENCODER/DECODER UTILIZING SYSTEMS

Figure 46:
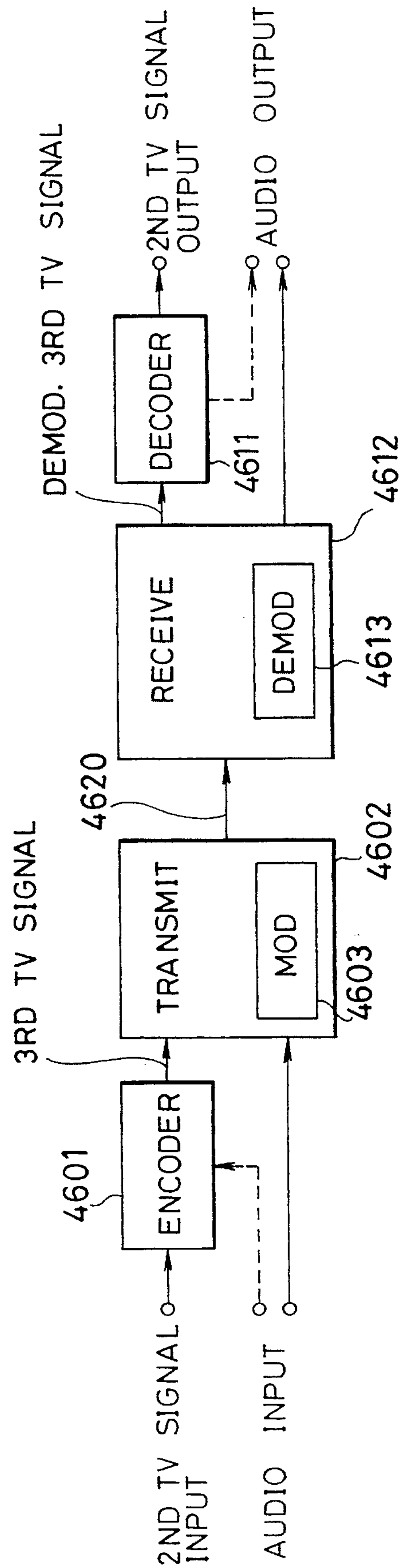
FIGS. 46 and 47 are block diagrams showing two embodiments of an encoder/decoder utilizing system according to the present invention.

FIG. 46 shows an embodiment of a broad bandwidth television signal transmission system as an encoder/decoder utilizing system according to the present invention. In FIG. 46, reference numeral 4601 and 4611 denote the entire encoder shown in FIG. 1 and the entire decoder shown in FIG. 2, respectively. Reference numeral 4602 and 4612 denote a transmitting portion having a modulator 4603 and a receiving portion having a demodulator 4613, respectively. Reference numeral 4620 denotes a transmission line such as a wireless transmission path including a broadcasting satellite system, a cable transmission system such as a CATV system, a coaxial cable system or a optical fiber cable system.

In FIG. 46, the encoder 4601 receives a second television signal input which is a high resolution television signal having the larger number of horizontal scanning lines, a broader frequency bandwidth and a larger aspect ratio of a display screen relative to a first television signal such as an NTSC television signal. The second television signal can be the 1125/60 color video signal which is applied to the analog to digital converter 101 in FIG. 1. The encoder 4601 outputs a third television signal, which is compatible with the first television signal, like the NTSC compatible signal from the digital to analog converter 133 in FIG. 1. The third television signal and an audio signal relating to the second television signal are applied to the transmitting portion 4602, in which the modulator 4603 modulates a transmitting carrier signal by the combined third television and audio signals.

The modulated output is transmitted through the transmission line 4620 to the receiving portion 4612, in which the demodulator 4613 demodulates the combined third television and audio signal. The demodulated third television signal is extracted from the combined third television and audio signal and applied to the decoder 4611, in which the second television signal is decoded and outputted. The demodulated audio signal is extracted from the combined third television and audio signal and used as the audio output signal.

The audio input signal may be applied to the encoder 4601 instead of the transmitting portion 4602, so that the audio signal is processed to be combined with the third television signal. In this connection, the audio output signal may be extracted in the decoder 4611 instead of the receiving portion 4612.

Figure 47:
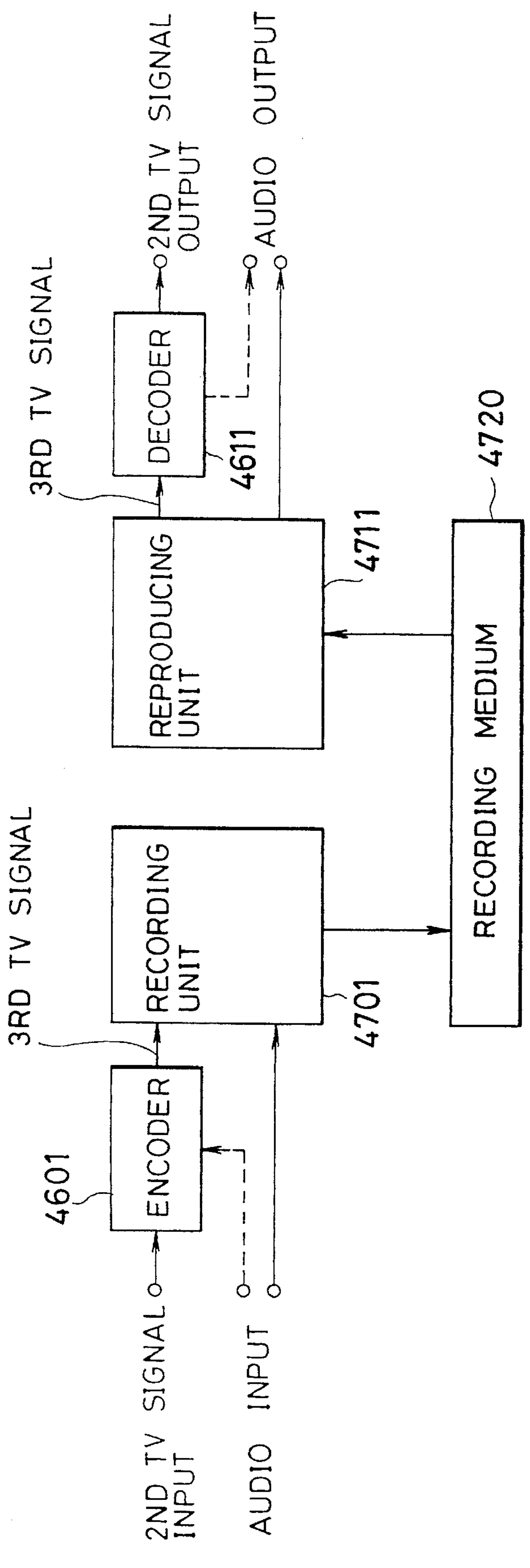

FIG. 47 shows an embodiment of a system for recording/reproducing a broad bandwidth television signal as an encoder/decoder utilizing system according to the present invention. In FIG. 47, the input second television signal is encoded by the encoder 4701 to output the third television signal which is compatible with the first television signal. The third television signal and the audio signal are applied to a recording unit 4701 for recording the combined third television and audio signal is recorded on a recording medium 4720 such as a magnetic disc or optical disc or a magnetic tape. The combined third television and audio signal thus recorded on the recording medium 4720 is reproduced by a reproducing unit 4711, from which the reproduced third television signal is derived. The third television signal is applied to the decoder 4611. The decoder 4611 decodes to output the second television signal. The audio output signal is derived from the reproducing unit 4720.

In FIG. 47, the audio signal can be processed in the encoder 4601 and the decoder 4611, as shown by the broken lines. In either embodiment, the audio signal can be processed in a conventional manner.

The invention has been described in detail with respect to preferred embodiments, and it will now be apparent from the foregoing to those skilled in the art that changes an modifications may be made without departing from the invention in its broader aspects, and it is the invention, therefore, in the appended claims to cover all such changes and modifications as fall within the true spirit of the invention.

What is claimed is:

1. An encoder for converting a second television signal with a high resolution and having the larger number of horizontal scanning lines, a broader frequency bandwidth and a larger aspect ratio of a frame relative to a first television signal into a third television signal which is compatible with said first television signal, said encoder comprising:

means for separating a luminance vertical high band component of said second television signal which is higher than a luminance vertical low band component of said second television signal from said second television signal, said luminance vertical high band component of said second television signal corresponding to a central scanning line portion out of said central portion and upper and lower scanning line portions of said first television signal, said central scanning line portion and said upper and lower scanning line portions being divided in the ratio of an aspect ratio of said first television signal to that of said second television signal;

means for converting the number of scanning lines of said second television signal obtained by removing said luminance vertical high band component from said second television signal, into the number of scanning lines in said central portion;

means for frequency-converting a luminance horizontal high band component in the second television signal from said means for converting and having a bandwidth higher than a frequency bandwidth of said first television signal, into a separable signal which is multiplexed to a frequency region higher than the frequency region of a luminance horizontal low band component in said second television signal and is separable on a decoder side;

means for multiplexing said separable signal to a luminance horizontal low band component;

delay means for time-shifting said luminance vertical high band component of said second television signal to said upper and lower scanning line portions; and means for combining an output from said means for multiplexing with an output from said delay means to obtain said third television signal.

2. An encoder as claimed in claim 1, wherein said first television signal is an NTSC standard television signal.

3. An encoder as claimed in claim 1, wherein said second television signal is produced by converting at least one of the number of scanning lines and a field frequency of a fourth television signal.

4. An encoder as claimed in claim 1, wherein said second television signal has substantially 750 scanning lines, a field frequency of substantially 59.94 Hz, and an aspect ratio of substantially 16:9.

5. An encoder as claimed in claim 3, wherein said fourth television signal has substantially 1125 scanning lines, a field frequency of substantially 60 Hz, and an aspect ratio of substantially 16:9.

6. An encoder as claimed in claim 1, wherein said luminance vertical high band component corresponds substantially to 345 central scanning lines in said central scanning line portion of said first television signal.

7. An encoder as claimed in claim 1, further comprising means for generating a carrier for frequency-converting the luminance horizontal high band component into said separable signal, the frequency of said carrier being so determined that the luminance horizontal high band component converted is multiplexed in a frequency-interleaving relationship with said horizontal luminance low band component.

8. An encoder as claimed in claim 7, further comprising:

means for generating a subcarrier;

means for modulating said subcarrier by a color signal of said second television signal; and means for multiplexing said luminance horizontal low band component in a frequency-interleaving relationship with the subcarrier modulated by said color signal, the frequency of said carrier for converting said luminance horizontal high band component into said separable signal being so determined that the luminance horizontal high band component converted is frequency-interleaved with said luminance horizontal low band component and said subcarrier modulated by said color signal.

9. An encoder as claimed in claim 8, wherein said carrier for frequency-converting said luminance horizontal high band component into said separable signal has a frequency substantially equal to (60n+7.5) (n: integer).

10. An encoder as claimed in claim 7, further comprising:

means for frequency-dividing said luminance horizontal high band component into first and second high band components; and means for modulating said first and second high band components with a carrier having a phase off-set at every frame, line and field.

11. An encoder as claimed in claim 8, further comprising:

means for frequency-dividing said luminance horizontal high band component into first and second high band components; and means for modulating said first and second high band components with a carrier having a phase off-set at every frame, line and field.

12. An encoder as claimed in claim 1, wherein said delay means comprises means for time-compressing the shifted luminance vertical high band component to time-division multiplex the vertical high band components in plural scanning lines.

13. An encoder as claimed in claim 1, wherein said means for separating and said means for converting the number of scanning lines include in common means for obtaining the sum of the two luminance signals in two scanning lines of said second television signals as said luminance vertical low band component, means for obtaining the difference between said two luminance signals as said luminance vertical high band component and means for selectively outputting one of said sum and said difference to form a luminance signal in one scanning line of said third television signal.

14. An encoder as claimed in claim 13, wherein said means for obtaining the difference performs a weighted subtraction of said two luminance signals in a manner that the d.c. components of said two luminance signals are cancelled out.

15. An encoder as claimed in claim 1, wherein said means for combining includes means for setting said output from said delay means at a level lower than the black level of said third television signal so that the output set at said level is combined with said output from said means for multiplexing.

16. An encoder as claimed in claim 1, further comprising:

means for separating a chrominance high band component of said second television signal from the chrominance signal of said second television signal having a bandwidth broader than the bandwidth of the chrominance signal of said first television signal;

means for time-shifting the chrominance high band components separated to said upper and lower scanning line portions; and means for multiplexing the chrominance high band component time-shifted to the chrominance component in said upper and lower scanning line portions.

17. An encoder as claimed in claim 16, wherein said means for multiplexing includes means for converting the frequency of said chrominance high band component to a frequency having a frequency-interleaving relation with said luminance vertical high band component.

18. An encoder as claimed in claim 17, wherein said chrominance signal of said second television signal has I and Q signals said means for multiplexing includes means for multiplexing the high band components of said I and Q signals to said upper and lower scanning line portions in field sequence.

19. An encoder as claimed in claim 1, further comprising:

means for detecting a motion in said second television signal to output a motion detection signal; and means for controlling said means for separating in accordance with said motion detection signal so that said luminance vertical high band component is separated from said second television signal when said motion detection signal is outputted.

20. An encoder as claimed in claim 1, further comprising:

means for detecting a motion in said second television signal to output a motion detection signal; and means for controlling said means for multiplexing so that the multiplexing of said separable signal to said luminance horizontal low band component is suppressed when said motion detection signal is outputted.

21. An encoder as claimed in claim 19, wherein said means for detecting the motion includes:

means for dividing the frequency bandwidth of said second television signal into plural division bandwidths;

means for detecting respective motions in said plural division bandwidths; and means for combining the results of the detections by said means for detecting the respective motions to judge said motion in said second television signal.

22. An encoder as claimed in claim 20, wherein said means for detecting the motion includes:

means for dividing the frequency bandwidth of said second television signal into plural division bandwidths;

means for detecting respective motions in said plural division bandwidths; and means for combining the results of the detections by said means for detecting the respective motions to judge said motion in said second television signal.

23. An encoder as claimed in claim 3, further comprising:

a first reverse matrix circuit for forming first non-linear three-primary-color signals from a first non-linear luminance signal and two non-linear color signals of said second television signal, a reverse gamma correction circuit for converting said first non-linear three-primary-color signals into first linear three-primary-color signals;

a first matrix circuit for converting said first linear three-primary-color signals into a linear luminance signal and two linear chrominance signals;

first band limit filter means for limiting a frequency band for a still picture portion in said linear luminance signal and two linear chrominance signals;

second band limit filter means for limiting a frequency band for a motion picture portion in said linear luminance signal and two linear chrominance signals;

means for detecting a motion in said second television signal to output a motion detection signal;

a selector for selectively outputting one of the outputs from said first and second band limit filters;

a second reverse matrix circuit for converting the output from said selector into second linear three-primary-color signals;

a gamma correction circuit for converting said second linear three-primary-color signals into second non-linear three-primary-color signals;

a second matrix circuit for converting said second non-linear three-primary-color signals into a non-linear luminance signal and two non-linear chrominance signals.

24. An encoder as claimed in claim 3, further comprising:

a first reverse matrix circuit for forming first non-linear three-primary-color signals from a first non-linear luminance signal and two non-linear color signals of said second television signal, a reverse gamma correction circuit for converting said first non-linear three-primary-color signals into first linear three-primary-color signals;

a first matrix circuit for converting said first linear three-primary-color signals into a linear luminance signal and two linear chrominance signals;

low pass filter means for extracting low band components of said chrominance signals;

a second reverse matrix circuit for converting said low band components of said chrominance signals and said linear luminance signal into second linear three-primary-color signals;

a gamma correction circuit for converting said second linear three-primary-color signals into second non-linear three-primary-color signals;

a second matrix circuit for converting said second non-linear three-primary-color signals into a second non-linear luminance signal;

a third matrix circuit for converting said first non-linear three-primary-color signals into at least first two non-linear chrominance signals; and low pass filter means for extracting low band components of said first two non-linear chrominance signals to output second two non-linear chrominance signals, said second non-linear luminance signal from said second matrix circuit and said second two non-linear chrominance signals being applied to said means for separating a luminance vertical high band component of said second television signal.

25. An encoder as claimed in claim 3, further comprising:

a motion edge detection filter having:

a first high pass filter in a time axis direction for extracting a luminance high band component in the time axis direction from the luminance signal of said second television signal; and a second high pass filter in a horizontal direction and/or a vertical direction for extracting a luminance high band component in the horizontal and/or vertical direction of the output from said first high pass filter in the time axis direction to output a motion edge signal; and an adder for combining said motion edge signal with said luminance signal of said second television signal to output an improved luminance signal.

26. A decoder for decoding the second television signal from the third television signal encoded by an encoder for converting said second television signal with a high resolution and having the larger number of horizontal scanning lines, a broader frequency bandwidth and a larger aspect ratio of a frame relative to the first television signal into said third television signal which is compatible with said first television signal, said decoder comprising:

means for separating a central scanning line portion and upper and lower scanning line portions of said third television signal;

means for extracting a luminance horizontal low band component from said central scanning line portion;

means for extracting a luminance horizontal high band component signal having luminance horizontal high band components multiplexed on the side of said decoder in a frequency region higher than the frequency region of said luminance horizontal low band component, from said central scanning line portion;

means for frequency-converting said luminance horizontal high band component signal into said luminance horizontal high band components arranged in plural frequency regions high than the frequency region of said luminance horizontal low band component;

means for combining said luminance horizontal high band components with said luminance horizontal low band component to obtain a broad-band luminance horizontal signal;

a first scanning line number conversion means for converting the number of scanning lines of said broad-band luminance horizontal signal into the number of scanning lines of said second television signal;

a second scanning line number conversion means for converting the number of scanning lines of the signals in the upper and lower scanning line portions into signals having scanning lines, the number of which is equal to the number of scanning lines of said second television signal; and means for combining the outputs from said first and second scanning line number conversion means with each other.

27. A decoder as claimed in claim 26, wherein said first television signal is an NTSC standard television signal.

28. A decoder as claimed in claim 26, wherein said second television signal has substantially 750 scanning lines, a field frequency of substantially 59.94 Hz and an aspect ratio of substantially 16:9.

29. A decoder as claimed in claim 26, further comprising means for demultiplexing and time axis expanding said signals in the upper and lower scanning line portions which are time-division multiplexed.

30. A decoder as claimed in claim 29, wherein a high band component of a color signal is multiplexed to said upper and lower scanning line portions in a frequency interleaving relationship and said second scanning line number conversion means comprises a comb filter for removing said high band component of said color signal, said comb filter having characteristics corresponding to said frequency interleaving relationship.

31. A decoder as claimed in claim 26, wherein said means for frequency-converting said luminance horizontal high band component signal comprises a comb filter having characteristics corresponding to a frequency interleaving relationship between said luminance horizontal high band components in said predetermined frequency region and for outputting said luminance horizontal high band components and a demodulator for frequency-converting the output from said comb filter into said plural frequency regions.

32. A decoder as claimed in claim 26, wherein said luminance horizontal high band components are obtained by four-field multiplexing on the side of said encoder, and said means for frequency-converting said luminance horizontal high band component signal comprises means for sub-sampling said luminance horizontal high band components by an offset sub-sampling pulse having a relation with the correlation between four fields and a demodulator for frequency-converting the output from said comb filter into said plural frequency regions.

33. A decoder as claimed in claim 26, further comprising:

means for decoding chrominance high band components of chrominance signals I and Q contained in the separated upper and lower scanning line portions;

means for time-shifting said chrominance high band components decoded; and means for combining the shifted high band components with chrominance low band components of said chrominance signals I and Q contained in the separated central scanning line portion to form color signals with a broader frequency band.

34. A decoder as claimed in claim 33, wherein said chrominance high band components are multiplexed to each other in said upper and lower scanning line portions in a frequency interleaving relationship on the side of said encoder, and further comprising a comb filter for separating said chrominance high band components from said upper and lower scanning line portions, said comb filter having characteristics corresponding to said frequency interleaving relationship; and a demodulator for frequency converting the separated chrominance high band components into a frequency band of said chrominance high band component.

35. A decoder as claimed in claim 33, wherein said chrominance high band components of said I and Q signals are multiplexed sequentially field by field on the side of said encoder, and further comprising means for selectively outputting said chrominance high band components of said I and Q signals in field sequence; means for frequency converting chrominance high band components selectively outputted into predetermined frequency bands, respectively; and means for combining chrominance high band components frequency-converted with chrominance low band components of said I and Q signals, respectively.

36. A decoder as claimed in claim 26, further comprising:

motion detection means for detecting a portion of said third television signal where a picture moves to output a motion detection signal; and means for controlling said means for frequency-converting said luminance horizontal high band component signal to enable the outputs from said means for frequency-converting said luminance horizontal high band component signal when said motion detection means outputs said motion detection signal.

37. A decoder as claimed in claim 33, further comprising:

motion detection means for detecting a portion of said third television signal where a picture moves to output a motion detection signal; and means for controlling said means for decoding chrominance high band components of chrominance signals I and Q to enable the outputs from said means for decoding chrominance high band components of chrominance signals I and Q when said motion detection means outputs said motion detection signal.

38. A decoder as claimed in claim 26, further comprising:

means for controlling said first and second scanning line number conversion means in accordance with said motion detection signal from said motion detection means.

39. A decoder as claimed in claim 26, further comprising means for detecting phase information with respect to a zero crossing point of a color burst signal in said third television signal; and means for regenerating a synchronizing signal in accordance with the phase information detected.

40. A decoder as claimed in claim 39, wherein said means for detecting the phase information includes means for generating a puke at a zero crossing point of a subcarrier at a predetermined position in said color burst signal television signal.

41. A decoder as claimed in claim 39, wherein said means for detecting phase information includes:

an A/D converter for converting said third television signal to output a sampled value sampled at a sampling phase;

means for synchronously separating a horizontal synchronizing pulse from said third television signal;

means for generating a pulse indicative of a position of a zero crossing point of a subcarrier at a predetermined position in said color burst signal in said third television signal;

means for calculating said phase information in accordance with a sampled value at said position of said zero crossing point and sampled values at positions adjacent to said position of said zero crossing point positions from said A/D converter; and means for feeding-back said phase information calculated to said sampling phase in said A/D converter.

42. A decoder as claimed in claim 39, wherein said means for detecting phase information includes edge detection means for detecting whether a zero crossing point of a subcarrier at a predetermined position in said color burst signal in said third television signal has a positive or negative edge; and said means for regenerating includes means for regenerating a carrier having a frequency of $M \times f_h/2$ (M: integer, $f_h$: horizontal synchronizing frequency) in accordance with the phase information from said means for detecting phase information and the information detected by said edge detection means.

43. A broad bandwidth television signal transmission system having an encoder for converting a second television signal with a high resolution and having the larger number of horizontal scanning lines, a broader frequency bandwidth and a larger aspect ratio of a frame relative to a first television signal into a third television signal which is compatible with said first television signal, and a decoder for decoding a second television signal from a third television signal encoded by an encoder for converting said second television signal with a high resolution and having the larger number of horizontal scanning lines, a broader frequency bandwidth and a larger aspect ratio of a frame relative to a first television signal into said third television signal which is compatible with said first television signal, said system comprising on the transmitter side:

means for separating a luminance vertical high band component of said second television signal which is higher than a luminance vertical low band component of said second television signal from said second television signal, said luminance vertical high band component of said second television signal corresponding to a central scanning line portion out of said central portion and upper and lower scanning line portions of said first television signal, said central scanning line portion and said upper and lower scanning line portions being divided in the ratio of an aspect ratio of said first television signal to that of said second television signal;

means for converting the number of scanning lines of said second television signal obtained by removing said luminance vertical high band component from said second television signal, into the number of scanning lines in said central portion;

means for frequency-converting a luminance horizontal high band component in the second television signal from said means for converting and having a bandwidth higher than a frequency bandwidth of said first television signal, into a separable signal which is multiplexed to a frequency region higher than the frequency region of a luminance horizontal low band component in said second television signal and is separable on a decoder side;

means for multiplexing said separable signal to a luminance horizontal low band component;

delay means for time-shifting said luminance vertical high band component of said second television signal to said upper and lower scanning line portions;

means for combining an output from said means for multiplexing with an output from said delay means to obtain said third television signal; and transmitting means for modulating a carrier signal by said third television signal from said means for combining and for transmitting the modulated carrier signal; and said system further comprising on the receiver side:

receiving means receiving the transmitted modulated carrier signal and for demodulating the third television signal therefrom;

means for separating a central scanning line portion and upper and lower scanning line portions of said third television signal;

means for extracting a luminance horizontal low band component from said central scanning line portion;

means for extracting a luminance horizontal high band component signal having luminance horizontal high band components multiplexed on the side of said decoder in a frequency region higher than the frequency region of said luminance horizontal low band component, from said central scanning line portion;

means for frequency-converting said luminance horizontal high band component signal into said luminance horizontal high band components arranged in plural frequency regions high than the frequency region of said luminance horizontal low band component;

means for combining said luminance horizontal high band components with said luminance horizontal low band component to obtain a luminance horizontal signal;

a first scanning line number conversion means for converting the number of scanning lines of said luminance horizontal signal into the number of scanning lines of said second television signal;

a second scanning line number conversion means for converting the number of scanning lines of the signals in the upper and lower scanning line portions into signals having scanning lines, the number of which is equal to the number of scanning lines of said second television signal; and means for combining the outputs from said first and second scanning line number conversion means with each other.

44. A broad bandwidth television signal transmission system as claimed in claim 43, wherein said modulated carrier signal is transmitted through a cable transmission system.

45. A broad bandwidth television signal transmission system as claimed in claim 43, wherein said modulated carrier signal is transmitted through a wireless transmission system.

46. A broad bandwidth television signal transmission system as claimed in claim 43, further comprising:

means for combining an audio signal relating to said second television signal in combination with said third television signal, so that said carrier signal is modulated by the combined signal; and means for extracting the audio signal; and means for extracting the audio signal from the received modulated carrier signal.

47. A broad bandwidth television signal recording/reproducing system having an encoder for converting a second television signal with a high resolution and having the larger number of horizontal scanning lines, a broader frequency bandwidth and a larger aspect ratio of a frame relative to a first television signal into a third television signal which is compatible with said first television signal, and a decoder for decoding a second television signal from a third television signal encoded by an encoder for converting said second television signal with a high resolution and having the larger number of horizontal scanning lines, a broader frequency bandwidth and a larger aspect ratio of a frame relative to a first television signal into said third television signal which is compatible with said first television signal, said system comprising on the recording side:

means for separating a luminance vertical high band component of said second television signal which is higher than a luminance vertical low band component of said second television signal from said second television signal, said luminance vertical high band component of said second television signal corresponding to a central scanning line portion out of said central portion and upper and lower scanning line portions of said first television signal, said central scanning line portion and said upper and lower scanning line portions being divided in the ratio of an aspect ratio of said first television signal to that of said second television signal;

means for converting the number of scanning lines of said second television signal obtained by removing said luminance vertical high band component from said second television signal, into the number of scanning lines in said central portion;

means for frequency-converting a luminance horizontal high band component in the second television signal from said means for converting and having a bandwidth higher than a frequency bandwidth of said first television signal, into a separable signal which is multiplexed to a frequency region higher than the frequency region of a luminance horizontal low band component in said second television signal and is separable on a decoder side;

means for multiplexing said separable signal to a luminance horizontal low band component;

delay means for time-shifting said luminance vertical high band component of said second television signal to said upper and lower scanning line portions;

means for combining an output from said means for multiplexing with an output from said delay means to obtain said third television signal; and recording means for recording said third television signal from said means for combining on a recording medium; and said system further comprising on the reproducing side:

reproducing means for reproducing the third television signal from said recording medium;

means for separating a central scanning line portion and upper and lower scanning line portions of said third television signal;

means for extracting a luminance horizontal low band component from said central scanning line portion;

means for extracting a luminance horizontal high band component signal having luminance horizontal high band components multiplexed on the side of said decoder in a frequency region higher than the frequency region of said luminance horizontal low band component, from said central scanning line portion;

means for frequency-converting said luminance horizontal high band component signal into said luminance horizontal high band components arranged in plural frequency regions high than the frequency region of said luminance horizontal low band component;

means for combining said luminance horizontal high band components with said luminance horizontal low band component to obtain a luminance horizontal signal;

a first scanning line number conversion means for converting the number of scanning lines of said luminance horizontal signal into the number of scanning lines of said second television signal;

a second scanning line number conversion means for converting the number of scanning lines of the signals in the upper and lower scanning line portions into signals having scanning lines, the number of which is equal to the number of scanning lines of said second television signal; and means for combining the outputs from said first and second scanning line number conversion means with each other.

48. A broad bandwidth television signal recording/reproducing system as claimed in claim 47, wherein said recording medium is a magnetic disc.

49. A broad bandwidth television signal recording/reproducing system as claimed in claim 47, wherein said recording medium is an optical disc.

50. A broad bandwidth television signal recording/reproducing system as claimed in claim 47, wherein said recording medium is a magnetic tape.

51. A broad bandwidth television signal recording/reproducing system as claimed in claim 47, further comprising:

means for recording said audio signal on said recording medium; and means for reproducing the recorded audio signal from said recording medium.

* * * * *